United States Patent
Otsuka

(10) Patent No.: US 12,323,644 B2
(45) Date of Patent: Jun. 3, 2025

(54) IMAGE DISPLAY SYSTEM, MOVING IMAGE DISTRIBUTION SERVER, IMAGE PROCESSING APPARATUS, AND MOVING IMAGE DISTRIBUTION METHOD

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 332 days.

(21) Appl. No.: 17/763,009

(22) PCT Filed: Sep. 23, 2020

(86) PCT No.: PCT/JP2020/035832
§ 371 (c)(1),
(2) Date: Mar. 23, 2022

(87) PCT Pub. No.: WO2021/065629
PCT Pub. Date: Apr. 8, 2021

(65) Prior Publication Data
US 2022/0353555 A1 Nov. 3, 2022

(30) Foreign Application Priority Data
Sep. 30, 2019 (JP) ................ 2019-179437

(51) Int. Cl.
*H04N 21/2343* (2011.01)
*H04N 13/286* (2018.01)
(Continued)

(52) U.S. Cl.
CPC ..... *H04N 21/23439* (2013.01); *H04N 13/286* (2018.05); *H04N 13/344* (2018.05);
(Continued)

(58) Field of Classification Search
CPC ............ H04N 21/235; H04N 21/2357; H04N 21/23439; H04N 13/286; H04N 13/344;
(Continued)

(56) References Cited

U.S. PATENT DOCUMENTS 8,213,516 B2 7/2012 Kobayashi
8,988,491 B2 3/2015 Yamashita
(Continued)

FOREIGN PATENT DOCUMENTS

JP 02301793 A 12/1990
JP 02301798 A 12/1990
(Continued)

OTHER PUBLICATIONS

Pietro Lungaro, et. al., "Gaze-aware streaming solutions for the next generation of mobile VR experiences", IEEE Transactions on Visualization and Computer Graphics, vol. 24, No. 4, 10 pages, dated Apr. 1, 2018.
(Continued)

*Primary Examiner* — John R Schnurr
(74) *Attorney, Agent, or Firm* — Kilpatrick Townsend & Stockton LLP

(57) ABSTRACT

A server performs a part of a forming process necessary for conversion into formats corresponding to display modes of a head mounted display and a flat-plate display connected to an image processing apparatus, and transmits a processing result to the image processing apparatus. At this time, the server switches the part of the process to transmit any one of a pair of a left-eye image and a right-eye image, an image suited for the flat-plate display, and an image constituted by a left-eye image and a right-eye image to each of which distortion for an ocular lens has been given.

15 Claims, 34 Drawing Sheets

(51) Int. Cl.
  *H04N 13/344* (2018.01)
  *H04N 13/356* (2018.01)
  *H04N 21/414* (2011.01)
  *H04N 21/4402* (2011.01)

(52) U.S. Cl.
  CPC ....... H04N 13/356 (2018.05); H04N 21/2343 (2013.01); H04N 21/41407 (2013.01); H04N 21/4402 (2013.01)

(58) Field of Classification Search
  CPC ............. H04N 13/356; H04N 21/2343; H04N 21/41407; H04N 21/4402; H04N 19/124; H04N 19/136; H04N 19/167; H04N 19/17; H04N 19/33; H04N 21/4122; H04N 21/440245; H04N 21/6587; H04N 21/816; H04N 21/4518; A63F 13/26; A63F 13/355; A63F 13/52; G09G 5/00
  See application file for complete search history.

(56) References Cited

U.S. PATENT DOCUMENTS

| | | | |
|---|---|---|---|
| 9,294,783 B2 | 3/2016 | Tatsuka | |
| 9,591,283 B2 | 3/2017 | Ihara | |
| 9,596,450 B2 | 3/2017 | Ogawa | |
| 10,049,424 B2 | 8/2018 | Yuan | |
| 10,110,802 B2 | 10/2018 | Ardo | |
| 10,204,264 B1 | 2/2019 | Gallagher | |
| 10,275,113 B2 | 4/2019 | Hsiao | |
| 10,349,059 B1 | 7/2019 | Good | |
| 10,349,077 B2 | 7/2019 | Hattori | |
| 10,373,592 B2 | 8/2019 | Tall | |
| 10,499,113 B2 | 12/2019 | Toma | |
| 10,536,693 B2 | 1/2020 | Safreed | |
| 10,539,797 B2* | 1/2020 | Nakashima | G02B 27/017 |
| 10,629,107 B2 | 4/2020 | Yamamoto | |
| 10,810,701 B2 | 10/2020 | Suzuki | |
| 10,841,566 B2* | 11/2020 | He | H04N 21/234345 |
| 10,871,822 B2 | 12/2020 | Nakata | |
| 10,905,943 B2 | 2/2021 | Perry | |
| 10,969,591 B2 | 4/2021 | Nakamura | |
| 11,100,716 B2 | 8/2021 | Ohashi | |
| 11,119,319 B2 | 9/2021 | Yokota | |
| 11,120,775 B2 | 9/2021 | Hamaker | |
| 2003/0193496 A1 | 10/2003 | Wada | |
| 2003/0227977 A1 | 12/2003 | Henocq | |
| 2004/0252903 A1 | 12/2004 | Chen | |
| 2005/0076136 A1 | 4/2005 | Cho | |
| 2005/0286786 A1 | 12/2005 | Noda | |
| 2006/0262861 A1 | 11/2006 | Kobayashi | |
| 2008/0089412 A1 | 4/2008 | Ugur | |
| 2009/0213927 A1 | 8/2009 | Perlman | |
| 2010/0040137 A1 | 2/2010 | Chiang | |
| 2010/0128797 A1 | 5/2010 | Dey | |
| 2011/0216827 A1 | 9/2011 | Luo | |
| 2012/0044322 A1 | 2/2012 | Tian | |
| 2012/0056975 A1 | 3/2012 | Yamashita | |
| 2013/0138829 A1 | 5/2013 | Bulava | |
| 2013/0286160 A1 | 10/2013 | Sasaki | |
| 2013/0336631 A1* | 12/2013 | Kura | H04N 13/30 386/230 |
| 2014/0016913 A1 | 1/2014 | Hamada | |
| 2014/0079126 A1 | 3/2014 | Ye | |
| 2014/0133568 A1 | 5/2014 | Otsuka | |
| 2014/0152766 A1 | 6/2014 | Ogawa | |
| 2014/0176749 A1 | 6/2014 | Horowitz | |
| 2014/0348248 A1 | 11/2014 | Ihara | |
| 2014/0364208 A1 | 12/2014 | Perry | |
| 2015/0007225 A1* | 1/2015 | Strong | H04N 19/597 725/74 |
| 2015/0063470 A1 | 3/2015 | Tatsuka | |
| 2015/0229945 A1 | 8/2015 | Nakagami | |
| 2015/0341663 A1 | 11/2015 | Zhang | |
| 2016/0048964 A1 | 2/2016 | Kruglick | |
| 2016/0165282 A1 | 6/2016 | Yuan | |
| 2016/0192027 A1 | 6/2016 | Toma | |
| 2017/0075416 A1 | 3/2017 | Armstong | |
| 2017/0084083 A1 | 3/2017 | Wilson | |
| 2017/0127061 A1 | 5/2017 | Miyamoto | |
| 2017/0238000 A1 | 8/2017 | Ryu | |
| 2017/0264902 A1 | 9/2017 | Ye | |
| 2017/0289615 A1* | 10/2017 | Kobayashi | H04N 21/242 |
| 2018/0033405 A1 | 2/2018 | Tall | |
| 2018/0068540 A1 | 3/2018 | Romanenko | |
| 2018/0188534 A1 | 7/2018 | Stafford | |
| 2018/0191952 A1 | 7/2018 | Ardo | |
| 2018/0192058 A1 | 7/2018 | Chen | |
| 2018/0315364 A1 | 11/2018 | Yamamoto | |
| 2018/0332291 A1 | 11/2018 | Komine | |
| 2018/0336659 A1 | 11/2018 | Tavakoli | |
| 2018/0365800 A1 | 12/2018 | Suzuki | |
| 2019/0049728 A1 | 2/2019 | Oto | |
| 2019/0116215 A1 | 4/2019 | Oesterreicher | |
| 2019/0317595 A1 | 10/2019 | Nakata | |
| 2019/0373287 A1 | 12/2019 | Lim | |
| 2020/0084516 A1 | 3/2020 | Yun | |
| 2020/0132996 A1 | 4/2020 | Yokota | |
| 2020/0143516 A1 | 5/2020 | Martin | |
| 2020/0145696 A1 | 5/2020 | Fitzgerald | |
| 2020/0195944 A1 | 6/2020 | Dicera | |
| 2020/0221061 A1* | 7/2020 | Kim | G06F 3/1446 |
| 2020/0250498 A1 | 8/2020 | Kazi | |
| 2020/0288083 A1 | 9/2020 | Toda | |
| 2020/0312032 A1 | 10/2020 | Ohashi | |
| 2020/0319463 A1 | 10/2020 | Nakamura | |
| 2021/0092373 A1 | 3/2021 | Fulghum | |
| 2021/0168376 A1 | 6/2021 | Zhu | |

FOREIGN PATENT DOCUMENTS

| | | |
|---|---|---|
| JP | 05344495 A | 12/1993 |
| JP | 09284620 A | 10/1997 |
| JP | 10200900 A | 7/1998 |
| JP | 2004005452 A | 1/2004 |
| JP | 2004056335 A | 2/2004 |
| JP | 2005229352 A | 8/2005 |
| JP | 200630379 A | 2/2006 |
| JP | 2006054830 A | 2/2006 |
| JP | 2006324767 A1 | 11/2006 |
| JP | 2007074512 A | 3/2007 |
| JP | 200949528 A | 3/2009 |
| JP | 2009049976 A | 3/2009 |
| JP | 2009246539 A | 10/2009 |
| JP | 2011123894 A | 6/2011 |
| JP | 2012080518 A | 4/2012 |
| JP | 2013201518 A | 10/2013 |
| JP | 2015061316 A | 3/2015 |
| JP | 2016111705 A | 6/2016 |
| JP | 2016533659 A | 10/2016 |
| JP | 2017097122 A | 6/2017 |
| JP | 2017215875 A | 12/2017 |
| JP | 2017228044 A | 12/2017 |
| JP | 2018026677 A | 2/2018 |
| JP | 2018110398 A | 7/2018 |
| JP | 2018141816 A | 9/2018 |
| JP | 2018191251 A | 11/2018 |
| JP | 2018207415 A | 12/2018 |
| JP | 2019028368 A | 2/2019 |
| JP | 2019050572 A | 3/2019 |
| JP | 2019074881 A | 5/2019 |
| JP | 2019083492 A | 5/2019 |
| JP | 2019106628 A | 6/2019 |
| WO | 2012111325 A1 | 8/2012 |
| WO | 2013140485 A1 | 9/2013 |
| WO | 2013175796 A1 | 11/2013 |
| WO | 2017138458 A1 | 8/2017 |
| WO | 2018026730 A1 | 2/2018 |

(56) References Cited

FOREIGN PATENT DOCUMENTS

| WO | 2019026765 A1 | 2/2019 |
|----|---------------|--------|
| WO | 2019031308 A1 | 2/2019 |

OTHER PUBLICATIONS

International search report for corresponding PCT Application No. PCT/JP2020/035832, 4 pages, Dec. 1, 2020.
Decision to Grant A Patent in corresponding JP Application No. 2019-179437, 5 pages, dated Nov. 9, 2023.
Notice of Reasons for Refusal for related JP Application No. 2019-213536, 6 pages, dated Dec. 26, 2023.
Notice of Reasons for Refusal for related JP Application No. 2019-179440, 18 pages, dated Dec. 19, 2023.
Notice of Reasons for Refusal for related JP Application No. 2019-179439, 20 pages, dated Dec. 14, 2023.
International Search Report for related PCT Application No. PCT/JP2020/035830, 4 pages, dated Dec. 1, 2020.
International Search Report for related PCT Application No. PCT/JP2020/035831, 6 pages, dated Dec. 8, 2020.
International Search Report for related PCT Application No. PCT/JP2020/035834, 6 pages, dated Dec. 22, 2020.
Notice of Reasons for Refusal for related JP Application No. 2019-179436, 6 pages, dated Nov. 9, 2023.
Extended European Search Report for related EP Application No. 20870798.4, 7 pages, dated Jul. 31, 2023.
International search report for related PCT Application No. PCT/JP2020/035835, 6 pages, Dec. 22, 2020.
International search report for related PCT Application No. PCT/JP2020/035836, 6 pages, Dec. 22, 2020.
International Search Report for related PCT Application No. PCT/JP2020/035833, 4 pages, dated Dec. 22, 2020.
Notice of Reasons for Refusal for related JP Application No. 2019-179438, 10 pages, dated Nov. 9, 2023.

* cited by examiner

FIG. 10
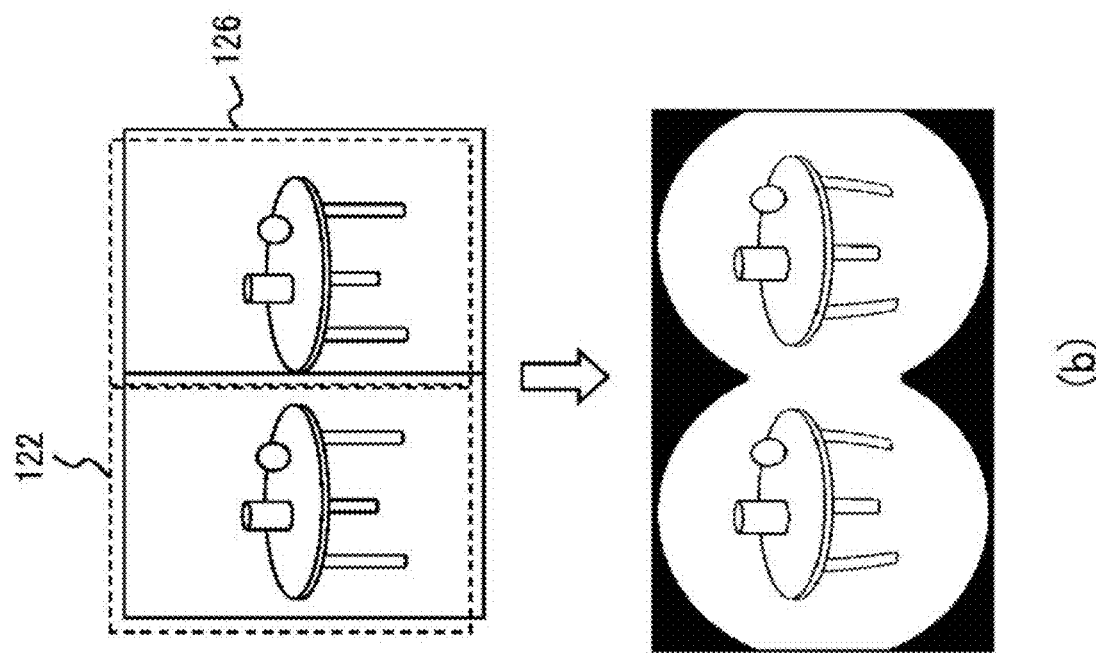
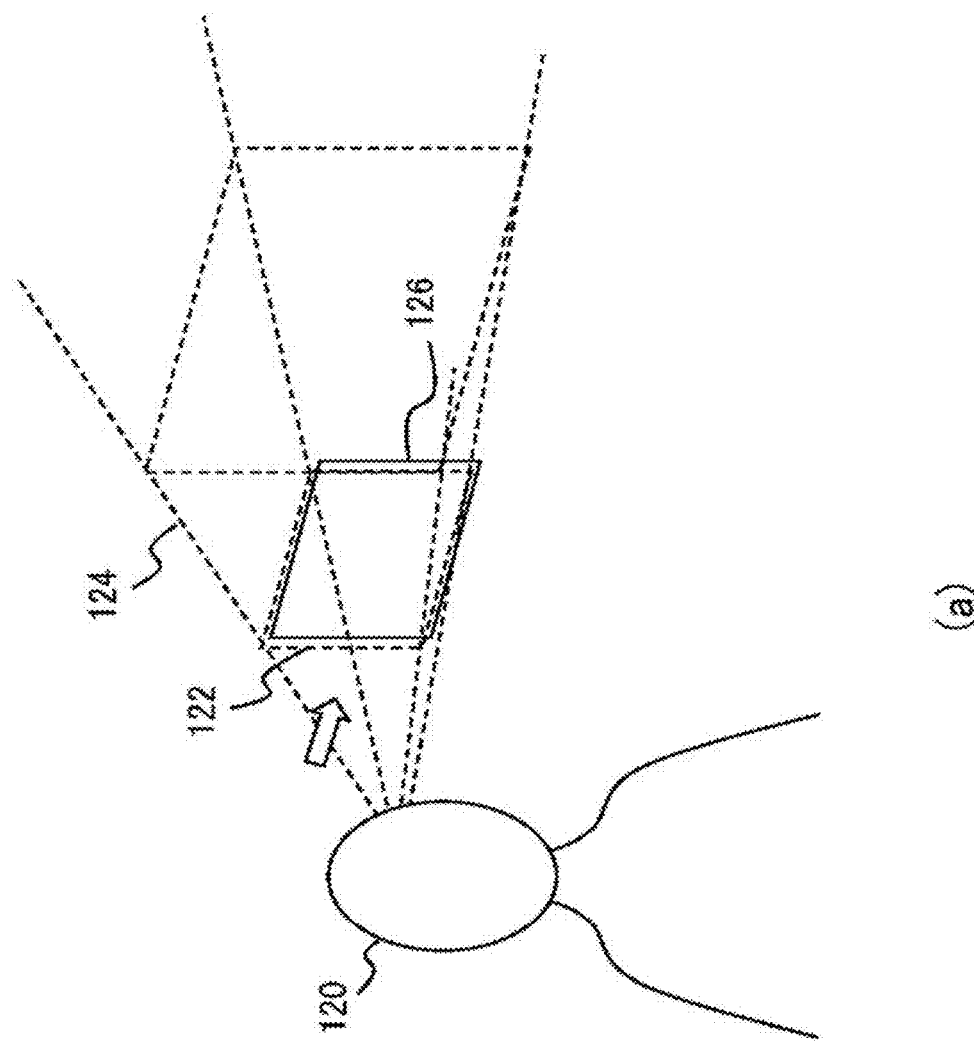

(a)         (b)

FIG. 22
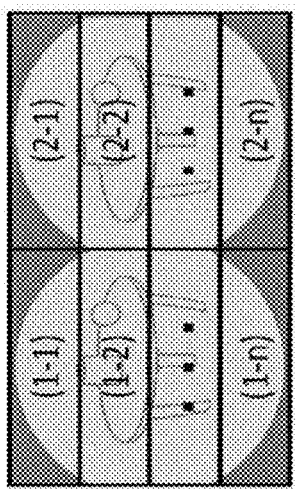
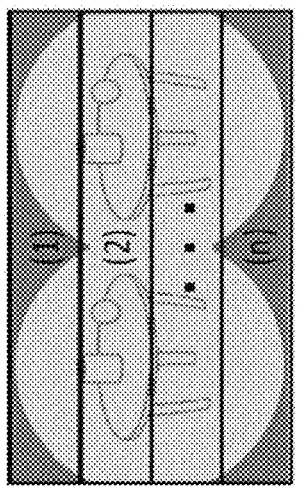
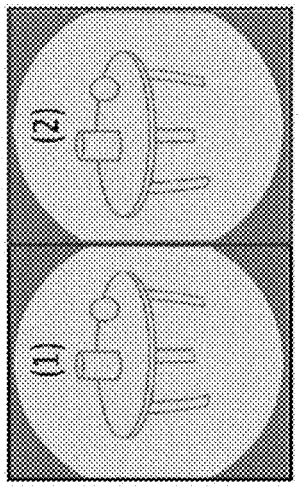
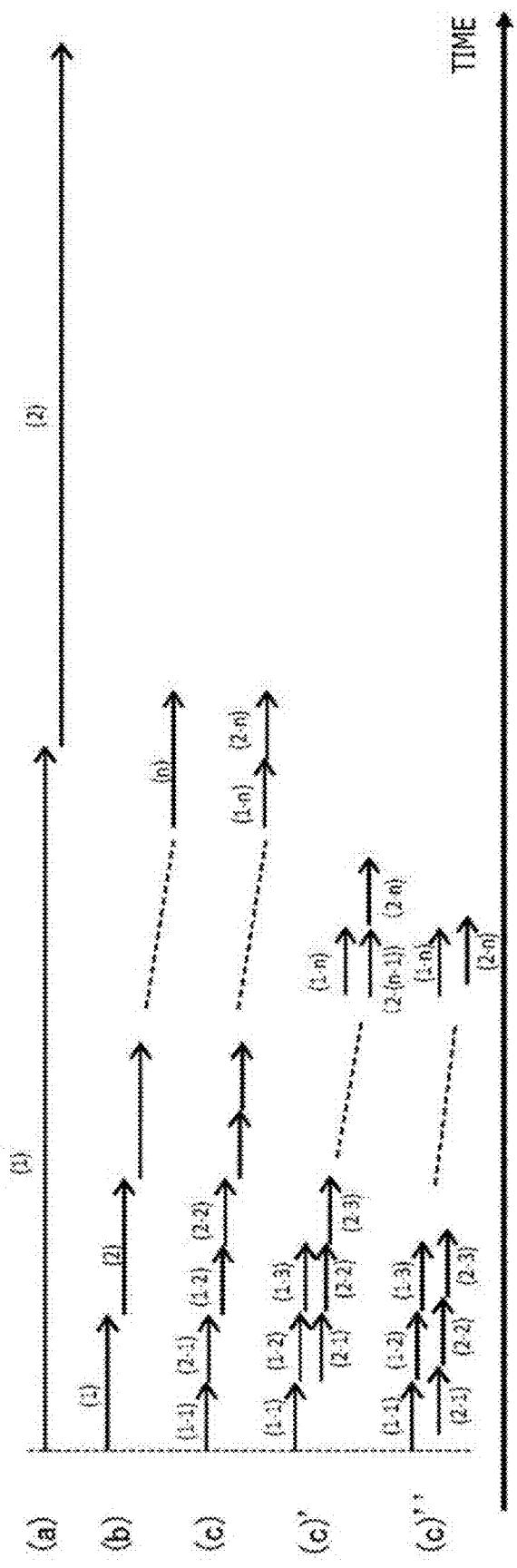

FIG. 28
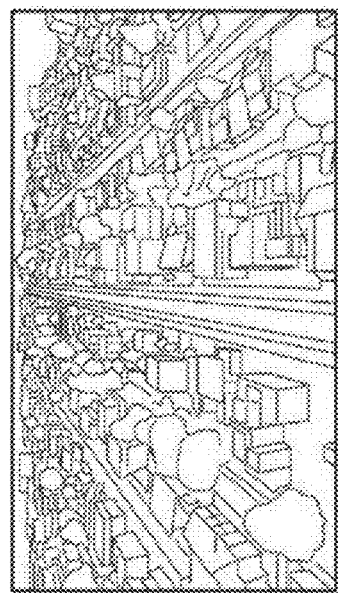
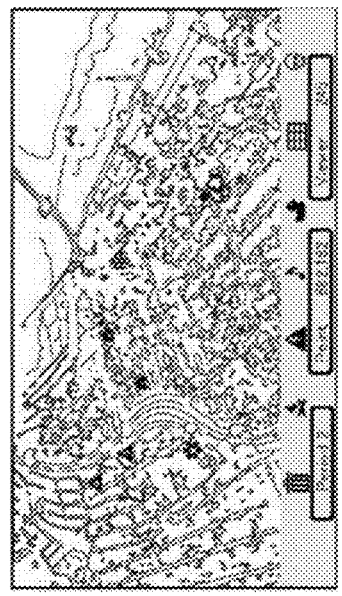
HIGH SCORE

FIG. 29
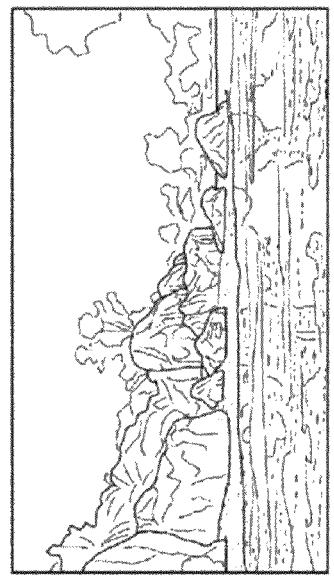
HIGH SCORE

FIG.38
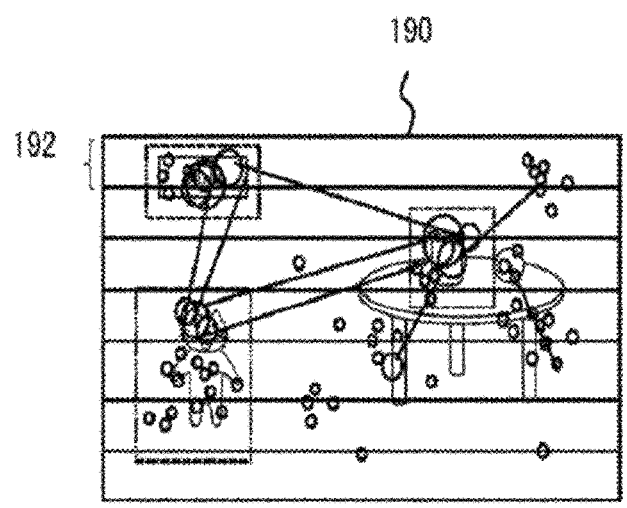
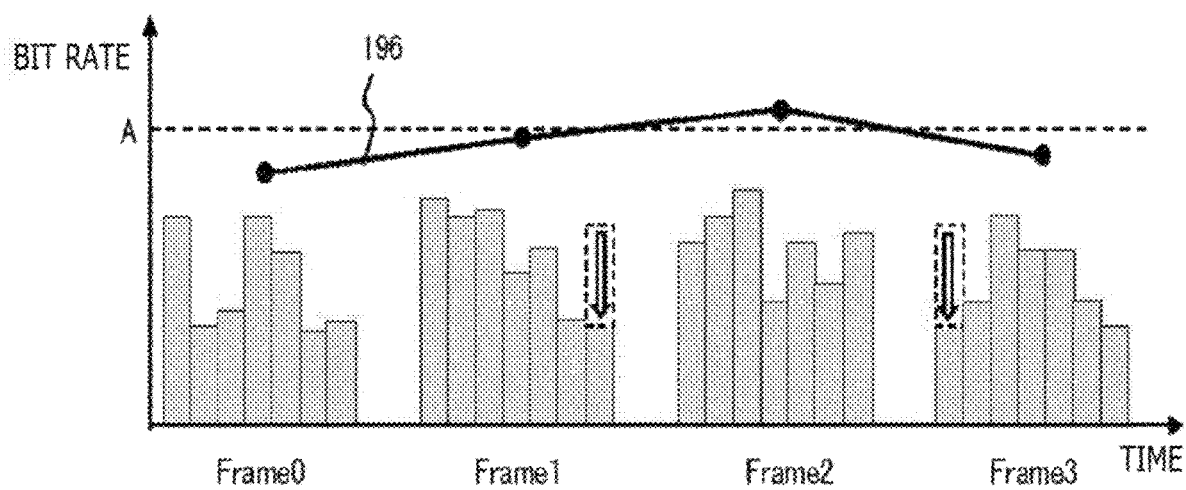

IMAGE DISPLAY SYSTEM, MOVING IMAGE DISTRIBUTION SERVER, IMAGE PROCESSING APPARATUS, AND MOVING IMAGE DISTRIBUTION METHOD

TECHNICAL FIELD

This invention relates to an image display system, a moving image distribution server, an image processing apparatus, and a moving image distribution method for processing data of a moving image to be displayed.

BACKGROUND ART

Various forms of video world experiences have become increasingly realizable with recent improvement in information processing technologies and image display technologies. For example, an increase of a sense of immersion into a video world, or improvement of operability of an application such as a game is achievable by displaying a panorama video on a head mounted display for display of an image corresponding to a visual line of a user. Moreover, a user can enjoy fine moving images or game screens regardless of a location or a scale by display of image data transferred by streaming transfer from a server having abundant resources.

SUMMARY TECHNICAL PROBLEMS

According to a technology for real-time display on a client terminal to display image data transferred via a network, there may arise a problem of a delay time period produced by communication between the client terminal and a server. Data exchange such as transmission of a user operation performed on the client terminal side to the server and transmission of image data from the server to the client terminal is needed so as to reflect the user operation in a display image, for example. In this case, an unignorable delay time period may be produced. In a case where an image is displayed on a head mounted display, the display may be delayed from movement of the head of the user. In this case, degradation of realistic sensation or visually induced motion sickness may be caused. This problem becomes more remarkable as required image quality increases.

The present invention has been developed in consideration of the abovementioned problems. An object of the present invention is to provide a technology capable of achieving both image quality improvement and delay time period reduction of image display requiring data transmission via communication.

Solution to Problems

For solving the above problems, an aspect of the present invention relates to an image display system. This image display system is an image display system including a server that generates data of a moving image and a client terminal that receives the data of the moving image and causes a display panel to display the data. The server includes a data forming section that performs a part of a forming process necessary for causing each frame of the moving image to have a format corresponding to a display mode achieved by the client terminal, a forming contents switching section that switches, under a predetermined rule, contents of a process to be performed by the data forming section, and a communication section that transmits data of a frame for which the part of the forming process has been performed and information associated with the contents of the process. The client terminal includes a correction section that causes a frame transmitted from the server to have a format corresponding to the display mode, by performing a correction process determined on the basis of the information associated with the contents of the process, and a display control section that outputs, to the display panel, data of the frame caused to have the format corresponding to the display mode.

Another aspect of the present invention relates to a moving image distribution server. This moving image distribution server includes a data forming section that performs a part of a forming process necessary for causing each frame of a moving image to have a format corresponding to a display mode achieved by a client terminal, a forming contents switching section that switches, under a predetermined rule, contents of a process to be performed by the data forming section, and a communication section that transmits, to the client terminal, data of a frame for which the part of the forming process has been performed and information associated with the contents of the process.

A further aspect of the present invention relates to an image processing apparatus. This image processing apparatus is a client terminal that causes a display panel to display a moving image acquired from a server, and includes a reception section that receives, from the server, data of a frame for which a part of a forming process necessary for causing the frame to have a format corresponding to a display mode achieved by the display panel has been performed, and information associated with contents of the process, a correction section that causes the frame transmitted from the server to have the format corresponding to the display mode, by performing a correction process determined on the basis of the information associated with the contents of the process, and a display control section that outputs, to the display panel, data of the frame caused to have the format corresponding to the display mode.

A still further aspect of the present invention relates to a moving image distribution method. This moving image distribution method is performed by a moving image distribution server, and includes a step of switching, under a predetermined rule, contents of a process to be performed as a part of a forming process necessary for causing each frame of a moving image to have a format corresponding to a display mode achieved by a client terminal, a step of performing the process to be performed, and a step of transmitting, to the client terminal, data of a frame for which the part of the forming process has been performed and information associated with the contents of the process.

Note that any combination of the constituent elements described above and the expressions of the present invention converted in terms of a method, an apparatus, a system, a computer program, a data structure, a recording medium, or the like are also effective as modes of the present invention.

Advantageous Effects of Invention

According to the present invention, both image quality improvement and delay time period reduction are achievable in image display requiring data transmission via communication.

BRIEF DESCRIPTION OF DRAWINGS

FIG. 10 is a diagram for explaining reprojection and distortion correction for an ocular lens performed by a first correction section according to the present embodiment.

FIG. 22 is a diagram for explaining advantageous effects produced by compression coding performed by the server in units of an image block utilizing similarity between images for a plurality of viewpoints according to the present embodiment.

FIG. 28 is a diagram depicting an example of determining a score according to contents of a moving image according to the present embodiment.

FIG. 29 is a diagram depicting an example of determining a score according to contents of a moving image according to the present embodiment.

FIG. 38 is a diagram for explaining a method performed by a compression coding processing section for determining a distribution of compression rates on the basis of a gaze point according to the present embodiment.

DESCRIPTION OF EMBODIMENTS

1. Overall System Configuration

Figure 1:
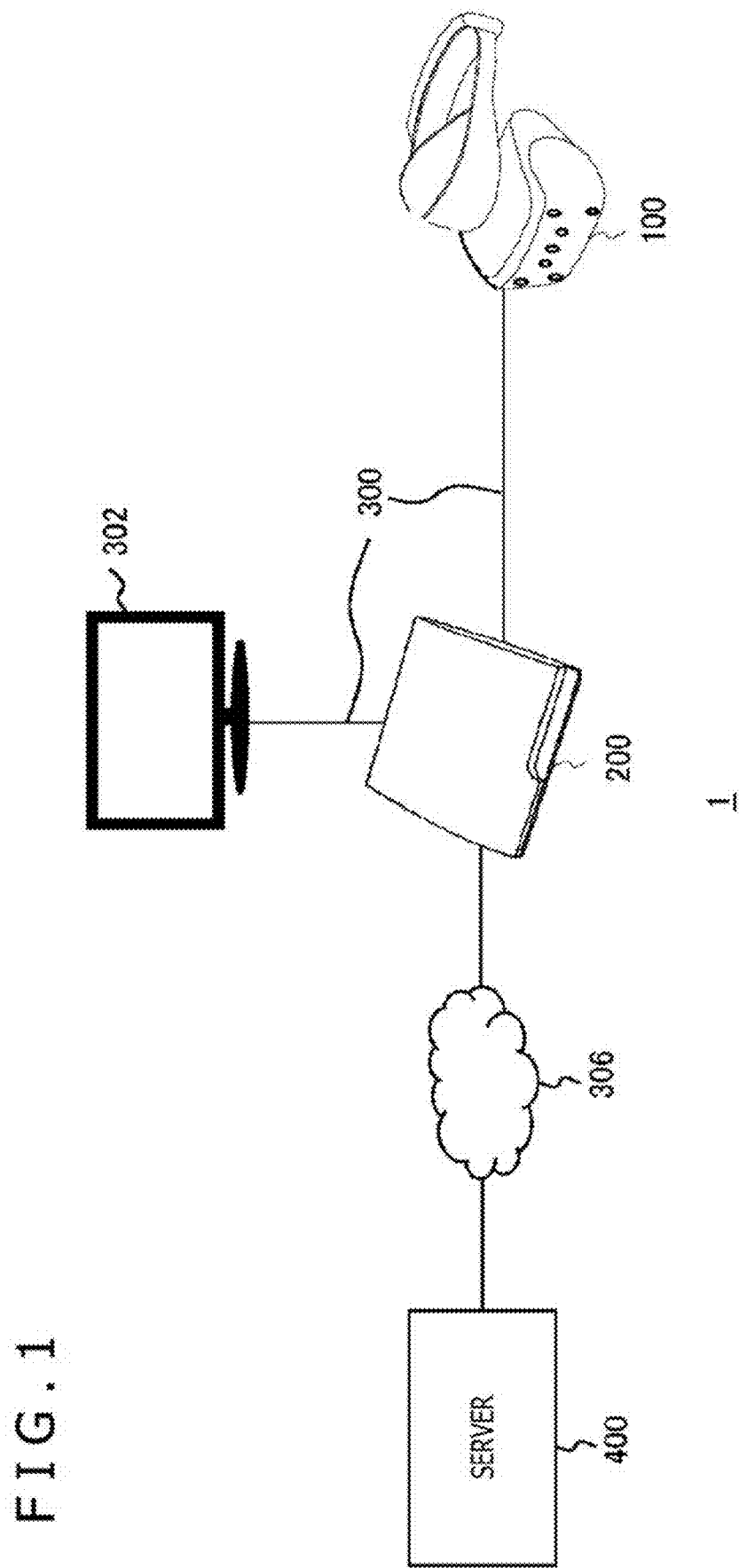
FIG. 1 is a diagram depicting a configuration example of an image processing system according to a present embodiment.

FIG. 1 depicts a configuration example of an image processing system according to the present embodiment. An image display system 1 includes an image processing apparatus 200, a head mounted display 100, a flat-plate display 302, and a server 400. The image processing apparatus 200 is connected to the head mounted display 100 and the flat-plate display 302 via wireless communication, or an interface 300 such as USB (Universal Serial Bus) Type-C and HDMI (High-Definition Multimedia Interface) (registered trademark). The image processing apparatus 200 is further connected to the server 400 via a network 306 such as the Internet and a LAN (Local Area Network).

The server 400 functioning as an image data transfer apparatus forms at least a part of an image to be displayed, and transmits the formed image to the image processing apparatus 200. The server 400 herein may be either a server offered by an enterprise providing various types of distribution services like cloud games, or an in-home server transmitting data to any terminal. Accordingly, the network 306 is a public network such as the Internet, or a LAN, for example, and the scale of the network 306 is not limited to a particular scale. For example, the network 306 may be a cellular phone carrier network, a Wi-Fi spot located in a town, or a network via an in-home Wi-Fi access point. Alternatively, the image processing apparatus 200 and the server 400 may directly be connected to each other via a video interface.

The image processing apparatus 200 performs necessary processing for image data transmitted from the server 400, and outputs the processed image data to at least either the head mounted display 100 or the flat-plate display 302. For example, the server 400 receives movement of the heads of a plurality of users each wearing the head mounted display 100 and user operations from a plurality of image processing apparatuses 200 each connected to the corresponding head mounted display 100. Thereafter, the server 400 draws an image of a virtual world, which is varied according to each of the user operations, in a visual field corresponding to the movement of the head of the corresponding user, and transmits the image of the virtual world to the corresponding image processing apparatus 200.

The image processing apparatus 200 converts the transmitted image data into data in a format suited for the head mounted display 100 or the flat-plate display 302 as necessary, and outputs the image data to the head mounted display 100 or the flat-plate display 302 at an appropriate timing. These processes are repeated for each frame of a moving image. In this manner, a cloud game system allowing participation by a plurality of users is realizable. At this time, the image processing apparatus 200 may output an image transmitted from the server 400 to the head mounted display 100 or the flat-plate display 302 after merging the image with a UI (User Interface) plain image (or also called an OSD (On Screen Display) plain image) separately prepared or an image captured by a camera provided on the head mounted display 100.

Moreover, the image processing apparatus 200 may correct the image transmitted from the server 400, on the basis of a position or a posture taken immediately before display by the head mounted display 100, to increase followability of display to the movement of the head. The image processing apparatus 200 may also display an image in a similar visual field on the flat-plate display 302 to allow another person to view the image the user wearing the head mounted display 100 is currently viewing.

Note that contents of a moving image to be displayed, and a place where the moving image is to be displayed are not particularly limited in the present embodiment. For example, the server 400 may designate an image captured by a not-depicted camera as a display target and distribute the image to the image processing apparatus 200 by live-streaming. At this time, the server 400 may use a plurality of cameras each capturing an image of an event site of an event such as a sporting event and a concert to acquire a multiple viewpoint image, and form an image in a visual field corresponding to the movement of the head mounted display 100, by using the acquired multiple viewpoint image, to generate a live video for a free viewpoint and distribute the generated live video to each of the image processing apparatuses 200.

Moreover, a system configuration to which the present embodiment is applicable is not limited to the configuration depicted in the figure. For example, the display device connected to the image processing apparatus 200 may be either the head mounted display 100 or the flat-plate display 302, or may be constituted by a plurality of head mounted displays 100. Moreover, the image processing apparatus 200 may be built in the head mounted display 100 or the flat-plate display 302. For example, the flat-plate display and the image processing apparatus may be constituted by a personal computer or a portable terminal (portable game machine, high-performance cellular phone, or tablet terminal) integrating the flat-plate display and the image processing apparatus.

At least either the head mounted display 100 or the flat-plate display 302 may further be connectable to these devices as necessary. A not-depicted input device may be built in or connected to the image processing apparatus 200 or these terminals. In addition, the number of image processing apparatuses 200 connected to the server 400 is not limited to a particular number. Further, the server 400 may receive details of operations of a plurality of users each viewing and listening to the corresponding flat-plate display 302 from the plurality of image processing apparatuses 200 each connected to the corresponding flat-plate display 302, form images corresponding to the contents, and transmit the images to the corresponding image processing apparatuses 200.

Figure 2:
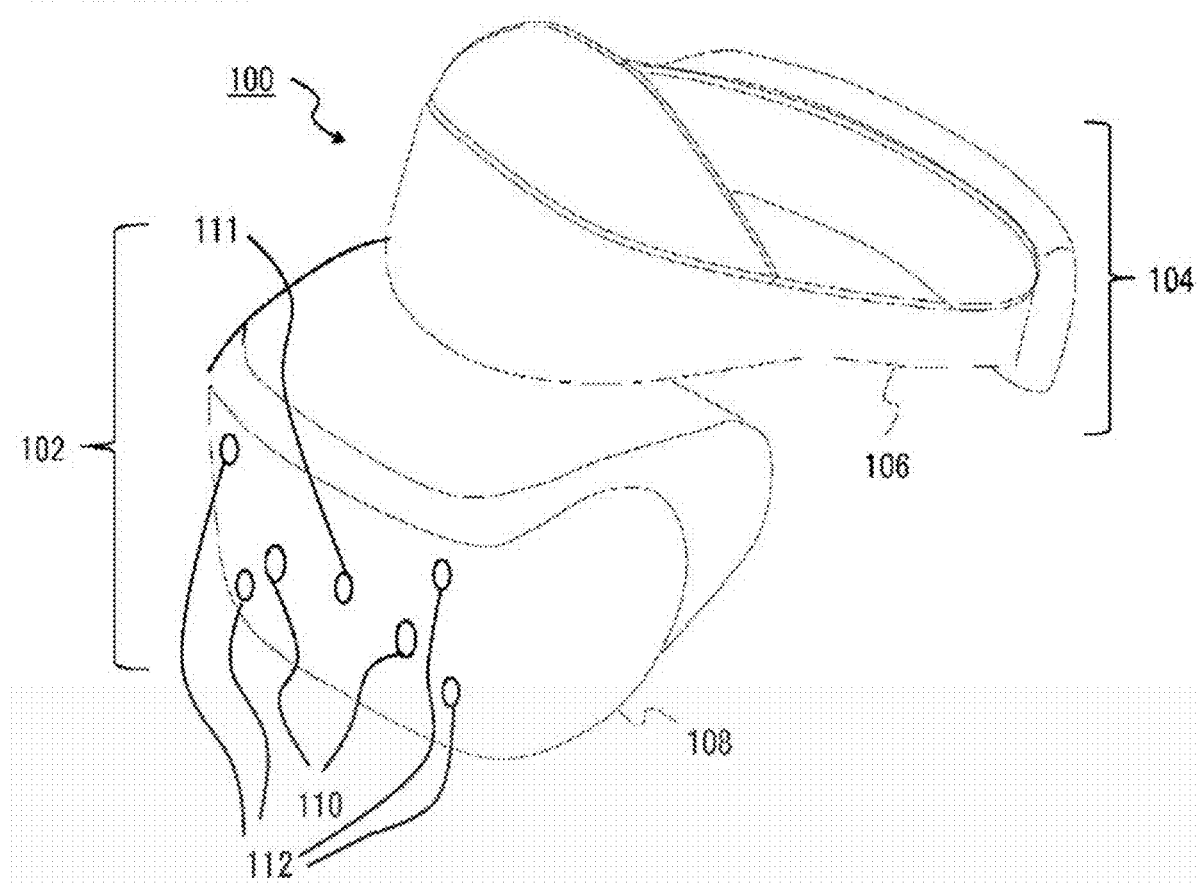
FIG. 2 is a diagram depicting an external appearance example of a head mounted display according to the present embodiment.

FIG. 2 depicts an external appearance of the head mounted display 100. The head mounted display 100 in this example is constituted by an output mechanism unit 102 and an attachment mechanism unit 104. The attachment mechanism unit 104 includes an attachment band 106 which covers around the head for fixation thereto when worn by the user. The output mechanism unit 102 includes a housing 108 shaped to cover left and right eyes of the user in a state where the user wears the head mounted display 100, and houses a display panel so disposed as to face the eyes when worn by the user.

The housing 108 further includes an ocular lens configured to enlarge an image to be viewed, and disposed inside the housing 108 between the display panel and the eyes of the user in a wearing state of the head mounted display 100. Moreover, the head mounted display 100 may further include speakers or earphones at positions corresponding to ears of the user in the wearing state. Further, the head mounted display 100 may include a built-in motion sensor to detect translational motion and rotational motion of the head of the user wearing the head mounted display 100, and further a position or a posture of the head at each time.

The head mounted display 100 further includes stereo cameras 110 on a front surface of the housing 108, a monocular camera 111 having a wide viewing angle and disposed at the center, and four cameras 112 each having a wide viewing angle and disposed at four corners of the upper left, the upper right, the lower left, and the lower right to capture a moving image of a real space in a direction corresponding to the direction of the face of the user. The head mounted display 100 in a certain mode displays a real-time moving image captured by the stereo cameras 110 to provide a see-through mode for allowing the user to view, without any change, a state of the real space in the direction the user faces.

Moreover, at least any one of images captured by the stereo cameras 110, the monocular camera 111, and the four cameras 112 may be used for forming the display image. For example, positions or postures of the head mounted display 100, and also the head of the user, in a surrounding space may be acquired at a predetermined rate using SLAM (Simultaneous Localization and Mapping) to determine a visual field of an image formed by the server 400, or correct this image by the image processing apparatus 200. Alternatively, the captured image may be merged with an image transmitted from the server 400 by the image processing apparatus 200 and be used as the display image.

Further, the head mounted display 100 may include any type of motion sensor for deriving a position, a posture, and movement of the head mounted display 100, such as an acceleration sensor, a gyro sensor, and a magnetic field sensor, inside the head mounted display 100. In this case, the image processing apparatus 200 acquires information associated with the position or the posture of the user head at a predetermined rate, on the basis of a measured value obtained by the motion sensor. This information is available for determining a visual field of an image formed by the server 400, or correcting this image by the image processing apparatus 200.

Figure 3:
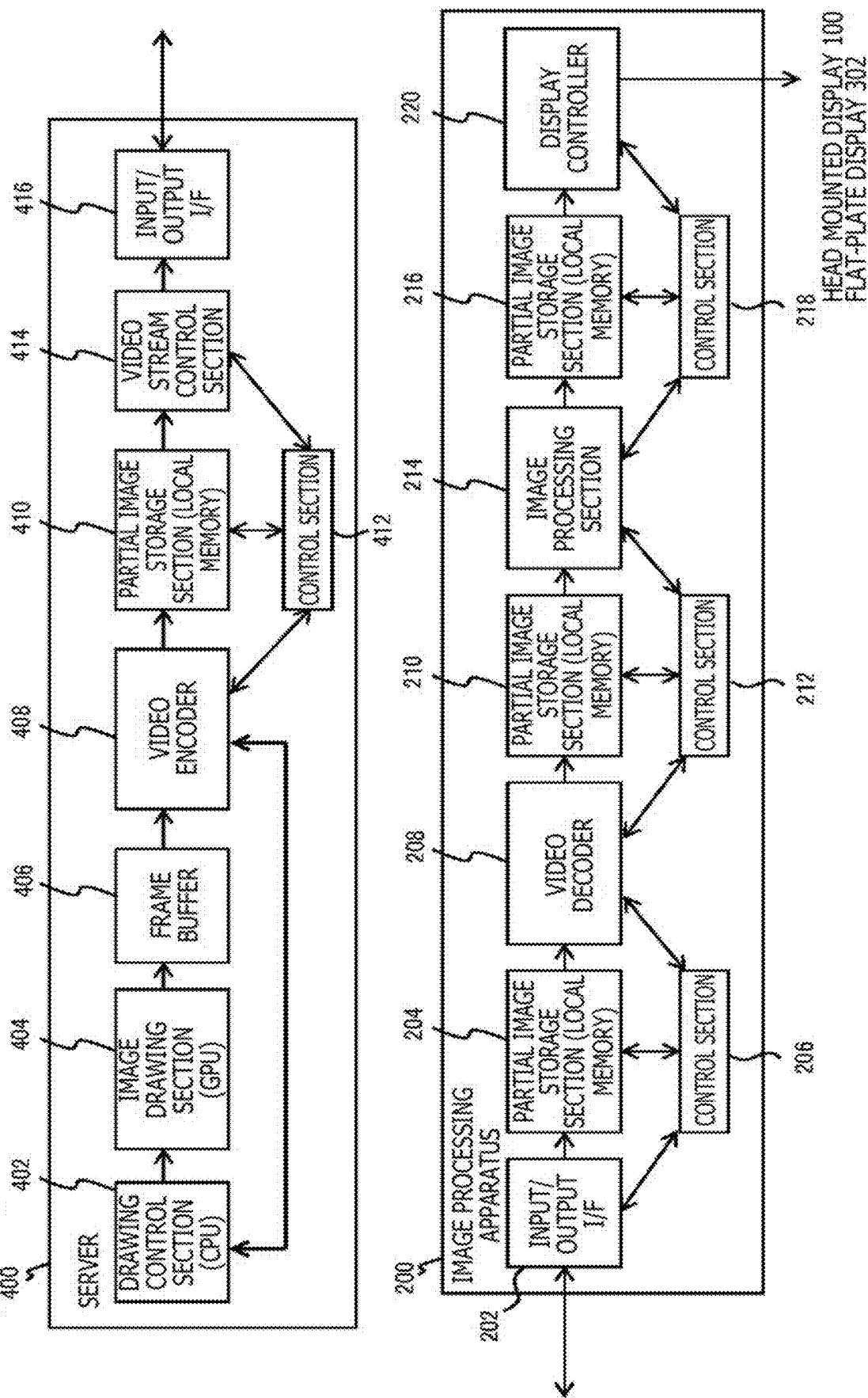
FIG. 3 is a diagram depicting basic configurations of a server and an image processing apparatus according to the present embodiment.

FIG. 3 depicts basic configurations of the server 400 and the image processing apparatus 200 according to the present embodiment. Each of the server 400 and the image processing apparatus 200 according to the present embodiment includes a local memory disposed at an important position thereof for storing partial images smaller than one frame of a display image. In addition, compression coding and transmission of image data by the server 400, and reception of data, decoding decompression, various types of image processing, and output to the display device by the image processing apparatus 200 are pipeline-processed in units of a partial image. In this manner, a delay time period produced in a process from image drawing by the server 400 to display on the display device connected to the image processing apparatus 200 is reduced.

A drawing control section 402 in the server 400 is implemented by a CPU (Central Processing Unit), and controls drawing of images performed by an image drawing section 404. As described above, contents of the image to be displayed according to the present embodiment are not particularly limited. For example, the drawing control section 402 causes a cloud game to progress, and causes the image drawing section 404 to draw frames of a moving image indicating a result thus obtained. At this time, the drawing control section 402 may acquire information associated with the position or the posture of the head of the user from the image processing apparatus 200, and control drawing of respective frames in a visual field corresponding to the acquired information.

The image drawing section 404, which is implemented by a GPU (Graphics Processing Unit), draws frames of a moving image at a predetermined or variable rate, under control by the drawing control section 402, and stores a result thus obtained in a frame buffer 406. The frame buffer 406 is implemented by a RAM (Random Access Memory). A video encoder 408 performs compression coding for image data stored in the frame buffer 406 in units of a partial image smaller than one frame, under control by the drawing control section 402. The partial image is an image of each of regions each having a predetermined size and obtained by dividing an image plane of a frame. Specifically, the partial image is an image of each of regions obtained by dividing an image plane along a boundary line defined in a horizontal direction, a vertical direction, both of the horizontal and vertical directions, or an oblique direction, for example.

At this time, the video encoder 408 may start compression coding of one frame immediately after completion of drawing of this frame by the image drawing section 404, without a wait for a vertical synchronized signal from the server. According to a conventional technology which synchronizes various types of processing such as frame drawing and compression coding on the basis of a vertical synchronized signal, management of a frame order is facilitated by equalizing time periods set for each of processes from image drawing to image display in units of a frame. In this case, however, it is necessary to wait for a next vertical synchronized signal before execution of the compression coding process even when the drawing process is completed earlier depending on contents of the frame. According to the present embodiment, a wasteful standby time period is eliminated by managing an image formation time in units of a partial image as will be described below.

A coding method used by the video encoder 408 for compression coding may be an ordinary method such as H.264/AVC (Advanced Video Coding) and H.265/HEVC (High Efficiency Video Coding). The video encoder 408 stores compression-coded image data in units of a partial image in a partial image storage section 410. The partial image storage section 410 is a local memory implemented by a SRAM (Static Random Access Memory) or the like, and has a storage region corresponding to a data size of a partial image smaller than one frame. This is applicable to a "partial image storage section" described below. A video stream control section 414 reads data of the compression-coded partial image every time this data is stored in the partial image storage section 410, and packetizes the data after inserting audio data, control information, or the like into the data as necessary.

A control section 412 constantly monitors a status of data writing to the partial image storage section 410 by the video encoder 408, a status of data reading by the video stream control section 414, and the like to appropriately control both of the operations. For example, the control section 412 controls the partial image storage section 410 such that data deficiency, i.e., buffer under-run, and data overflow, i.e., buffer over-run, are not caused.

The input/output interface 416 establishes communication with the image processing apparatus 200, and sequentially transmits data packetized by the video stream control section 414 via the network 306. The input/output interface 416 may transmit audio data or the like in addition to image data as necessary. Moreover, as described above, the input/output interface 416 may further acquire a user operation or information associated with the position or the posture of the head of the user from the image processing apparatus 200, and supply the acquired user operation or information to the drawing control section 402. An input/output interface 202 in the image processing apparatus 200 sequentially acquires images and audio data transmitted from the server 400.

The input/output interface 202 may further acquire a user operation or information associated with the position or the posture of the head of the user from the head mounted display 100, a not-depicted input device, or the like as necessary, and transmit the acquired user operation or information to the server 400. The input/output interface 202 decodes a packet acquired from the server 400, and then stores extracted image data in a partial image storage section 204. The partial image storage section 204 is a local memory provided between the input/output interface 202 and a video decoder 208, and constitutes a compressed data storage section. A control section 206 constantly monitors a status of data writing to the partial image storage section 204 by the input/output interface 202, a status of data reading by the video decoder 208, and the like to appropriately control both of the operations.

The video decoder 208 as a decoding decompression section reads partial image data every time this data is stored in the partial image storage section 204, decoding-decompresses the read data by performing procedures according to the coding method, and then sequentially stores the resultant data in a partial image storage section 210. The partial image storage section 210 is a local memory provided between the video decoder 208 and an image processing section 214, and constitutes a decoded data storage section. A control section 212 constantly monitors a status of data writing to the partial image storage section 210 by the video decoder 208, a status of data reading by the image processing section 214, and the like to appropriately control both of the operations.

The image processing section 214 reads decoding-decompressed partial image data every time this data is stored in the partial image storage section 210, and performs processing necessary for display. For example, the image processing section 214 implements a correction process for giving distortion opposite to distortion produced by the ocular lens, to allow visual recognition of an image containing no distortion as viewed from the head mounted display 100 via the ocular lens.

Alternatively, the image processing section 214 may execute merging (superimposition) with an image transmitted from the server 400 with reference to a UI plain image separately prepared. Moreover, the image processing section 214 may merge an image captured by the camera provided on the head mounted display 100 with an image transmitted from the server 400. Further, the image processing section 214 may correct an image transmitted from the server 400 such that a visual field of the image corresponds to a position or a posture of the head of the user at the time of processing. In addition, the image processing section 214 may perform image processing suited for output to the flat-plate display 302, such as super-resolution processing.

In any case, the image processing section 214 performs processing in units of a partial image stored in the partial image storage section 210, and sequentially stores the processed partial images in a partial image storage section 216. The partial image storage section 216 is a local memory provided between the image processing section 214 and a display controller 220. A control section 218 constantly monitors a status of data writing to the partial image storage section 216 by the image processing section 214, a status of data reading by the display controller 220, and the like to appropriately control both of the operations.

The display controller 220 reads partial image data that has undergone image processing every time this data is stored in the partial image storage section 216, and outputs the read data to the head mounted display 100 and the flat-plate display 302 at an appropriate timing. Specifically, the display controller 220 outputs the partial image data in an uppermost stage of each frame at a timing agreeing with a vertical synchronized signal of each of the displays 100 and 302, and then sequentially outputs the partial image data in an order toward a lower stage.

2. Pipeline-Processing for Each Partial Image

Figure 4:
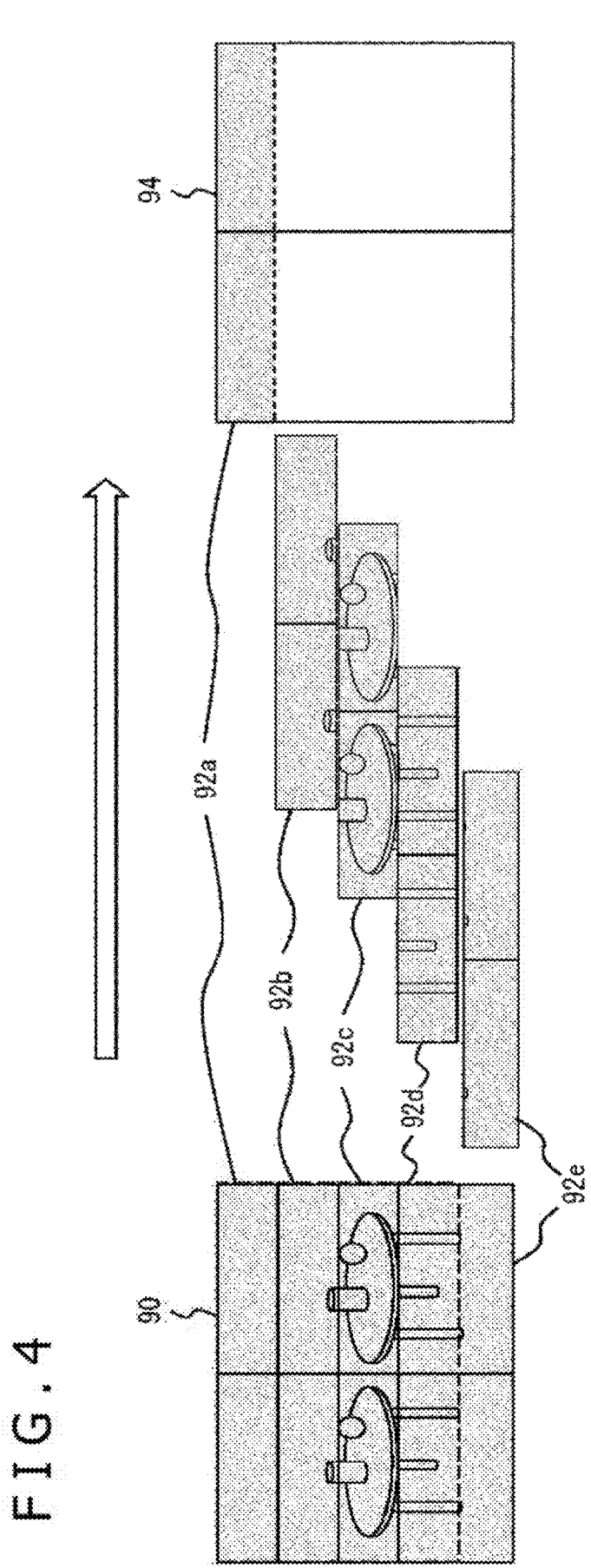
FIG. 4 is a diagram conceptually depicting a state of processing from image drawing to display according to the present embodiment.

Described next will be pipeline-processing for a partial image achieved by the server 400 and the image processing apparatus 200 during a process from image drawing to display. FIG. 4 conceptually depicts a state of a process from image drawing to display according to the present embodiment. As described above, the server 400 forms a frame 90 of a moving image at a fixed or variable rate. In the example depicted in the figure, the frame 90 has a configuration indicating an image for the left eye and an image for the right eye in regions divided into two equal parts on the left and right sides, respectively. However, the configuration of the image formed by the server 400 is not limited to this configuration.

As described above, the server 400 performs compression coding for the frame 90 for each partial image. In the figure, the image plane is divided into five parts in a horizontal direction to form partial images 92a, 92b, 92c, 92d, and 92e. In this manner, the partial images are sequentially compression-coded in this order, and transferred to the image processing apparatus 200 and displayed thereon as indicated by an arrow. Specifically, while processes such as compression coding, transmission, decoding decompression, and output to a display panel 94 are performed for the partial image 92a in the uppermost stage, the partial images such as the partial image 92b in a stage below the partial image 92a, and the partial image 92c in a stage below the partial image 92b are sequentially transferred and displayed. In this manner, the respective types of processing required to be performed from image drawing to display are allowed to take place in parallel, and therefore, display is allowed to progress with a minimum delay even when a transfer time period is interposed.

Figure 5:
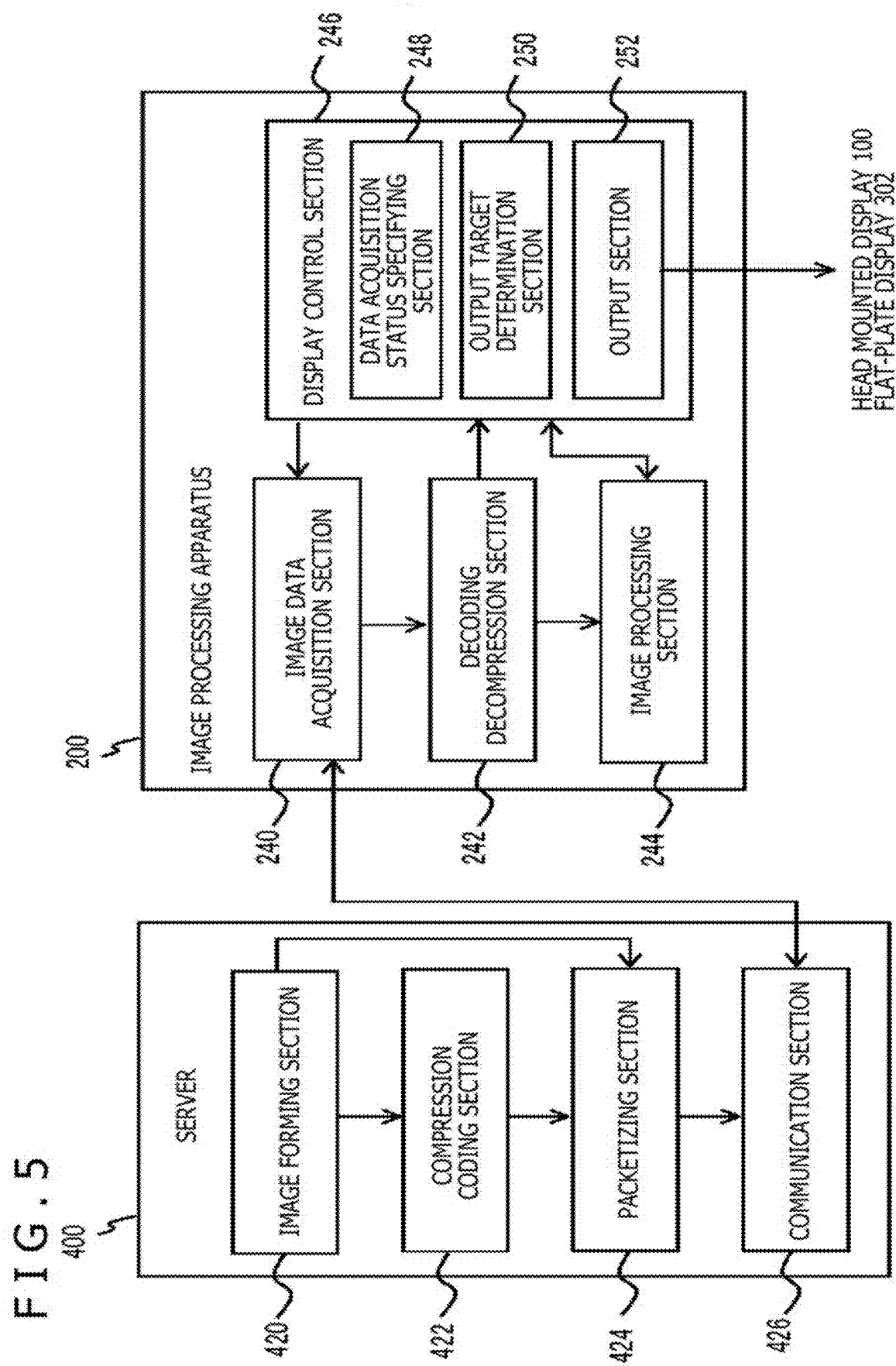
FIG. 5 is a diagram depicting function blocks of the server and the image processing apparatus according to the present embodiment.

FIG. 5 depicts function blocks of the server 400 and the image processing apparatus 200 according to the present embodiment. Each of the function blocks depicted in the figure can be implemented in a form of hardware using a CPU, a GPU, an encoder, a decoder, a calculator, various types of memories, or the like, or can be implemented in a form of software using a program loaded from a recording medium to a memory and performing various functions such as an information processing function, an image drawing function, a data input/output function, and a communication function. Accordingly, those skilled in the art understand that these function blocks can be implemented in various forms such as a form of only hardware, a form of only software, and a form of a combination of these. Accordingly, each of the function blocks is not limited to any one of these forms. This is applicable to function blocks described below.

The server 400 includes an image forming section 420, a compression coding section 422, a packetizing section 424, and a communication section 426. The image forming section 420 includes the drawing control section 402, the image drawing section 404, and the frame buffer 406 depicted in FIG. 3, and forms frames of a moving image to be transmitted to the image processing apparatus 200, such as a game image, at a fixed or variable rate. Alternatively, the image forming section 420 may acquire moving image data from a camera, a storage device, or the like not depicted in the figure. In this case, the image forming section 420 may be considered as an image acquisition section. This is applicable to the following description.

The compression coding section 422 includes the video encoder 408, the partial image storage section 410, and the control section 412 depicted in FIG. 3, and compression-codes image data formed by the image forming section 420 in units of a partial image. The compression coding section 422 herein performs motion compensation and coding in units of a region containing a predetermined number of rows, such as one row and two rows, or a rectangular region having a predetermined size such as 16×16 pixels and 64×64 pixels. Accordingly, the compression coding section 422 may start compression coding after data of a minimum unit region necessary for compression coding is formed by the image forming section 420.

Note that the partial image as a unit of the pipeline-processing for compression coding and transmission may be an image of the same region as this minimum unit, or may be an image of a region larger than this region. The packetizing section 424 includes the video stream control section 414 and the control section 412 depicted in FIG. 3, and packetizes data of a compression-coded partial image in a form corresponding to a protocol of communication to be used. At this time, a time at which this partial image is drawn (hereinafter referred to as a "formation time") is acquired from the image forming section 420 or the compression coding section 422, and associated with the data of the partial image.

The communication section 426 includes the input/output interface 416 depicted in FIG. 3, and transmits a packet containing compression-coded partial image data and the formation time of the data to the image processing apparatus 200. The server 400 thus configured achieves compression coding, packetization, and transmission in parallel by performing pipeline-processing in units of a partial image smaller than one frame. The image processing apparatus 200 includes an image data acquisition section 240, a decoding decompression section 242, an image processing section 244, and a display control section 246.

Note that the decoding decompression section 242 and the image processing section 244 have a common function in view of a point that predetermined processing is performed for partial image data to generate partial image data for display. At least either one of these sections may be collectively referred to as an "image processing section." The image data acquisition section 240 includes the input/output interface 202, the partial image storage section 204, and the control section 206 depicted in FIG. 3, and acquires compression-coded partial image data from the server 400 together with the formation time of the data.

The decoding decompression section 242 includes the video decoder 208, the partial image storage section 210, the control section 206, and the control section 212 depicted in FIG. 3, and decoding-decompresses compression-coded partial image data. The decoding decompression section 242 herein may start a decoding-decompression process after data of a minimum unit region necessary for compression coding such as motion compensation and coding is acquired by the image data acquisition section 240. The image processing section 244 includes the image processing section 214, the partial image storage section 216, the control section 212, and the control section 218 depicted in FIG. 3, and performs predetermined processing for partial image data to generate partial image data for display. For example, as described above, the image processing section 244 implements a correction process for giving opposite distortion in consideration of distortion produced by the ocular lens provided on the head mounted display 100.

Alternatively, the image processing section 244 performs merging for an image to be displayed together with a moving image, such as a UI plain image, in units of a partial image. Alternatively, the image processing section 244 acquires a position or a posture of the user head at that time, and corrects an image formed by the server 400 such that a visual field of the image becomes a correct visual field at the time of display. In this manner, time deviation produced between the movement of the user head and the display image due to a transfer time period from the server 400 can be reduced to the minimum.

In addition, the image processing section 244 may perform any one of ordinary processes of image processing or a combination of these. For example, the image processing section 244 may perform gamma curve correction, tone curve correction, contrast emphasis, or the like. Accordingly, the image processing section 244 may perform necessary offset correction for pixel values or luminance values of decoding-decompressed image data on the basis of characteristics of the display device or user designation. Moreover, the image processing section 244 may perform a noise removal process for achieving superimposition, weighted average calculation, smoothing, and the like with reference to adjacent pixels.

Further, the image processing section 244 may equalize a resolution of image data with a resolution of the display panel, or perform bilinear processing, trilinear processing, weighted average calculation, and oversampling with reference to adjacent pixels. In addition, the image processing section 244 may determine a type of image texture with reference to adjacent pixels, and selectively perform denoising, edge emphasis, smoothing, and tone/gamma/contrast correction according to the determined type of image texture. At this time, the image processing section 244 may perform these processes together with an up-scaler or a down-scaler for an image size.

Moreover, the image processing section 244 may perform format conversion in a case where a pixel format of image data is different from a pixel format of the display panel. For example, the image processing section 244 may perform conversion from YUV to RGB, conversion from RGB to YUV, conversion in YUV between 444, 422, and 420, or conversion in RGB between 8-bit, 10-bit, and 12-bit colors. Moreover, in a case where decoded image data is data in a format handling a luminance range of HDR (High Dynamic Range) while a range of the used display for handling the luminance range of HDR is narrow (e.g., a displayable luminance dynamic range is narrower than that of HDR format regulations), the image processing section 244 may perform a pseudo HDR process (color space change) for conversion into the HDR luminance range format of HDR in a display panel handleable range while maintaining as many characteristics of HDR images as possible.

Further, in a case where decoded image data is data in the HDR handling format while the used display handles only SDR (Standard Dynamic Range), the image processing section 244 may perform color space conversion into an SDR format while maintaining as many characteristics of HDR images as possible. In a case where decoded image data is data in the SDR handling format while the used display handles HDR, the image processing section 244 may perform enhancing conversion into the HDR format to adjust to characteristics of the HDR panel as much as possible.

Moreover, the image processing section 244 may perform error diffusion addition, or dithering to be performed together with pixel format conversion in a case where a gradation expression ability of the used display is low. Further, in a case where decoded image data contains partial deficiency or abnormality as a result of a lack of network transfer data or garbled data, the image processing section 244 may perform a correction process for the corresponding region. In addition, the image processing section 244 may perform single color fill, correction by adjacent pixel duplication, correction by adjacent pixels in a previous frame, or correction by pixels estimated from surroundings of a past frame or a current frame by using adaptive deficiency correction.

Moreover, the image processing section 244 may perform image compression so as to reduce a band range required by the interface for output from the image processing apparatus 200 to the display device. At this time, the image processing section 244 may perform entropy coding, index value reference coding, Huffman coding, or the like each of which is a lightweight process performed with reference to adjacent pixels. Moreover, in a case where the display device adopts a liquid crystal panel, the resolution is allowed to increase but a response speed lowers. In a case where the display device adopts an organic EL (Electro-Luminescence) panel, a response speed increases but the resolution is difficult to increase. In addition, a phenomenon called black smearing, where color blurring is caused in and around a black region, may occur.

Accordingly, the image processing section 244 may perform such correction as to eliminate these various types of adverse effects caused by the display panel. For example, in a case of a liquid crystal panel, the image processing section 244 resets a liquid crystal by inserting a black image between frames to increase a response speed. Moreover, in a case of an organic EL panel, the image processing section 244 applies an offset to a luminance value or a gamma value of gamma correction to obscure color blurring caused by black smearing.

The display control section 246 includes the display controller 220 and the control section 218 depicted in FIG. 3, and sequentially causes the display panels of the head mounted display 100 and the flat-plate display 302 to display partial image data for display. According to the present embodiment, however, compression-coded data of partial images is individually acquired from the server 400. In this case, the acquisition order may be switched or partial image data itself may be difficult to acquire due to a packet loss depending on a communication status.

Accordingly, the display control section 246 derives a time period elapsed from drawing of partial images on the basis of the formation time of each partial image, and then adjusts a timing of output a partial image to the display panel such that an image drawing timing in the server 400 is reproduced. Specifically, the display control section 246 includes a data acquisition status specifying section 248, an output target determination section 250, and an output section 252. The data acquisition status specifying section 248 specifies a data acquisition status such as an original display order and an original display timing of partial image data and a lacking amount of partial image data on the basis of the formation time of the partial image data and/or a time period elapsed from the formation time.

The output target determination section 250 changes a target to output to the display panel and appropriately adjusts an output order and an output timing according to the data acquisition status. For example, the output target determination section 250 determines whether to output original partial image data contained in a next frame or to again output partial image data contained in a previous frame, according to the data acquisition status. The output target determination section 250 determines the foregoing output target before a timing of a vertical synchronized signal corresponding to a display start time of the next frame comes.

For example, in a case where a predetermined rate or more of the partial images is lacking in the frame, the output target determination section 250 may change the output target according to the amount (rate) of acquired partial images by, for example, replacing the output target with data of a previous frame. Moreover, the output target determination section 250 may change the output target in a next frame display time period according to an output achievement of a past frame or a time period elapsed from the formation time. The output section 252 outputs partial image data determined as the output target to the display panel in the order and timing determined by the output target determination section 250.

Figure 6:
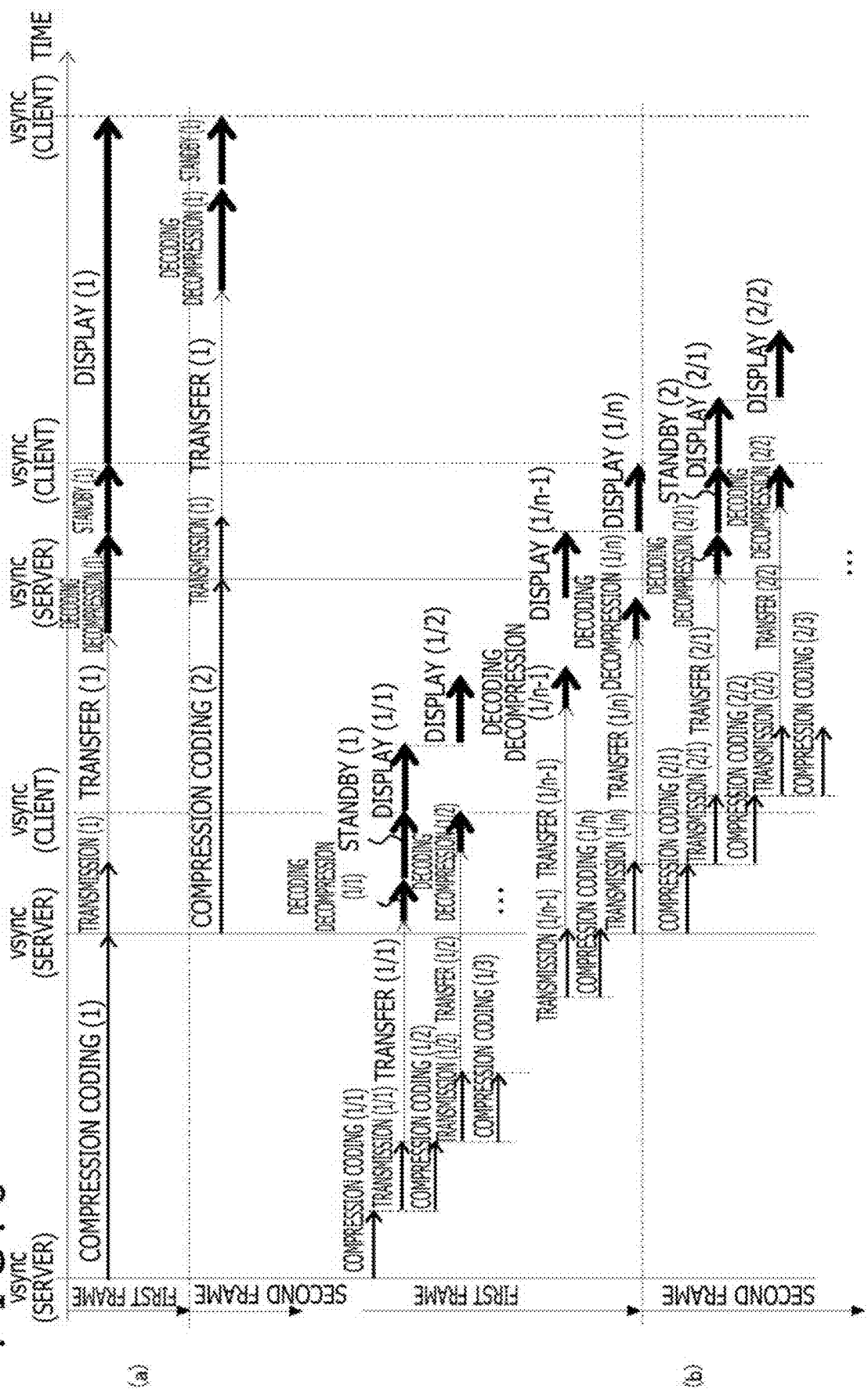
FIG. 6 is a diagram for explaining advantageous effects produced by pipeline-processing performed by the server and the image processing apparatus in units of a partial image according to the present embodiment.

FIG. 6 is a diagram for explaining advantageous effects produced by the pipeline-processing performed by the server 400 and the image processing apparatus 200 in units of a partial image according to the present embodiment. A lateral direction in the figure represents an elapsed time period. Each processing time period is indicated by an arrow together with a process name. Each process included in these processes and performed by the server 400 side is indicated by a thin line, while each process performed by the image processing apparatus 200 side is indicated by a thick line. Concerning each description included in parentheses and put together with the process name, a process for one frame of frame number m is expressed as (m), while a process for an nth partial image in the frame number m is expressed as (m/n).

Moreover, a vertical synchronized signal on the server 400 side is expressed as vsync (server), while a vertical synchronized signal on the image processing apparatus 200 and the display device side is expressed as vsync (client). First, (a) presents a conventional mode for causing a process to progress in units of one frame for comparison. In this example, the server 400 controls processing for each frame according to a vertical synchronized signal. Accordingly, the server 400 starts compression coding of data in a first frame stored in a frame buffer according to the vertical synchronized signal.

Subsequently, the server 400 starts compression coding of data in a second frame according to a next vertical synchronized signal, and packetizes and transmits the compression-coded data in the first frame in a predetermined unit. The image processing apparatus 200 performs a decoding decompression process for the frames in an arrival order. Note that, even after completion of decoding decompression and transition to a displayable state, display of the data is put into a standby state until a timing of a next vertical synchronized signal comes. As a result, in the example depicted in the figure, a delay of a display period of two frames or longer is produced in a period from completion of image drawing of one frame and start of the compression coding process by the server 400 to start of display.

A further delay may be produced depending on a communication time period between the server 400 and the image processing apparatus 200, a timing difference between the vertical synchronized signals of the server 400 and the image processing apparatus 200, or other circumstances. According to the present embodiment presented in (b), the server 400 starts transmission of first partial image data in a first frame at the time of completion of compression coding of this data. During transfer of this data via the network 306, the transfer process is made to progress in units of a partial image, in such a manner as compression coding and transfer of a second partial image, and compression coding and transfer of a third partial image.

The image processing apparatus 200 side sequentially decoding-decompresses acquired partial image data. As a result, the first partial image data comes into the displayable state considerably earlier than in the case of (a). Note that display of the first partial image data is put into a standby state until a timing of a next vertical synchronized signal. Subsequent partial images are sequentially output, following the output of the first partial image. The display time period of one frame is similar to that time period in (a). Accordingly, display of the nth partial image is completed before the next vertical synchronized signal is provided.

As described above, the processing of image data from compression coding to display is made to progress in parallel in a unit shorter than one frame. Accordingly, in the example depicted in the figure, display is achievable at a timing one frame earlier than in (a). While compression coding by the server 400 is similarly started in response to a vertical synchronized signal in (b) in the example depicted in the figure, the delay time period can further be reduced by performing compression coding without waiting for a vertical synchronized signal as described above.

Moreover, the display control section 246 of the image processing apparatus 200 may shift a timing of at least either a vertical synchronized signal or a horizontal synchronized signal within a range allowed by the display device, according to the timing at which the partial image data comes into the displayable state. For example, the display control section 246 may reduce the standby time period from completion of preparation for output to the display panel to actual output by changing an operation frequency of a pixel clock as a basis for all display timings by a predetermined micro time period, or changing a horizontal blanking period or a vertical blanking period by a predetermined micro time period. The display control section 246 may repeat this change for each frame so as to avoid collapse of display by one large-scale change.

Figure 7:
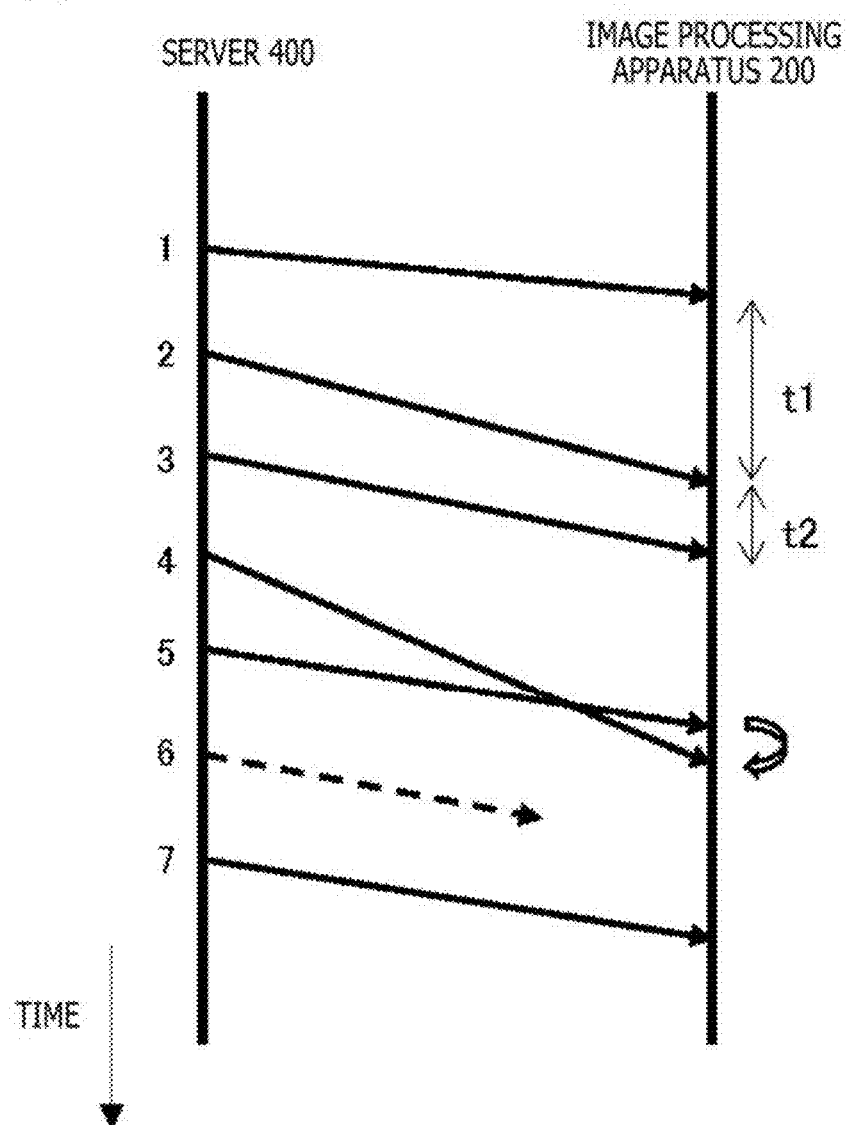
FIG. 7 is a diagram depicting an example of a transfer status of partial image data between the server and the image processing apparatus according to the present embodiment.

The example presented in FIG. 6 is an ideal case where partial image data independently transmitted from the server 400 reaches the image processing apparatus 200 approximately in the same transmission time period without delay. On the other hand, the data acquisition status of the image processing apparatus 200 easily changes when finer granularity is set for a unit of processing. FIG. 7 depicts an example of a transfer status of partial image data between the server 400 and the image processing apparatus 200.

A vertical direction in the figure represents an elapsed time period. A time period required for each of first to seventh partial image data presented on an axis of the server 400 to reach the image processing apparatus 200 is indicated by an arrow. The communication status between the server 400 and the image processing apparatus 200 may constantly change. In addition, the data size of the partial image that has undergone compression coding may change each time. In this case, the transfer time period of each piece of the partial image data varies. Accordingly, even when the partial image data is sequentially transmitted from the server 400 substantially in the same cycle, the same state is not necessarily maintained at the time of acquisition by the image processing apparatus 200.

According to the example depicted in the figure, an acquisition interval t1 between the first partial image data and the second partial image data is considerably different from an acquisition interval t2 between the second partial image data and the third partial image data. Moreover, the acquisition order of the fourth partial image data and the fifth partial image data is reversed. Further, like the sixth partial image data, data not reaching the image processing apparatus 200 may be produced by a packet loss. If the image processing apparatus 200 outputs the acquired partial image data to the display panel in the same order in the foregoing situations, impossibility of display of the original image or collapse of the display cycle may be caused as a matter of course.

Accordingly, the data acquisition status specifying section 248 recognizes the respective statuses presented in FIG. 7 with reference to the formation time of each partial image on the server 400 side. In this manner, the output target determination section 250 optimizes an output target in the display time period in each frame, and a partial image output timing. Accordingly, the communication section 426 of the server 400 may transmit a history of formation times of a predetermined number of transmitted partial images to the image processing apparatus 200 together with partial image data and the formation time of the data.

For example, the communication section 426 transmits the formation times of 64 partial images most recently transmitted, together with next partial image data. The data acquisition status specifying section 248 of the image processing apparatus 200 can recognize a lack of data or a reversed acquisition order by collating the history of the formation times with the formation time of the partial image actually acquired. Specifically, the data acquisition status specifying section 248 is configured to acquire, when a lack of data occurs, the formation time of the corresponding partial image from the history of formation times transmitted together with a subsequent partial image.

Figure 8:
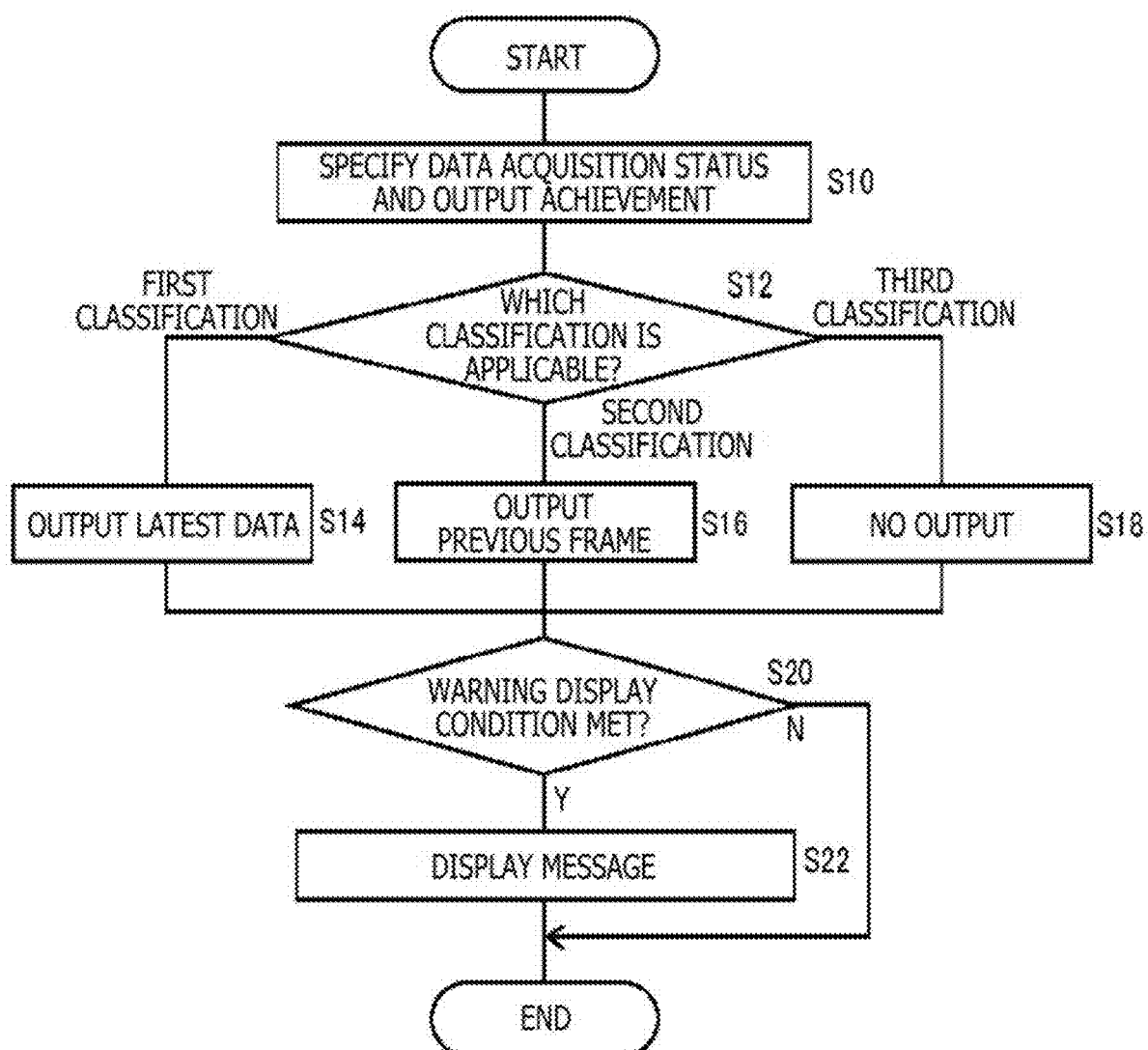
FIG. 8 is a flowchart presenting an example of a processing procedure performed by a display control section for outputting partial image data to a display panel while adjusting an output target and an output timing according to the present embodiment.

FIG. 8 is a flowchart presenting an example of a processing procedure performed by the display control section 246 for outputting partial image data to the display panel while adjusting an output target and an output timing according to the present embodiment. This flowchart indicates a processing procedure performed for a frame to be started to be displayed according to a vertical synchronized signal of the display panel such that the processing procedure is executed at a predetermined timing before the timing of this vertical synchronized signal. Accordingly, the process presented in the figure is repeated for each frame.

The data acquisition status specifying section 248 of the display control section 246 first specifies acquisition statuses of partial images contained in a target frame (S10). The data acquisition status specifying section 248 may further record in advance partial image output achievements of preceding frames, and refer to these achievements. Each of the output achievements herein is at least any one of the following pieces of data.

1. A history of classifications selected in a predetermined past time period from three classifications described below 2. A history of lacking partial images, an occurrence rate, and a lacking area rate of a partial image in a first classification described below in a predetermined past time period
3. A time period elapsed from the latest update of a display image Thereafter, the output target determination section 250 determines to which of the classifications prepared beforehand the specified statuses are applied (S12). The output target determination section 250 basically makes a comprehensive determination from various standpoints, and decides an output target for optimizing user experiences. Accordingly, the data acquisition status specifying section 248 acquires at least any one of the following parameters in S10.

1. A volume of acquired partial images in partial images constituting a target frame
2. A lacking range of each partial image in the target frame
3. A display continuation time period of the same image frame
4. A continuation time period of blackout described below
5. A time period elapsed from the formation time of each partial image One or a plurality of thresholds are set for each of the above parameters.

Thereafter, the output target determination section 250 classifies the statuses by giving scores according to ranges corresponding to parameters acquired for the target frame, or by other methods. For example, a score is given to each of the parameters acquired in S10 with reference to a table defined beforehand to classify the statuses on the basis of a distribution of scores of all parameters. According to the example depicted in the figure, three classifications are prepared. In a case of application to the first classification, the output target determination section 250 determines the latest partial image data in the data previously acquired to be an output target, and causes the output section 252 to output this data (S14).

For example, in a case where a predetermined number (predetermined rate) or more of constituting partial images are already acquired, and where each time period of the partial images elapsed from the formation time falls within an allowable range, the output target determination section 250 designates the target frame as the first classification on the basis of a score determination. At this time, the output target determination section 250 adjusts the timing such that the partial images are output in an order corresponding to the respective formation times. This output is ideally achieved sequentially from the partial image in the upper stage of the frame as depicted in FIG. 6.

However, in a case where a lacking partial image is contained in the middle of the output, further scores of the following parameters may be given to each lacking portion to determine whether to re-use the partial image at the same position in the previous frame, or cause blackout at that portion.

1. A display continuation time period of the same image frame
2. A continuation time period of blackout described below
3. A time period elapsed from the formation time of each partial image In addition, in a case of continuation of a situation where original images have not been displayed for a predetermined time period until that time, the output target determination section 250 may designate the status as the first classification even when the predetermined number (predetermined rate) or more of the partial images of the target frame are not acquired yet. The table described above for determining the scores may be set in this manner. As a result, movement of images can be expressed in an allowable range even partially. Note that the lacking images may be estimated and restored by the image processing section 244.

In a case of application to the second classification, the output target determination section 250 determines image data in a frame before the target frame to be an output target, and causes the output section 252 to output this data (S16). In this case, the same frame is continuously displayed on the display panel. For example, in a case where a predetermined number (predetermined rate) or more of partial images of the target frame have not been acquired, and where the predetermined number (predetermined rate) or more of partial images of the previous frame in a predetermined time period have been acquired, the output target determination section 250 designates the target frame as the second classification. The table described above for determining the scores may be set in this manner.

In a case of application to the third classification, the output target determination section 250 determines that none is to be output for a time period in which data of the target frame is to be output (S18). In this case, a blackout time period for one frame is produced on the display panel. For example, in a case where a predetermined value (predetermined rate) or more of partial images of the target frame are not acquired, and where a time period elapsed from the formation time is too long to continuously display the images already displayed, the output target determination section 250 designates the target frame as the third classification. The table described above for determining the scores may be set in this manner. Note that the blackout is basically achieved by displaying a black fill image. However, other colors set beforehand may be used.

After continuation of display of the second classification or the third classification for a predetermined time period, any image, even partially, may be updated by branching the display into the first classification regardless of the acquisition statuses of the partial images as described above. Note that user experiences are likely to deteriorate as the classification transits from the first classification to the third classification. Accordingly, the table is defined so as to give a higher score to each of the parameters acquired in S10 when preferable user experiences are needed.

Then, scores are given to the parameters obtained in S10 with reference to the table, and a plurality of obtained scores are summed up in S12. The display method classification for the first to the third classifications is selected on the basis of a level of the sum. A threshold is determined beforehand to designate a large sum as the first classification and a small sum as the third classification herein.

Note that the example depicted in the figure is presented only as one mode. A type of information acquired by the data acquisition status specifying section 248, a criterion for the classification determination by the output target determination section 250, and an output target of each classification are appropriately determined in advance on the basis of contents of a moving image to be displayed, an allowable degree of lack and an allowable continuation time period of a lack, an allowable display delay, an allowable display stop time period, and the like. Moreover, the display control section 246 may retain, in a not-depicted memory or the like, images accumulated during a standby for a next vertical synchronized signal, displayed images in a certain range, formation times, and determination results and scores in S10 and S12.

Moreover, the output target determination section 250 determines whether or not the status associated with the target frame corresponds to a condition requiring a warning for the user, separately from the determination in S12 (S20). For example, the output target determination section 250 determines that a warning for the user is necessary, on a condition that a time period of blackout per unit time period, or an occurrence amount of a lack of a partial image exceeds a threshold (Y in S20). At this time, the output target determination section 250 displays such a message that the communication status influences image display (S22).

This massage may be displayed while being superimposed on the partial image by the image processing section 244. The user can recognize a reason of a problem caused in the displayed image on the basis of the message. In a case where the warning condition is not met, the message is not displayed (N in S20). The process associated with the target frame is completed by the foregoing procedure, and a process for the next frame is started.

Note that the data acquisition status specifying section 248 may derive a tendency of a data transmission delay time period on the basis of an elapsed time period from the partial image formation time acquired in S10 to the processing time. For example, the data acquisition status specifying section 248 creates a histogram of the time period elapsed from the formation time of a predetermined number of partial images already acquired. Thereafter, the data acquisition status specifying section 248 detects a tendency of an increase in the elapsed time period when the histogram is biased in a direction of an increase in the elapsed time period by a reference value or longer, for example.

At this time, the data acquisition status specifying section 248 may require reduction of the size of image data to be transmitted to the server 400 via the image data acquisition section 240 or the like. For example, the data acquisition status specifying section 248 requires a skip of image data transmission by one frame, or requires a compression rate increase by a predetermined amount. The data acquisition status specifying section 248 may require a decrease in screen resolution by a predetermined amount. Alternatively, the data acquisition status specifying section 248 may require the output target determination section 250 to skip image data output by one frame.

Alternatively, the data acquisition status specifying section 248 may transmit to the server 400 an elapsed time period from the formation time of the partial image to acquisition of the partial image. After acquisition of the elapsed time period by the communication section 426 of the server 400, the compression coding section 422 may create a histogram, and detect a tendency of an elapsed time period increase and reduce the size of image data to be transmitted when the histogram is biased in a direction of an elapsed time period increase, for example. Alternatively, the data acquisition status specifying section 248 may notify the server 400 of occurrence amounts of the first to the third classifications. These measures prevent a considerable delay of display of subsequent frames or a lack of data caused as a result of an increase in the delay time period.

According to the pipeline-processing performed for each partial image as described above, in a system configured such that the image processing apparatus 200 as a client receives and causes display of image data generated by the server 400, the server 400 compression-codes and transmits the image data in units of a partial image smaller than one frame. The image processing apparatus 200 also decoding-decompresses the data in units of a partial image, and sequentially outputs the data to the display panel after performing necessary processing. In this manner, both the server 400 and the image processing apparatus 200 are capable of performing pipeline-processing with finer granularity than one frame.

As a result, the standby time period becomes shorter than that in a process performed in units of a frame, and therefore, a delay time period that occurs between image drawing and display can be reduced. Moreover, the server 400 transfers the formation time of partial image data together with the partial image data. Accordingly, even when independent data is sequentially transmitted in a short cycle, the image processing apparatus 200 achieves progress in display such that the order of images formed by the server 400 can be reproduced.

Moreover, lacking partial images are recognizable on the basis of the formation time. Accordingly, the mode for displaying the latest data, the mode for reusing data of a previous frame, or the mode for outputting nothing can be appropriately selected according to contents of display, a display policy, or the like. Available measures for various statuses associated with data transfer increase. Accordingly, display with reduced delays and reduced troubles is achievable by taking measures in such a manner as to prevent deterioration of user experiences.

3. Reprojection Process by Image Processing Section

Figure 9:
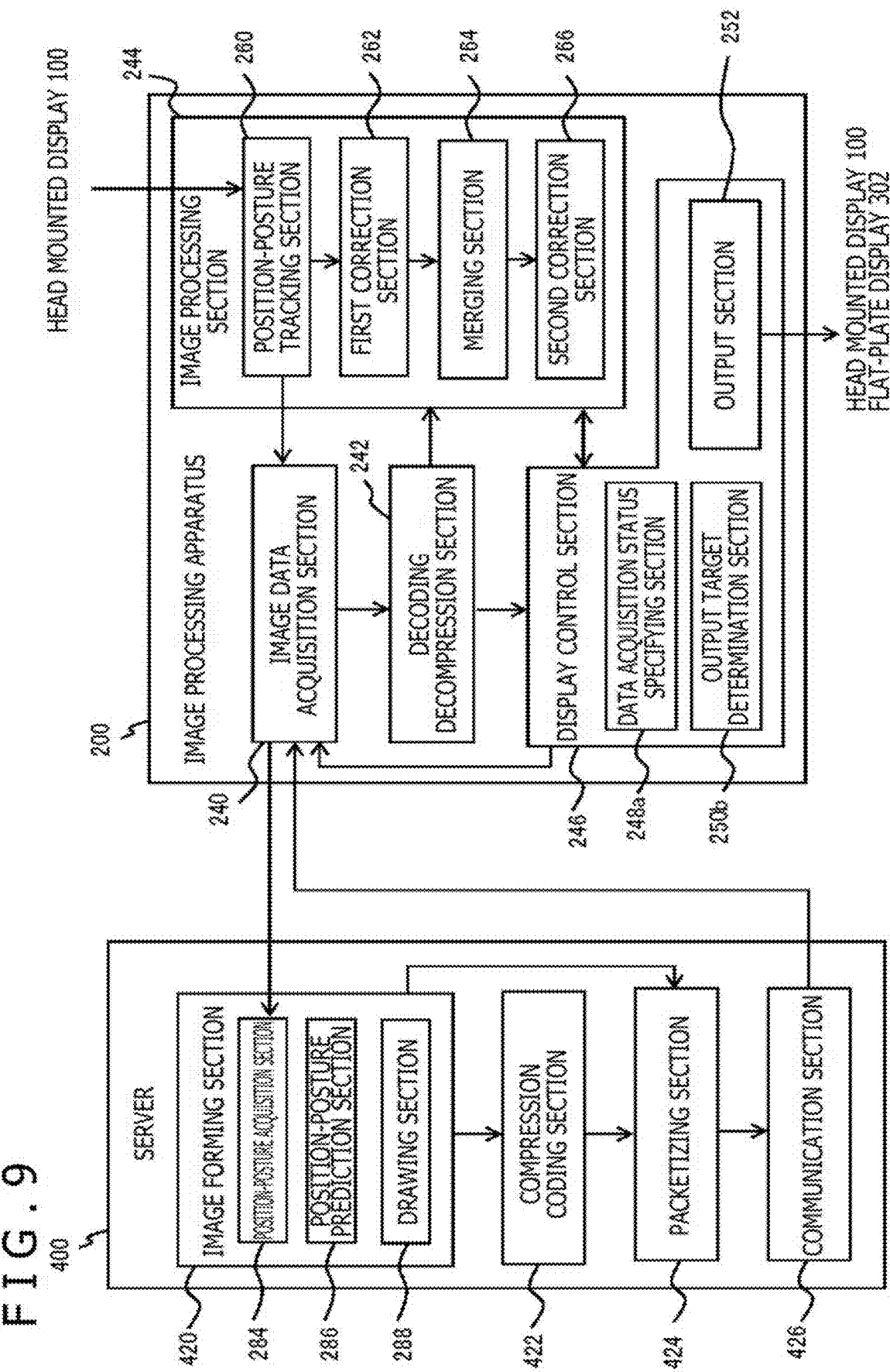
FIG. 9 is a diagram depicting a configuration of function blocks of the image processing apparatus having a reprojection function according to the present embodiment.

The image processing apparatus 200 having a function of reprojection will be subsequently described. FIG. 9 depicts a configuration of function blocks of the image processing apparatus 200 having a reprojection function, and of the server 400 having a corresponding function. Reprojection refers to a process which corrects an image once drawn according to a position or a posture of the head of the user that is taken immediately before display in a mode for displaying an image in a visual field corresponding to movement of the head using the head mounted display 100.

For example, in a case where image data is transmitted from the server 400 as in the present embodiment, even when an image is formed according to a position or a posture of the head mounted display 100 acquired on the server side, a position or a posture changed during a transfer time period of the data is not reflected in the image. Similarly, when correction according to the position or the posture of the head is made by the image processing apparatus 200 side, a change of the position or the posture produced during this correction process is not reflected in the image in a case of correction in units of a frame.

As a result, with respect to the movement of the head, an unignorable delay is produced in the display image. In this case, quality of user experiences may be lowered by a decrease in a sense of immersion in virtual reality or by visually induced motion sickness. As described above, more responsive display is achievable by implementing pipeline-processing in units of a partial image, and then performing correction for reflecting a position or a posture of the head for each partial image immediately before display.

Note that PCT Patent Publication No. WO2019/026765 discloses a rendering apparatus and a head mounted display for implementing reprojection in units of a frame, for example. According to this technology, the rendering apparatus draws an image according to a predicted position or a predicted posture of the head mounted display that is to be taken at the time of frame display. The head mounted display further corrects the image on the basis of a difference between this prediction value and the latest position or the latest posture before displaying the image. In a case where the rendering apparatus is constituted by a server herein, a transfer route to the head mounted display, and also a transfer time period are variable. In this case, deviation difficult to correct may be produced between the prediction value of the position or the posture and an actual position or an actual posture.

According to the present embodiment, therefore, a time period from image formation to display is reduced by performing pipeline-processing in units of a partial image, and also a display target is changed according to the level of deviation. The server 400 in FIG. 9 includes the image forming section 420, the compression coding section 422, the packetizing section 424, and the communication section 426. The image processing apparatus 200 includes the image data acquisition section 240, the decoding decompression section 242, the image processing section 244, and the display control section 246.

The compression coding section 422, the packetizing section 424, and the communication section 426 of the server 400, and the image data acquisition section 240 and the decoding decompression section 242 have functions similar to the corresponding functions described with reference to FIG. 5. However, it is not intended that these functions be limited to the functions described above. For example, the image data acquisition section 240 may acquire partial image data not compression-coded from the server 400. In this case, the functions of the compression coding section 422 of the server 400 and the decoding decompression section 242 of the image processing apparatus 200 may be eliminated. On the other hand, in a case where the compression coding process by the server 400, the decoding decompression process by the image processing apparatus 200, or the like is implemented, a remarkable delay is easily produced by the necessity of a time period from image drawing to display. In this case, an effect of reprojection is more easily exerted.

Moreover, the server 400 may provide a multiplayer game, a live distribution of a sporting event, or the like where a plurality of players participate. In this case, the server 400 continuously acquires movement of the head of each of the plurality of users, forms an image in a visual field corresponding to the movement, and then distributes the image to the image processing apparatus 200 of each of the users by streaming distribution. In the case of the multiplayer game, the server 400 draws images of a virtual world as viewed from viewpoints of the respective players on the basis of footprints of the players in a three-dimensional space. Moreover, in the case of sport broadcasting, the server 400 forms images corresponding to viewpoints of respective users on the basis of images of competition states captured by a plurality of cameras dispersedly located.

The image forming section 420 of the server 400 includes a position-posture acquisition section 284, a position-posture prediction section 286, and a drawing section 288. The position-posture acquisition section 284 acquires information associated with a position or a posture of the head of a user wearing the head mounted display 100 from the image processing apparatus 200 at a predetermined rate. The position-posture prediction section 286 predicts a position or a posture of the user at the time when a formed image frame is displayed. Specifically, the position-posture prediction section 286 obtains a delay time period that occurs between formation of the image frame and display on the head mounted display 100, and predicts a change of the position or the posture acquired by the position-posture acquisition section 284 after an elapse of this delay time period.

The delay time period is derived on the basis of processing performance of the server 400 or the image processing apparatus 200, a delay time period produced in a transfer path, or the like. Thereafter, a change amount of the position or the posture is obtained by multiplying a translational speed or an angular speed of the head mounted display 100 by the delay time period, and the change amount is added to the position or the posture acquired by the position-posture acquisition section 284. The drawing section 288 sets a view screen on the basis of information associated with the predicted position or the predicted posture, and draws an image frame. In this case, the packetizing section 424 acquires a prediction value of the position or the posture of the user head used as a premise at the time of drawing of the image frame from the image forming section 420 together with the formation time of the image frame, and associates the prediction value with partial image data.

As a result, the image data acquisition section 240 of the image processing apparatus 200 acquires the formation time of the partial image data and the prediction value of the position or the posture of the user head, together with the partial image data. Note that the communication section 426 of the server 400 may transmit a predetermined number of prediction values of the position and the posture transmitted most recently together with next partial image data so as to prepare for a case where a lack of partial image data is produced in the middle of transfer, or where the arrival order at the image processing apparatus 200 is reversed. In addition, focusing on the reprojection process, the image processing apparatus 200 may acquire the formation time for each frame from the server 400 instead of the formation time for each partial image. In the former case, a delay time period described below is obtained in units of a frame.

The image processing section 244 of the image processing apparatus 200 includes a position-posture tracking section 260, a first correction section 262, a merging section 264, and a second correction section 266. The position-posture tracking section 260 acquires an image captured by at least any one of cameras provided on the head mounted display, or a measurement value obtained by a motion sensor built in the head mounted display 100, and derives a position or a posture of the head of the user from the image or measurement value at a predetermined rate.

Any one of various types of methods conventionally practicalized may be adopted for deriving the position or the posture of the head as described above. Alternatively, information associated with these items may be derived within the head mounted display 100, and the position-posture tracking section 260 may be configured to only acquire this information from the head mounted display 100 at a predetermined rate. This information is transmitted to the server 400 via the image data acquisition section 240. At this time, the information is transmitted while being associated with the transmission target, i.e., a captured image corresponding to a source of the information indicating the position or the posture of the head, and the time at which the measurement value is obtained by the motion sensor.

The first correction section 262 performs reprojection processing for a partial image transmitted from the server 400, on the basis of a difference between the position or the posture of the head most recently acquired by the position-posture tracking section 260, and the prediction value of the position or the posture taken at the time of formation of the partial image by the server 400. Note that the difference on the basis of which reprojection is performed may be at least either the position of the user head or the posture of the user head. These position and posture are collectively referred to as "a position or a posture" herein.

The first correction section 262 may obtain the latest and exact position-posture information at the time of correction by interpolating position-posture information acquired at predetermined time intervals. Thereafter, the first correction section 262 performs correction by deriving a difference between the position or the posture taken at the time of correction and the prediction value of the position or the posture. More specifically, the first correction section 262 creates a displacement vector map which indicates a displacement vector on an image plane to express a position to which a pixel of an image that has not yet been corrected is displaced by correction.

Thereafter, a pixel position of a displacement destination is acquired with reference to the displacement vector map for each pixel constituting a partial image to form a partial image after correction. At this time, an area of the image formed from the partial image that has not yet been corrected may change after correction. The first correction section 262 starts a correction process with reference to the displacement vector map at the time when partial image data that has not yet been corrected and is necessary for forming partial image data that has undergone correction is stored in a local memory in a preceding stage. In this manner, processing in units of a partial image is also achievable for the image after correction.

In a case where an image transmitted from the server 400 does not have distortion for the ocular lens, the first correction section 262 may also simultaneously perform correction for giving this distortion. In this case, the displacement vector indicated by the displacement vector map for each pixel is a vector produced by combining a displacement vector for reprojection and a displacement vector for distortion correction. The displacement vector for distortion correction of these vectors is ocular-lens specific data, and is not changeable with movement or the like of the user. Accordingly, this displacement vector may be created beforehand.

The first correction section 262 performs correction after updating the displacement vector map by combining the displacement vector for distortion correction prepared as described above with the displacement vector necessary for reprojection. In this manner, reprojection and distortion correction for the ocular lens are simultaneously achievable by one displacement for each pixel of the partial image. In addition, concerning the displacement vector map, an image with a shorter delay from movement of the head can be displayed in the entire frame by updating each region corresponding to the partial image and reflecting the most recent position or the most recent posture of the head.

The merging section 264 merges the partial image for which correction such as reprojection has been performed with an UI plain image in units of a partial image. However, the target to be merged with the partial image by the merging section 264 is not limited to the UI plain image, and may be any image such as an image captured by a camera of the head mounted display 100. In any case, distortion for the ocular lens is given to the image to be merged beforehand in a case of display on the head mounted display 100.

Note that the merging process by the merging section 264 may be performed before reprojection or distortion correction by the first correction section 262. In this case, it is sufficient if correction such as distortion correction is collectively performed for the image that has undergone merging, instead of giving distortion to the image before merging. Moreover, the process performed by the merging section 264 can be omitted if no image to be merged is present. The second correction section 266 performs a remaining correction process included in the correction to be performed for the display image. For example, in a case of correction of chromatic aberration, common distortion corresponding to the ocular lens is given by the first correction section 262 regardless of primary colors of the display panel.

For example, correction for green is first performed in consideration of characteristics of human eyes viewing the display panel. Thereafter, the second correction section 266 forms a partial image of a red component by correcting only a difference between a red displacement vector and a green displacement vector. Moreover, the second correction section 266 forms a partial image of a blue component by correcting only a difference between a blue displacement vector and the green displacement vector. Accordingly, the second correction section 266 prepares in advance a displacement vector map indicating a displacement vector on an image plane to express a difference used for forming red and blue images.

In this manner, a partial image for display can be formed for each of primary colors of red, green, and blue for which different correction has been performed. Note that each of the first correction section 262, the merging section 264, and the second correction section 266 may perform pipeline-processing by implementing each processing in units of a partial image. In this case, the partial image storage section and the control section depicted in FIG. 3 may be provided in each function block. Moreover, contents or the order of the processing performed by the first correction section 262, the merging section 264, and the second correction section 266 are not particularly limited. For example, the first correction section 262 may correct chromatic aberration simultaneously with other correction with reference to the displacement vector map for each of the primary colors.

The display control section 246 basically has a function similar to the function depicted in FIG. 5. However, the display control section 246 changes a target to be output to the display panel also on the basis of a difference between a prediction value of the position or the posture and an actual position or an actual posture in addition to a time period elapsed from image drawing of the partial image. Specifically, a data acquisition status specifying section 248a specifies an original display order or display timing of partial image data, and a data acquisition status such as a lacking amount of partial image data on the basis of the difference between the prediction value of the position or the posture and the actual position or the actual posture in addition to the time period elapsed from the above formation time.

An output target determination section 250b changes a target to be output to the display panel, and appropriately adjusts an output order and an output timing according to these results. At this time, the output target determination section 250b adds a criterion resulting from the position or the posture of the user head, such as whether or not display collapses by reprojection, to the respective types of classifications presented in FIG. 8. Thereafter, in a case where no collapse is determined, the image processing section 244 performs reprojection, and the output section 252 outputs the reprojection result to the display panel. Specifically, in this case, an output target is determined by the display control section 246, and then various types of processes including reprojection are performed by the image processing section 244. Alternatively, both the determination and the processes are executed in parallel.

FIG. 10 is a diagram for explaining reprojection and distortion correction for the ocular lens performed by the first correction section 262. As schematically depicted in (a), the server 400 predicts a position or a posture of the head of a user 120, and sets a view screen 122 in a position and a direction corresponding to the predicted position or the predicted posture. Thereafter, the server 400 projects an object contained in a space of a display target and present inside a view frustum 124 onto the view screen 122.

Thereafter, the server 400 transmits partial images to the image processing apparatus 200 after compression coding for each of the partial images in an appropriate manner, for example. The image processing apparatus 200 sequentially outputs these images to the display panel after decoding decompression in an appropriate manner, for example. If a difference between a prediction value of the position or the posture obtained by the server 400 and an actual position or an actual posture is large at this time, linkage between movement of the head and display is not sufficiently achieved. In this case, the user may have a sense of strangeness, or may suffer from visually induced motion sickness. Accordingly, the first correction section 262 shifts the position of a figure in an image by this difference to reflect the most recent position or the most recent posture of the head in the display.

According to the example depicted in the figure, it is assumed that the head (face) of the user 120 has slightly moved toward the lower right from a state as of image drawing. At this time, the first correction section 262 sets a new view screen 126 so as to correspond to the latest position or the latest posture. The view screen 126 is a screen produced by shifting the original view screen 122 toward the lower right. In a case where the view screen 126 is defined by shifting the view screen 122 toward the lower right as depicted in (b), the figure shifts in an opposite direction, i.e., toward the upper left.

Accordingly, the first correction section 262 performs correction to displace the figure in the direction opposite to the displacement direction of the view screen by a displacement amount of the view screen. Note that the shift of the view screen is not limited to a two-dimensional parallel shift. The posture of the head may be changed in a three-dimensional space depending on the movement of the head. In this case, the displacement amount of the figure may change depending on the position in the image plane. A displacement vector of the figure can be calculated using an ordinary transformation used for computer graphics.

As described above, the first correction section 262 may also simultaneously perform distortion correction for the ocular lens. Specifically, as depicted in a lower stage in (b), distortion is given to an original image such that a proper image is visually recognizable without distortion as viewed through the ocular lens. An ordinary calculation formula associated with correction of lens distortion is adoptable for calculation of this process.

According to the present embodiment, however, a necessary correction amount and a necessary correction direction are in advance calculated for each pixel and prepared as a displacement vector map as described above. The first correction section 262 creates the displacement vector map by combining a displacement vector for distortion correction with a displacement vector for reprojection obtained in real time, and collectively achieves two types of correction with reference to the created displacement vector map.

Figure 11:
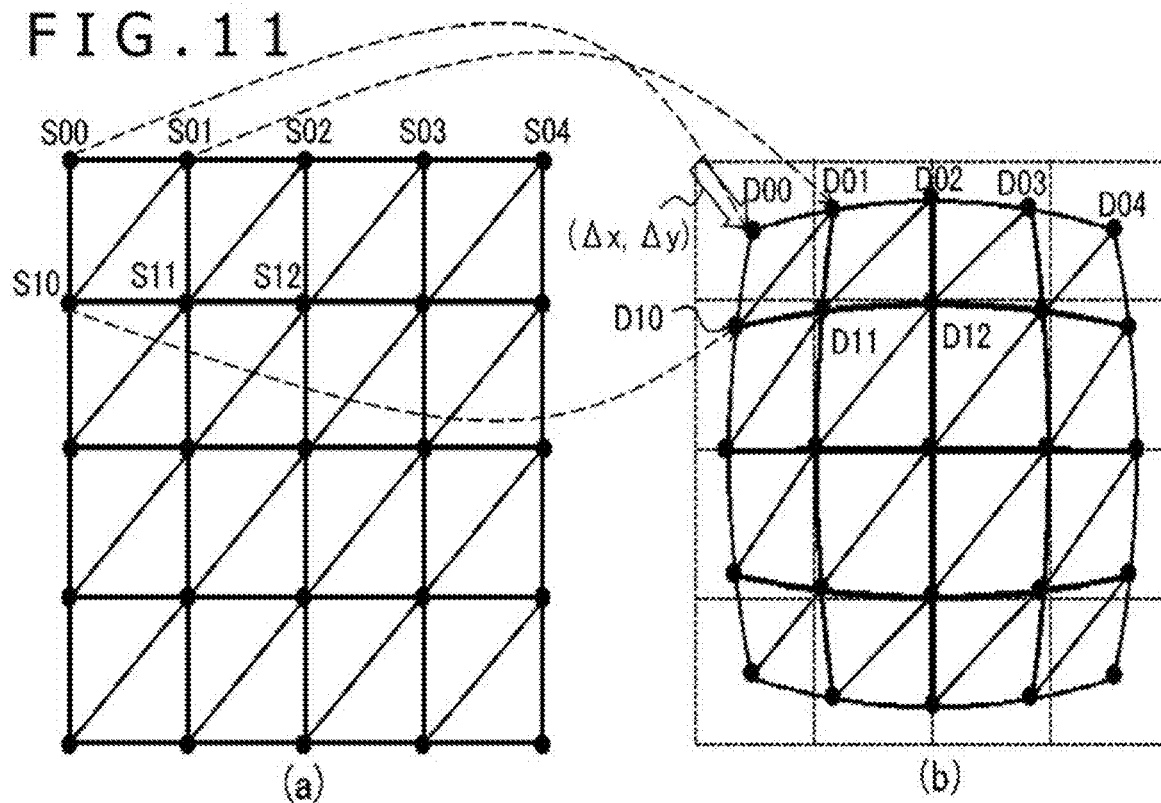
FIG. 11 is a diagram for explaining an example of a procedure of a correction process performed by the first correction section according to the present embodiment.

FIG. 11 is a diagram for explaining an example of a procedure of a correction process performed by the first correction section 262. In the figure, (a) depicts a plane of an image that has not yet been corrected while (b) depicts a plane of an image that has been corrected. S00, S01, S02, and so on in the image plane that has not yet been corrected each indicate a position at which a displacement vector is set in the displacement vector map. For example, displacement vectors are set discretely in the horizontal direction and the vertical direction of the image plane (e.g., at equal intervals for every 8 pixels or 16 pixels).

D00, D01, D02, and so on in the image plane after correction indicate displacement destination positions of S00, S01, S02, and so on, respectively. In the figure, a displacement vector (Δx, Δy) from S00 to D00 is indicated by a white arrow by way of example. The first correction section 262 maps the image that has not yet been corrected on the image that has been corrected in units of a minimum triangle having a vertex located at a pixel at which a displacement vector is set. For example, mapping is performed such that a triangle having vertexes located at S00, S01, and S10 of the image that has not yet been corrected is mapped on a triangle having vertexes located at D00, D01, and D10 of the image after correction.

The pixels inside the triangle herein are displaced linearly according to distances from D00, D01, and D10, or displaced to positions interpolated by bilinear or trilinear interpolation. Thereafter, the first correction section 262 determines pixel values of the image that has been corrected, by reading values of corresponding pixels of the partial image that has not yet been corrected, from a connected local memory. At this time, the pixel values of the image that has been corrected are derived by interpolating values of a plurality of pixels located within a predetermined range on the basis of positions read from the image that has not yet been corrected, by bilinear or trilinear interpolation.

In this manner, the first correction section 262 is capable of drawing images in an order of pixel columns of the image that has been corrected, in units of a triangle corresponding to a displacement destination of the triangle of the image that has not yet been corrected. Note that, since the first correction section 262 achieves correction reflecting the position or the posture of the head in real time as described above, the displacement vector map may be updated in units of a region corresponding to a partial image. Similarly, it is sufficient if the second correction section 266 maps pixels for each minimum triangle with reference to a displacement vector map different from that of the first correction section 262. In a case of correction of chromatic aberration, for example, an image of each primary color component can be formed using displacement vector maps different for each primary color.

Figure 12:
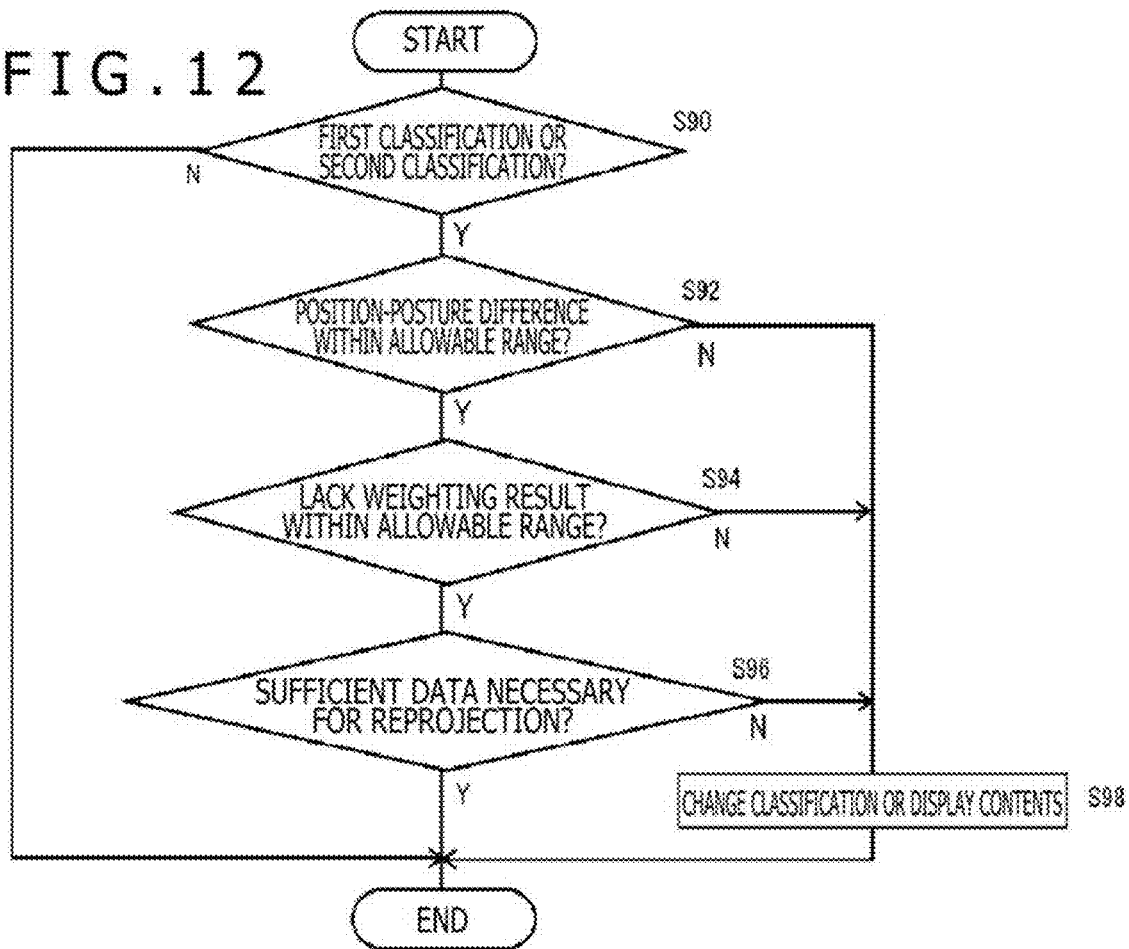
FIG. 12 is a flowchart presenting a processing procedure performed by an output target determination section of the display control section for adjusting an output target at the time of reprojection by the image processing apparatus according to the present embodiment.

FIG. 12 is a flowchart presenting a processing procedure performed by the output target determination section 250*b* of the display control section 246 for adjusting an output target at the time of reprojection by the image processing apparatus 200. This flowchart is performed after completion of the determination process in step S12 in the flowchart presented in FIG. 8. More specifically, the output target determination section 250*b* makes an additional determination for changing a classification of a frame into the third classification as necessary even when the frame is determined to be applicable to the first classification or the second classification in the determination process in S12. Accordingly, in a case of determination that the target frame is applicable to the third classification on the basis of an acquisition status of the partial image in S12 in FIG. 8, the output target determination section 250*b* ends the process without change (N in S90).

On the other hand, in a case where the target frame is determined to be applicable to the first classification or the second classification (Y in S90), the output target determination section 250*b* first determines whether or not a difference between a position or a posture of the user head predicted at the time of formation of an image frame by the server 400 and the latest position or the latest posture falls within an allowable range (S92). As described above, a transfer time period is often required in a case of transmission of data from a cloud server or the like in comparison with a case of transmission of image data from a rendering apparatus located adjacent to the head mounted display 100. In this case, deviation produced between the prediction value of the position or the posture and the actual value is likely to increase.

Accordingly, when the difference between the prediction value of the position or the posture and the actual value is too large to cover by reprojection, output of the data of the frame to the display panel is prohibited. Specifically, in a case where the difference exceeds the allowable range, the output target determination section 250b changes the classification of the target frame designated as the first classification or the second classification into the third classification (N in S92, S98). In this case, display turns into blackout display. Alternatively, the first classification may be maintained without change in a case where the original classification is the first classification, and use of a past frame may be prohibited for display of a lacking portion in S14 in FIG. 8.

A different criterion for determining whether or not the difference of the position or the posture falls within the allowable range may be set for each of a state where the entire region of the frame is constituted by the latest partial images (first classification) and a state where partial images of a past frame are used even partially (first classification or second classification). Specifically, more partial images of a past frame may be made available as the difference of the position or the posture decreases. Whether or not the difference falls within the allowable range may be determined on the basis of a magnitude relation with a threshold set for the difference of the position or the posture, or may be comprehensively determined by giving a function which decreases a score value of the allowable range as the difference of the position or the posture increases, and adding a calculated score value to the score value used for determination in FIG. 8, for example.

When it is determined that the difference of the position or the posture falls within the allowable range (Y in S92), the output target determination section 250b subsequently determines, as a degree of data lack in the target frame, whether or not a result of evaluation in terms of a viewpoint of the user falls within an allowable range (S94). Specifically, the degree of data lack is quantified into a numerical value with a weight increasing with nearness to a gaze point of the user. In a case where the numerical value exceeds a threshold, the degree of data lack is determined to be out of the allowable range. In a case where the degree of lack is out of the allowable range (N in S94), the output target determination section 250b changes the classification of the target frame designated as the first classification into the second classification or the third classification.

Alternatively, the output target determination section 250b changes the target frame designated as the second classification into the third classification (S98). In this manner, adjustment is made such that reuse of a past frame or blackout increases without output of the frame containing a data lack, as the volume of the data lack at a portion easily and visually recognizable by the user increases. Note that the determination process in S94 may be performed simultaneously with the determination process in S12 in FIG. 8. When the degree of data lack falls within the allowable range (Y in S94), the output target determination section 250b subsequently determines whether data necessary for reprojection is sufficient (S96).

Specifically, in a case where the visual field is shifted by reprojection, the output target determination section 250b determines whether or not sufficient data of the partial image contained in this visual field has been obtained. In a case where sufficient data has not been obtained (N in S96), the output target determination section 250b changes the classification of the target frame designated as the first classification into the second classification or the third classification. Alternatively, the output target determination section 250b changes the target frame designated as the second classification into the third classification (S98). In a case where sufficient data has been obtained, the output target determination section 250b ends the process without changing the original classification (Y in S96).

Note that each of S92, S94, and S96 is not limited to an independent determination. Scores may be obtained on the basis of respective determination criteria, and a sum of the scores may be calculated and used to comprehensively and simultaneously determine whether or not a change of the classification or the display contents is necessary. Any one of the processes in S14, S16, and S18 in FIG. 8 is performed according to a result of the additional determination described above. However, the image processing section 244 performs the correction process including reprojection as described above for implementing the processes in S14 and S16. Specifically, in the case of the first classification, the image processing section 244 performs reprojection for the latest image frame, or an image frame using a past frame for a lacking part.

In the case of the second classification, the image processing section 244 performs reprojection for a past frame designated as an output target. For these processes, the image processing section 244 starts the correction process after all image data in a range used for reprojection in a partial image to be processed arrives at the partial image storage section in a preceding stage. In a case where a past frame is used, the image processing section 244 reads the corresponding data from a not-depicted memory of the display control section 246. The range of the image used for reprojection is determined on the basis of a difference between a prediction value of the position or the posture and an actual position or an actual posture.

Figure 13:
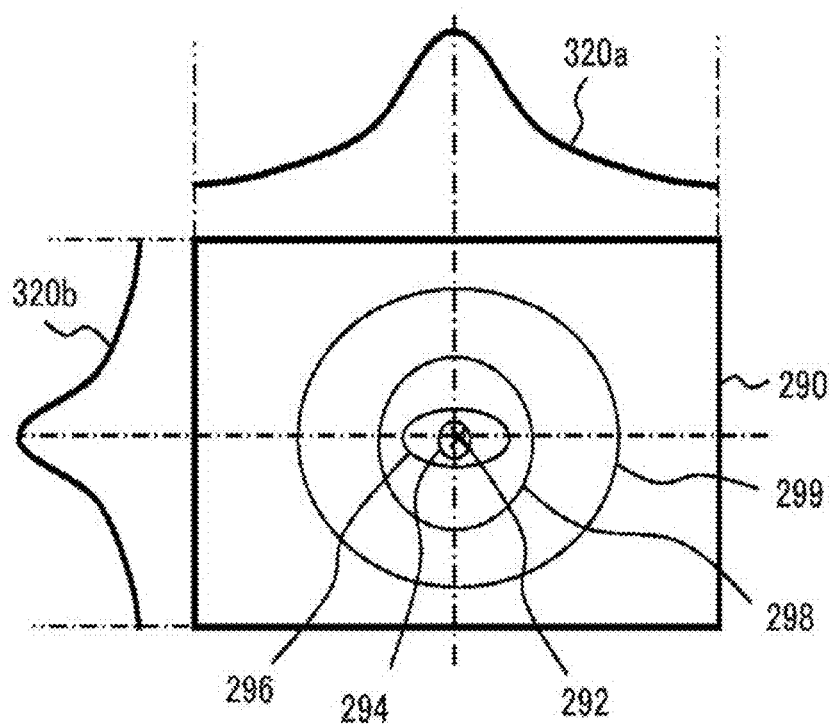
FIG. 13 is a diagram for explaining a method for quantifying a degree of data lack on the basis of a viewpoint of a user in S94 in FIG. 12.

FIG. 13 is a diagram for explaining a procedure for quantifying a degree of data lack on the basis of a viewpoint of the user in S94 in FIG. 12. In this example, it is assumed that a gaze point 292 of the user is present in the vicinity of the center of a display screen 290. The user wearing the head mounted display 100 generally faces a direction where the user desires to view. Accordingly, the center of the display screen 290 may be considered as the gaze point 292.

According to visual characteristics of an ordinary human, a region 294 corresponding to a range within 5° on an assumption that a visual line from the pupil to the gaze point is a center axis is called a discriminative visual field where visual functions such as eyesight become excellent. Moreover, a region 296 corresponding to approximately 30° in the horizontal direction and approximately 20° in the vertical direction is called an effective visual field where information is instantly receivable only by eyeball movement. Further, a region 298 corresponding to a range from 60° to 90° in the horizontal direction and a range from 45° to 70° in the vertical direction is a stable visual field, while a region 299 corresponding to a range from 100° to 200° in the horizontal direction and a range from 85° to 130° in the vertical direction is a supplementary visual field. In this manner, an ability of identifying information decreases with farness from the gaze point 292.

Accordingly, as depicted in an upper part and a left part in the figure, weighted functions 320a and 320b each increasing with nearness to the gaze point 292 are established in the plane of the display screen 290. While the figure presents the weighted functions 320*a* and 320*b* for one-dimensional positions in the plane of the display screen 290 in the horizontal direction and the vertical direction, these functions are actually functions or tables for two-dimensional positional coordinates in this plane. For example, the output target determination section 250*b* multiplies a lacking area of a partial image by a weight based on positional coordinates where the corresponding lack has been caused, and calculates a sum of the weighted lacking areas in all regions of a target frame to derive a degree of the lack as a numerical value.

In this manner, the degree of lack is estimated as a higher degree in a case where a region easily and visually recognizable lacks even when the region has the same lacking area. Accordingly, whether or not the lacking area falls within an allowable range can also be determined in consideration of an appearance impression. Note that the shapes of the weighted functions 320*a* and 320*b* depicted in the figure are presented only by way of example. These shapes may be optimized on the basis of visual characteristics or the like of the respective ranges described above, or discontinuous functions may be used. Moreover, in a case where a gaze point detector is provided on the head mounted display 100, the gaze point 292 is not limited to be the center of the display screen 290 and is obtained in a rigorous manner. In this case, it is sufficient if the output target determination section 250*b* shifts maximum positions of the weighted functions 320*a* and 320*b* according to a shift of the gaze point 292.

Figure 14:
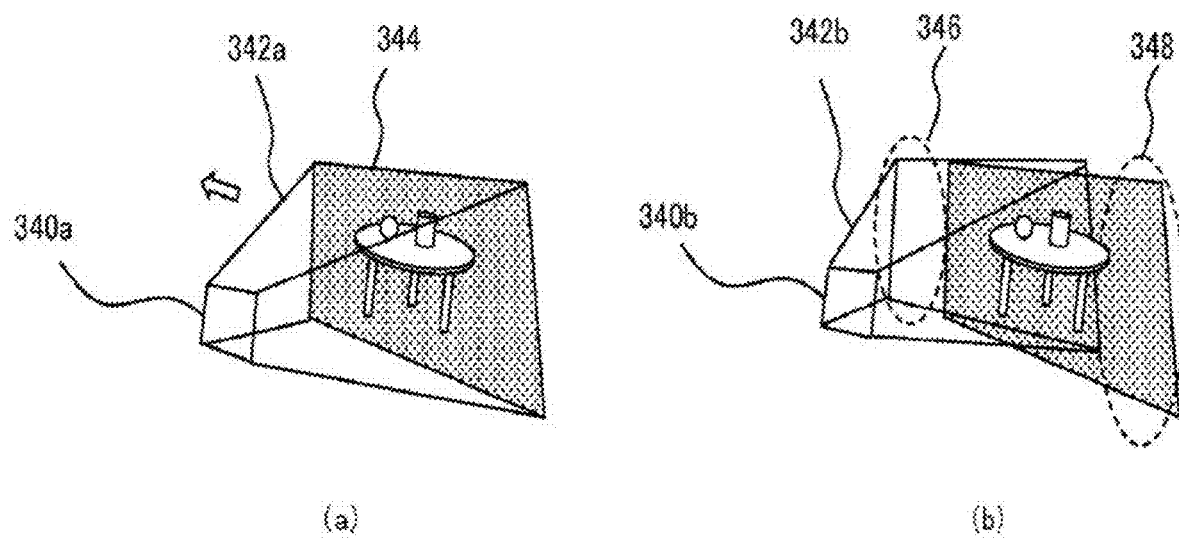
FIG. 14 is a diagram for explaining data necessary for reprojection and evaluated in S96 in FIG. 12.

FIG. 14 is a diagram for explaining data necessary for reprojection and evaluated in S96 in FIG. 12. First, (a) depicts a state where a view screen 340*a* is set in correspondence with a position or a posture predicted by the server 400. The server 400 draws, in the view screen 340*a*, an image 344 contained in a view frustum 342*a* defined by the view screen 340*a*. It is assumed herein that the position or the posture during display is directed slightly leftward with respect to the predicted position or the predicted posture as indicated by an arrow.

In this case, the image processing section 244 of the image processing apparatus 200 directs the view screen 340*b* slightly leftward as depicted in (b) to correct the image into an image corresponding to the position or the posture taken during display. However, reprojection becomes more difficult to achieve as a region 346, which is included in the image in a view frustum 342*b* newly defined and which is not transmitted from the server 400, becomes larger. Accordingly, it is determined that data is insufficient, for example, in a case where the region 346 for which data is not acquired is contained at a predetermined rate or higher in the display region that has undergone reprojection.

On the other hand, the image transmitted from the server 400 also includes a region 348 not contained in the view frustum 342*b* newly defined. In this case, data of the region 348 corresponds to a region unnecessary after reprojection, and therefore does not cause a problem even when this data is lacking. Accordingly, the output target determination section 250*b* may eliminate the corresponding region 348 from the evaluation target at the time of evaluation of a lacking area or the like in S12 in FIG. 8. In addition, even in a state where sufficient image data necessary for reprojection is acquired, the image after reprojection may become unnatural when the difference between the position or the posture predicted by the server 400 and the actual position or the actual posture is excessively large.

In other words, reprojection which is two-dimensional correction for an image drawn by the server 400 is unable to express an exact change of a visual line for a three-dimensional object to be displayed. Accordingly, the output target determination section 250*b* makes the determination in S92 separately from the determination in S96 as presented in FIG. 12. In this manner, output to the display panel is cancelled in a case of a large difference of the position or the posture. In any case, it is preferable to reduce the region 346 depicted in FIG. 14, which region is included in the region necessary for reprojection but for which data is not acquired, as much as possible regardless of movement of the user head.

Figure 15:
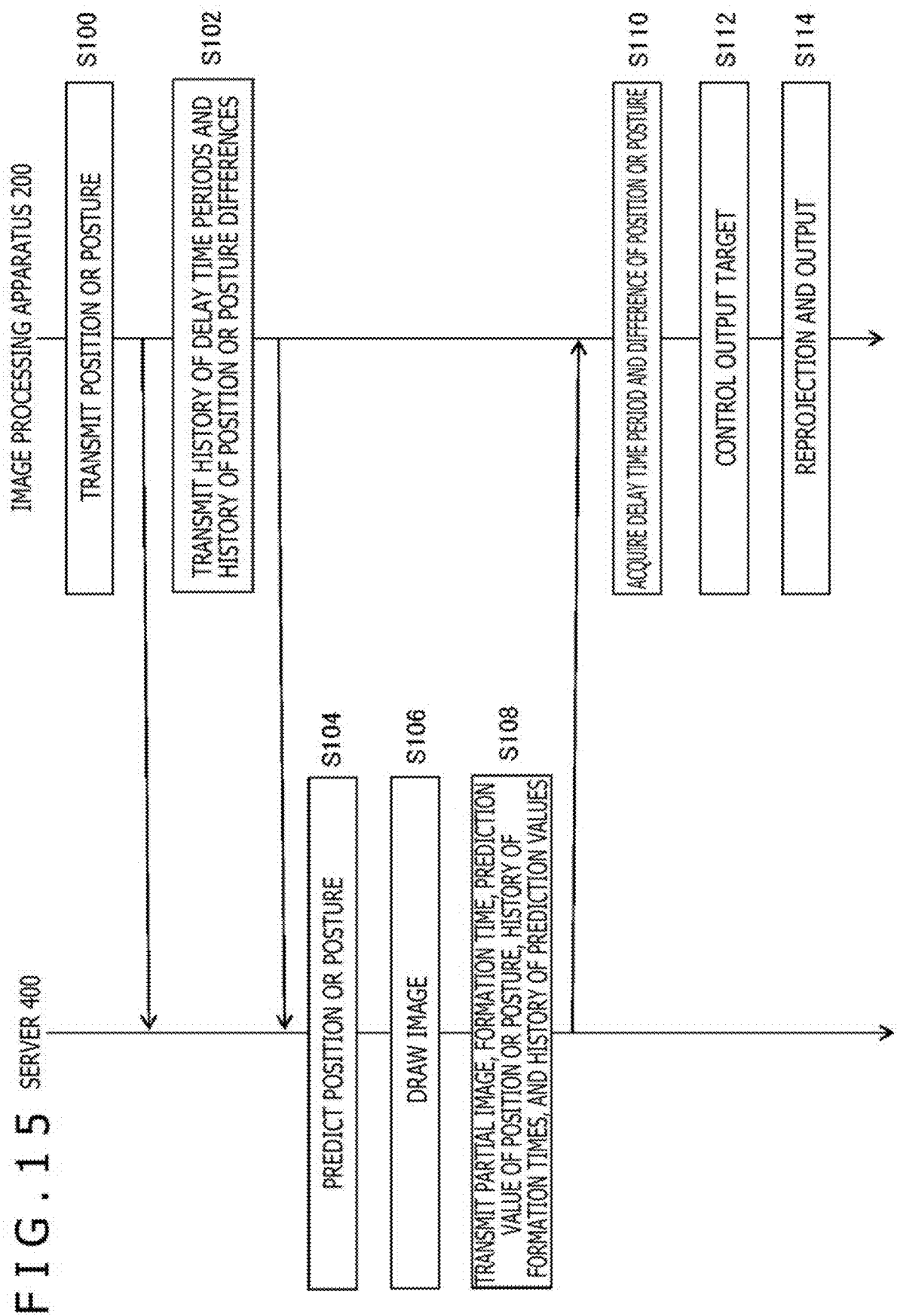
FIG. 15 is a flowchart presenting a processing procedure performed by the server and the image processing apparatus in a case where reprojection is performed by the image processing apparatus according to the present embodiment.

Accordingly, the server 400 may speculatively form an image of the region 346 and transmit the image to the image processing apparatus 200 to raise a probability of normal achievement of reprojection. FIG. 15 is a flowchart presenting a processing procedure performed by the server 400 and the image processing apparatus 200 in a case where reprojection is performed by the image processing apparatus 200. This flowchart is basically performed in units of a frame of a moving image. The image data acquisition section 240 of the image processing apparatus 200 first acquires the latest position or the latest posture of the user head from the position-posture tracking section 260, and transmits the position or the posture thus acquired to the server 400 (S100).

Moreover, the image data acquisition section 240 acquires, from the display control section 246, a history of delay time periods from the formation time at the server 400 to processing by the image processing apparatus 200 which delay time periods are produced for past frames, and a history of differences between a prediction value of a position or a posture of the user head and an actual value, and transmits the acquired histories to the server 400 (S102). Note that the transmission processes in S100 and S102 may be performed at any timing not synchronous with the frame. Moreover, a history of a predetermined number of past frames may be transmitted in S102 to prepare for a transmission failure.

The position-posture acquisition section 284 of the server 400 receives these pieces of information. The position-posture prediction section 286 predicts a position or a posture of the user head (S104). Specifically, the position-posture prediction section 286 predicts a position or a posture after an elapse of the delay time period until processing by the image processing apparatus 200 on the basis of the position and the posture transmitted from the image processing apparatus 200. Subsequently, the drawing section 288 draws an image corresponding to the predicted position or the predicted posture (S106). At this time, the drawing section 288 specifies a possible degree of deviation of the position or the posture during the delay time period predicted to come next, on the basis of the history of delay time periods and the history of differences of the position or the posture transmitted from the image processing apparatus 200. Specifically, the drawing section 288 predicts a vector indicating a most probable deviation amount and a most probable deviation direction from the prediction value of the position or the posture as indicated by the arrow in (a) in FIG. 14.

Thereafter, the drawing section 288 expands the image drawing target in the direction of displacement of the view screen by an amount of the vector. Specifically, a region outside a frame corresponding to the prediction value of the position or the posture, such as the region 346 depicted in (b) in FIG. 14, is determined on the basis of the vector indicating the predicted deviation, and an image of the region is additionally drawn. Thereafter, the packetizing section 424 packetizes the drawn image in units of a partial image as necessary, and sequentially transmits the packetized image from the communication section 426 to the image processing apparatus 200. At this time, the communication section 426 transmits the formation time of the partial image and the prediction value of the position or the posture used for image drawing in association with the partial image (S108).

The communication section 426 further transmits a history of formation times and a history of prediction values of a position and a posture for a predetermined number of partial images already transmitted, to thereby prepare for a failure in transmission to the image processing apparatus 200. When the image data acquisition section 240 of the image processing apparatus 200 receives these pieces of data, the display control section 246 acquires a delay time period that has occurred after formation of the partial image and a difference between the prediction value of the position or the posture and the actual value (S110). Thereafter, the display control section 246 classifies the frame on the basis of these pieces of data, for example, to control the output target (S112).

In cases other than the case of blackout in correspondence with the third classification, the image processing section 244 performs reprojection based on the position or the posture taken at that time for a current frame determined by the display control section 246 or a previous frame in units of a partial image, and the output section 252 outputs the processed partial image to the display panel (S114). At this time, the image processing section 244 uses an image additionally drawn by the server 400 in consideration of deviation of the prediction, as necessary.

As described above, the image processing section 244 may perform correction for removing lens distortion or chromatic aberration correction together with reprojection as necessary. Besides, focusing on reprojection, functions of the respective processes are effectively achievable even when executed in units of a frame instead of a partial image. In this case, image data additionally generated by the server 400 in consideration of deviation from the prediction value of the position or the posture may be similarly transmitted from the server 400 to the image processing apparatus 200 in units of a partial image.

According to the reprojection process performed by the image processing section described above, the server predicts a position or a posture of the user head to be taken at the time of display, and forms an image in a visual field corresponding to the predicted position or the predicted posture. Thereafter, the image processing apparatus corrects the image transmitted from the server, immediately before display, into such an image corresponding to the position or the posture of the head at that time. In this manner, preferable display followability to movement of the head is achievable even in a circumstance where this followability is likely to become a bottleneck in a mode for displaying an image distributed from the server by streaming distribution on the head mounted display.

Moreover, a delay time period that occurs between image drawing and display can be reduced by performing a series of processes from image drawing by the server to display by the head mounted display as pipeline-processing in units of a partial image. In this case, only a small-scale correction is required for reprojection. As a result, accurate reprojection requiring only simple calculations can be implemented in comparison with a case requiring a large-scale correction.

Moreover, correction independent for each pixel can be performed in reprojection by using a displacement vector map indicating correction amounts and distributions in a correction direction in an image plane. In this manner, highly accurate correction is achievable even though a partial image is a unit for correction. Further, collective correction is achievable by also inserting a component of distortion correction for the ocular lens into a displacement vector. Accordingly, a time period required for reprojection can be reduced to the minimum.

In addition, the image processing apparatus controls an output target on the basis of a difference between a position or a posture predicted by the server and an actual position or an actual posture, a degree of data lack evaluated in terms of a viewpoint of the user, an acquisition rate of image data used for reprojection, and the like as a pre-step for reprojection. For example, in a case where a result of reprojection based on the latest data is estimated to be unpreferable, this result is not displayed, or data in a past frame is designated as a target of reprojection. Moreover, the server further predicts deviation of the predicted position or the predicted posture, and speculatively forms an image of a corresponding region. These processes can improve the result of reprojection as much as possible, and realize display of a high-quality image with high responsivity.

4. Data Forming Process for Different Display Modes

As depicted in FIG. 1, the image display system 1 according to the present embodiment has a function of causing the head mounted display 100 and the flat-plate display 302 to simultaneously display an image of the same contents. In a case of a virtual reality game or other types of games using the head mounted display 100, display contents are not recognizable for a person other than the user wearing the head mounted display 100. Accordingly, it is difficult for a plurality of users to view and listen to game progress together and share realistic sensation in a unified manner.

Accordingly, as described above, there is an idea that contents displayed on the head mounted display 100 are simultaneously displayed also on the flat-plate display 302 to allow the contents to be shared by a plurality of users. Moreover, in a case where common content is viewed and listened to by a plurality of users each using the head mounted display 100, images for different viewpoints need to be formed and displayed on the basis of positions or postures of the heads of the respective users.

A format of images to be displayed is considerably different for each of the head mounted display 100 and the flat-plate display 302. However, formation and transmission of data of a plurality of images in different formats by the server 400 are ineffective in some cases in terms of a transmission band and a processing load. Accordingly, sharing and the timing of data format conversion are appropriately selected by cooperative operations of the server 400 and the image processing apparatus 200 to efficiently display images in a plurality of modes.

Figure 16:
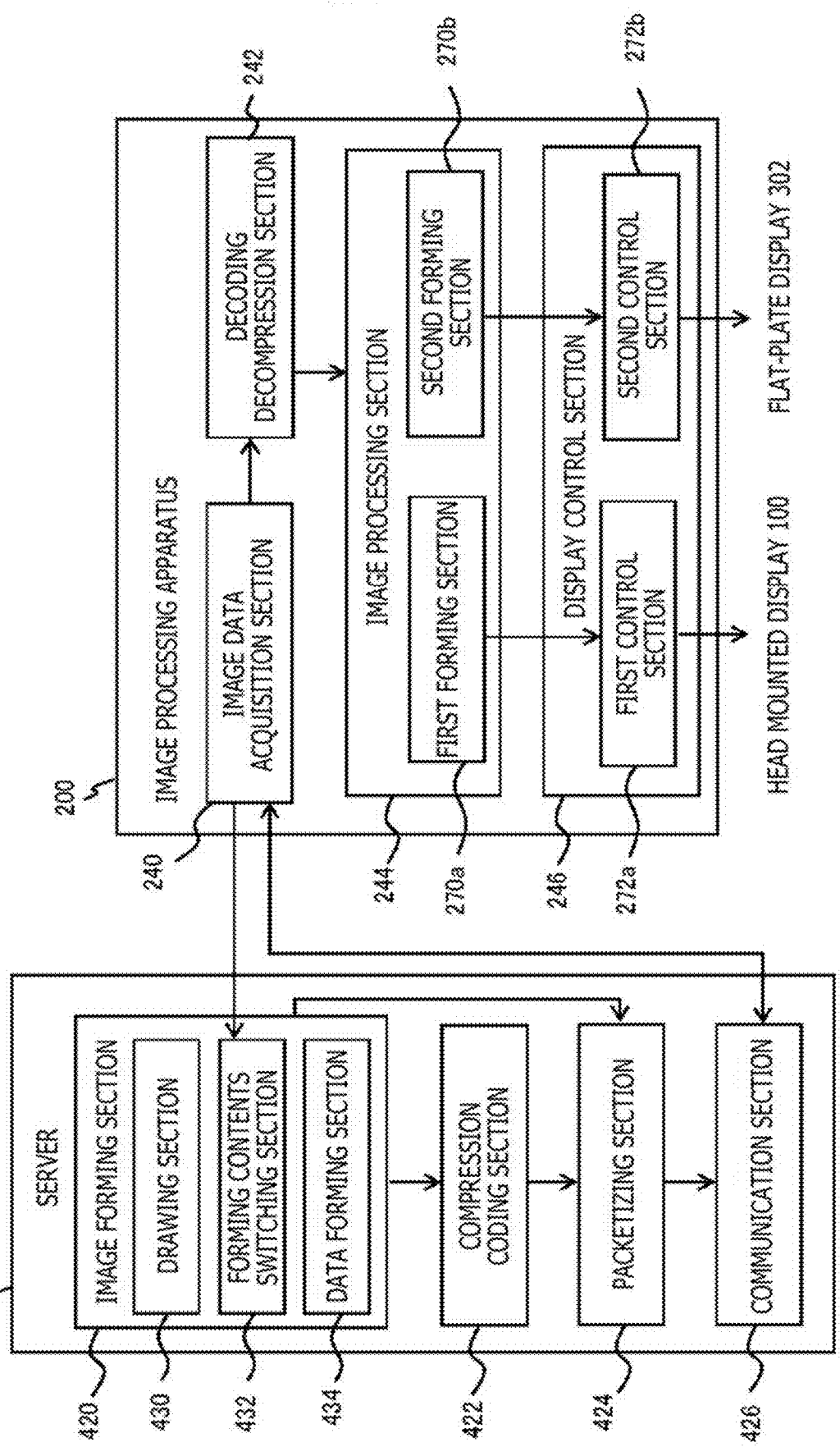
FIG. 16 is a diagram depicting a configuration of function blocks of the server and the image processing apparatus capable of handling display on a plurality of display devices in different forms according to the present embodiment.

FIG. 16 depicts a configuration of function blocks of the server 400 and the image processing apparatus 200 capable of handling display on a plurality of display devices in different modes. The server 400 includes the image forming section 420, the compression coding section 422, the packetizing section 424, and the communication section 426. The image processing apparatus 200 includes the image data acquisition section 240, the decoding decompression section 242, the image processing section 244, and the display control section 246. The compression coding section 422, the packetizing section 424, and the communication section 426 of the server 400, and the image data acquisition section

240 and the decoding decompression section 242 of the image processing apparatus 200 have functions similar to the corresponding functions explained with reference to FIG. 5.

However, it is not intended that these functions be limited to those described above. For example, the server 400 may transmit partial image data not compression-coded. In this case, the functions of the compression coding section 422 of the server 400 and the decoding decompression section 242 of the image processing apparatus 200 may be eliminated. Moreover, the image processing section 244 of the image processing apparatus 200 may further have at least any one of the respective functions depicted in FIG. 9.

The image forming section 420 of the server 400 includes a drawing section 430, a forming contents switching section 432, and a data forming section 434. Note that each of the drawing section 430 and the data forming section 434 may be implemented by a combination of the image drawing section 404 (GPU) and the drawing control section 402 (CPU) in FIG. 3 and software. The forming contents switching section 432 may be implemented by a combination of the drawing section 402 (CPU) in FIG. 3 and software. The drawing section 430 forms frames of a moving image at a fixed or variable rate. The image drawn herein may be an ordinary image independent of the mode of the display device connected to the image processing apparatus 200. Alternatively, the drawing section 430 may sequentially acquire frames of a captured moving image from a not-depicted camera.

The forming contents switching section 432 switches between forming processes necessary for providing a format corresponding to the display mode of the display device connected to the image processing apparatus 200, under a predetermined rule to designate contents of a process to be performed by the server 400. In a simplest manner, the forming contents switching section 432 prepares images for the left eye and for the right eye according to whether or not the head mounted display 100 is connected to the image processing apparatus 200, and determines whether or not to give distortion corresponding to the ocular lens.

At least a part of the correction process performed by the image processing apparatus 200 can be eliminated by transmitting an image to the image processing apparatus 200 to which the head mounted display 100 is connected, after processing the image on the server 400 side. Particularly in a case where the image processing apparatus 200 not having abundant processing resources is used, display of data transmitted from the server 400 substantially without a necessity of change contributes to display with a reduced delay.

On the other hand, when images for the left eye and the right eye to each of which distortion for the ocular lens is given are transmitted from the server 400 in a state where the flat-plate display 302 is further connected to the image processing apparatus 200, a process for cutting out one of the images or a process for removing distortion is required. In this case, a processing load may further increase. When images in a plurality of formats are transmitted from the server 400, a necessary transfer band increases.

Accordingly, the forming contents switching section 432 is configured to transmit an image in a most efficient format to the image processing apparatus 200 without increasing a transfer band by appropriately selecting a process to be performed on the server 400 side according to a situation. Moreover, the forming contents switching section 432 is configured to transmit an image in a format achieving best image quality and a minimum display delay according to a use application. Specifically, the forming contents switching section 432 determines processing contents on the basis of at least one of a mode of the display device connected to the image processing apparatus 200, processing performance of a correction section performing an additional forming process in the image processing apparatus 200, characteristics of a moving image, and a communication status with the image processing apparatus 200.

Examples of the mode of the display device herein include a resolution, a handleable frame rate, a handleable color space, an optical parameter in a case of viewing through a lens, and the number of display devices. For example, the communication status is a communication bandwidth achieved at that time, or a communication delay. These pieces of information may be acquired from the image data acquisition section 240 of the image processing apparatus 200.

The forming contents switching section 432 determines whether or not to form images for the left eye and the right eye in correspondence with the display mode of the head mounted display 100, whether or not to perform distortion correction for the ocular lens, and the like on the basis of these pieces of information. However, necessary processes are not limited to these processes depending on the display mode desired to be achieved by the image processing apparatus 200 of each of the users. Various processes such as reduction of resolution and deformation of images may be required. Accordingly, candidates of processing contents determined by the forming contents switching section 432 are appropriately set in advance according to the necessary processes.

The data forming section 434 performs a part of forming processes necessary for providing the format of respective frames of a moving image in correspondence with the display mode achieved by the image processing apparatus 200 according to a determination made by the forming contents switching section 432. The communication section 426 transmits image data appropriately formed in this manner to the image processing apparatus 200. In a case where a plurality of image processing apparatuses 200 are designated as transmission destinations, the data forming section 434 performs forming processes suited for the respective image processing apparatuses 200.

Even when the connected display device has a plurality of display modes, image data in one format appropriately selected is transmitted to the one image processing apparatus 200 to avoid an increase in a necessary communication band. The communication section 426 adds, to image data, information indicating what type of forming process has been performed on the server 400 side, and transmits the information together with the image data. Image data in a suited format and information indicating contents of the forming process are transmitted in association with each other to each of a plurality of image processing apparatuses 200 each achieving a different display mode.

The image processing section 244 of the image processing apparatus 200 includes, as a correction section, a first forming section 270a (first correction section) and a second forming section 270b (second correction section) for correcting an image transmitted from the server 400 into a format corresponding to the display mode to be achieved. According to the example depicted in the figure, the image processing apparatus 200 to which the head mounted display 100 and the flat-plate display 302 are connected is assumed. Accordingly, the two forming sections constituted by the first and second forming sections are provided in correspondence with the head mounted display 100 and the flat-plate display 302. Needless to say, forming sections may be provided in a number same as the number of display modes to be achieved.

Specifically, the image processing section 244 has a function for forming a plurality of frames each having a different format from one frame transmitted from the server 400. The number of frames is dependent on the number of display modes to be achieved. Each of the first forming section 270a and the second forming section 270b determines a process necessary for changing the relevant format into the format associated with the corresponding display mode on the basis of contents of the forming process performed on the server 400 side and transmitted together with the image data from the server 400.

Note that the function of the first forming section 270a or the second forming section 270b may be eliminated depending on the contents of the forming process performed on the server 400 side. For example, in a case where image data displayable without change is transmitted from the server 400 to the head mounted display 100, the process performed by the first forming section 270a corresponding to the head mounted display 100 may be eliminated.

Moreover, in a modification, either the first forming section 270a or the second forming section 270b may perform a forming process necessary for an image formed by the other forming section. For example, the second forming section 270b may perform a forming process for an image for the head mounted display 100 formed by the first forming section 270a, to thereby form an image for the flat-plate display 302.

Further, the respective image processing presented by the image processing section 244 in FIG. 9 may be combined with a forming process corresponding to the display mode in an appropriate manner. For example, the merging section 264 is incorporated immediately before the first forming section 270a and the second forming section 270b. In this case, an image captured by a camera provided on the head mounted display 100 or an UI plain image is merged with a frame transmitted from the server 400, and then the image is formed into an image in the display format of the head mounted display 100 by the first forming section 270a, and formed into an image in the display format of the flat-plate display 302 by the second forming section 270b.

The merging section 264 may be incorporated immediately after the first forming section 270a and the second forming section 270b. In this case, the image to be merged needs to be formed in advance into an image in the formats corresponding to the respective images formed by the first forming section 270a and the second forming section 270b. Moreover, the first forming section 270a may have the function of the first correction section 262 depicted in FIG. 9 to perform reprojection.

In any case, each of the first forming section 270a and the second forming section 270b creates a displacement vector map as described above, and performs correction for each partial image on the basis of the displacement vector map. In a case where the first forming section 270a executes reprojection or distortion correction, the first forming section 270a may collectively achieve a plurality of types of correction by creating a displacement vector map produced by combining displacement vectors of the reprojection or the distortion correction.

The display control section 246 includes a first control section 272a and a second control section 272b that output images formed by the first forming section 270a and the second forming section 270b to the display panels of the head mounted display 100 and the flat-plate display 302, respectively. As described above, transmission from the server 400 and processes performed within the image processing apparatus 200, including processes performed by the first forming section 270a and the second forming section 270b, are sequentially performed in units of a partial image. Accordingly, each of the first control section 272a and the second control section 272b includes a partial image storage section for storing data that has undergone the forming process.

Figure 17:
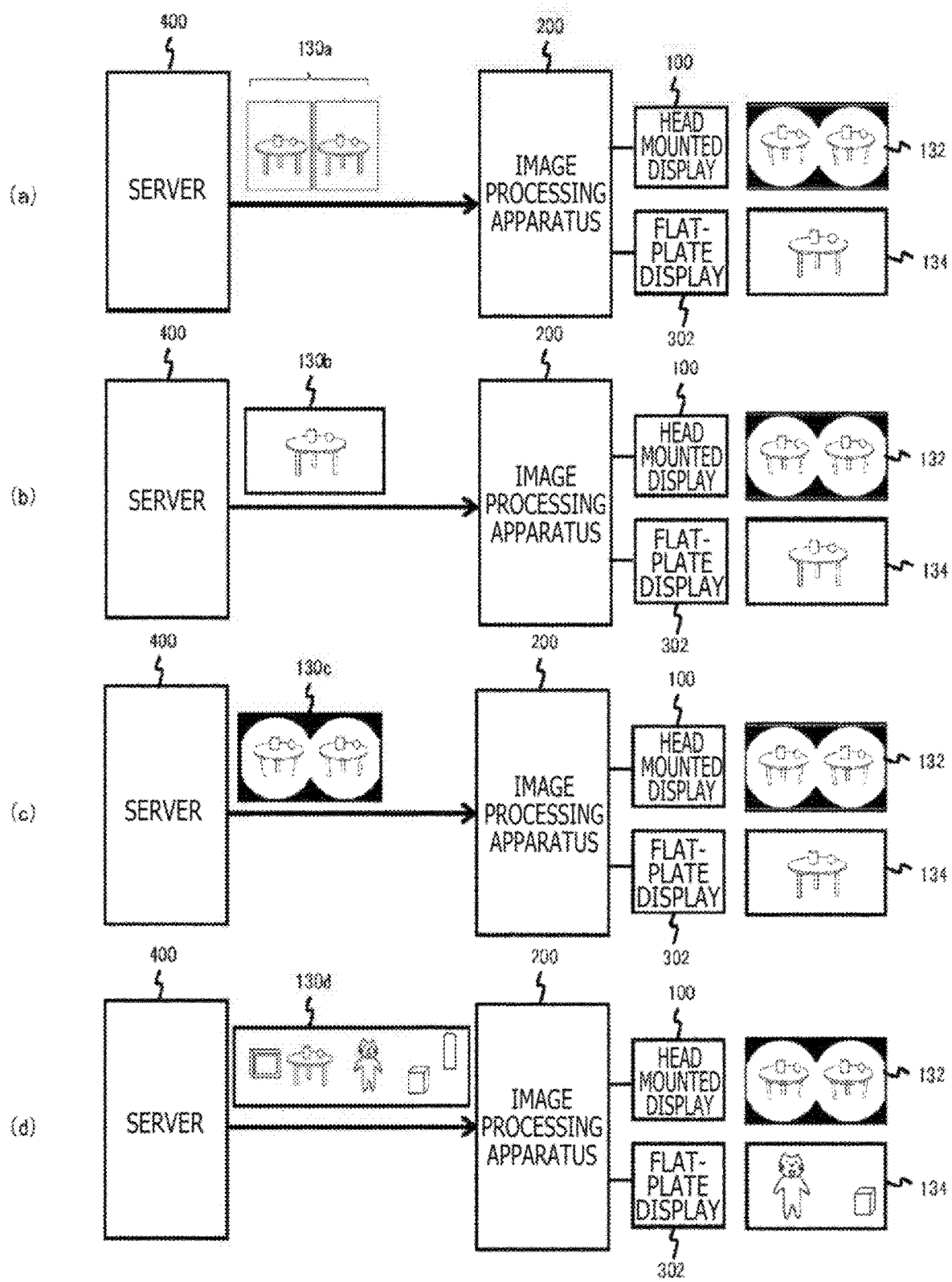
FIG. 17 is a diagram depicting a transition of an image format achievable in the present embodiment, by way of example.

FIG. 17 depicts a transition of an image format achievable in the present embodiment, by way of example. As depicted in FIG. 16, it is assumed that the head mounted display 100 and the flat-plate display 302 are connected to the image processing apparatus 200. While four patterns (a), (b), (c), and (d) are depicted in the figure, final formats of images to be displayed on the head mounted display 100 and the flat-plate display 302 are not limited to these patterns.

Specifically, an image 132 to be displayed on the head mounted display 100 is constituted by an image for the left eye and an image for the right eye each having a format (first format) to which distortion for the ocular lens has been given. An image 134 to be displayed on the flat-plate display 302 is constituted by one image common to both of the eyes, and has a format (second format) of an ordinary image having no lens distortion or the like.

On the other hand, (a) is a pattern where the server 400 side forms a pair 130a constituted by an image for the left eye and an image for the right eye. In this case, the first forming section 270a of the image processing apparatus 200 gives distortion for the ocular lens of the head mounted display 100 to a transmitted image. As described above, correction such as reprojection may be further performed in combination with the first correction section 262. The second forming section 270b cuts out either the left-eye image or the right-eye image, and adjusts the image size to an appropriate size.

The pattern (b) is a pattern which transmits an image 130b suited for the flat-plate display from the server 400. In this case, the data forming section 434 of the server 400 need not perform any forming process for an image drawn by the drawing section 430. Thereafter, the first forming section 270a of the image processing apparatus 200 forms images for the left eye and the right eye using the transmitted image, and then gives distortion for the ocular lens to the formed images. As described above, correction such as reprojection may be further performed in combination with the first correction section 262. In this case, the forming process performed by the second forming section 270b may be eliminated.

The pattern (c) is a pattern where the server 400 side forms images for the left eye and the right eye for the head mounted display 100, and then forms an image 130c to which distortion for the ocular lens has been given. In this case, the forming process performed by the first forming section 270a of the image processing apparatus 200 may be eliminated. However, correction such as reprojection may be performed by the first correction section 262. The second forming section 270b cuts out either the left-eye image or the right-eye image, performs correction for removing distortion, and then adjusts the image size to an appropriate size.

The pattern (d) is a pattern which transmits a panorama image 130d from the server 400. Generally, the panorama image 130d herein is an omnidirectional image (360° image) expressed using equirectangular projection. However, the format of the image is not particularly limited, and may be any format such as polyconic projection, equidistant projection, and various types of formats used for image expression of fisheye lenses. Moreover, in a case where images formed using a fisheye lens are adopted, the server 400 may form a 360° panorama image by using images for two eyes.

However, the panorama image is not limited to an image captured by a camera, and may be an image viewed from a plurality of virtual start points and drawn by the server 400. In this case, the data forming section 434 of the server 400 need not perform any forming process for the panorama image drawn by the drawing section 430. Thereafter, the first forming section 270*a* of the image processing apparatus 200 cuts out regions in visual fields of the left eye and the right eye, corresponding to the latest position or the latest posture of the user head, from images transmitted from the first forming section 270*a* of the image processing apparatus 200, and forms images for the left eye and the right eye.

Moreover, in a case where the transmitted image contains distortion produced by the lens of the camera, or distortion produced by equirectangular projection, polyconic projection, equidistant projection, or the like, the first forming section 270*a* removes the distortion and then gives distortion for the ocular lens of the head mounted display 100. Clearances between cones of the image formed by polyconic projection are connected to each other considering distortion of the ocular lens. In addition, correction may be collectively achieved using a displacement vector map in combination with at least any one of the above various types of correction performed by the image processing section 244.

The second forming section 270*b* cuts out the regions in the visual fields of both of the eyes from the transmitted images, and removes distortion in a case where the images contain distortion produced by the lens of the camera. In addition, images to be displayed on the head mounted display 100 and the flat-plate display 302 in this case may be either images in different ranges as depicted in the figure, or may be images in an identical range. For example, the image to be displayed on the head mounted display 100 may be an image in a range corresponding to the position or the posture of the user head, while the image to be displayed on the flat-plate display 302 may be an image in a range separately designated by a user operation or the like input via a game controller.

In the pattern (a), distortion correction and reprojection for the image 132 to be output to the head mounted display 100 can be simultaneously performed by the image processing apparatus 200 if reprojection is carried out immediately before display. On the other hand, (c) separately performs distortion correction by the server 400 and reprojection by the image processing apparatus 200. Accordingly, in a case where the server 400 and the image processing apparatus 200 have the same processing ability and perform the same displacement vector and the same pixel interpolation process, a time period required until output to the head mounted display 100 is highly likely to become shorter in (a).

The pattern (d) cuts out a region corresponding to the latest visual field of the user immediately before display. Accordingly, a process corresponding to the reprojection described above is unnecessary even in a case of video content of a panorama video formed beforehand, or in a case of a game image formed in real time. Moreover, no limitation is imposed on the range of the image to be transmitted. Accordingly, a situation of insufficiency of data necessary for formation of display images by reprojection is not caused.

The pattern (a) is also capable of forming the image 134 to be output to the flat-plate display 302 only by cutting out a part of the image transmitted from the server 400. Accordingly, output at a speed substantially same as the speed of output to the flat-plate display 302 in the pattern (b) is achievable. Note that the image transmitted from the server 400 in each of the patterns (b) and (d) does not contain information associated with disparity and a depth. Accordingly, the image 132 to be output to the head mounted display 100 is an image having no disparity.

The image 134 to be output to the flat-plate display 302 in the pattern (c) includes a process performed by the image processing apparatus 200 side for returning the image deformed by the server 400 into the original image. Accordingly, the output speed in the pattern (c) becomes lower than that of the patterns (a) and (b). Moreover, the process of returning the image once distorted into the original image is highly likely to deteriorate image quality in comparison with the patterns (a) and (b).

In the pattern (d), the server 400 is only required to transmit one type of image data even for the various viewpoints on the display side. Accordingly, processing efficiency improves. On the other hand, data in a region unnecessary for display is also transmitted. Accordingly, in a case of data transmission in a bandwidth same as that of the patterns (a), (b), and (c) and formation of a display image for one viewpoint, image quality may be lowered in comparison with the image quality of these patterns. As described above, the respective patterns have corresponding characteristics. Accordingly, the forming contents switching section 432 determines any one of the patterns under a rule set in consideration of these characteristics.

Figure 18:
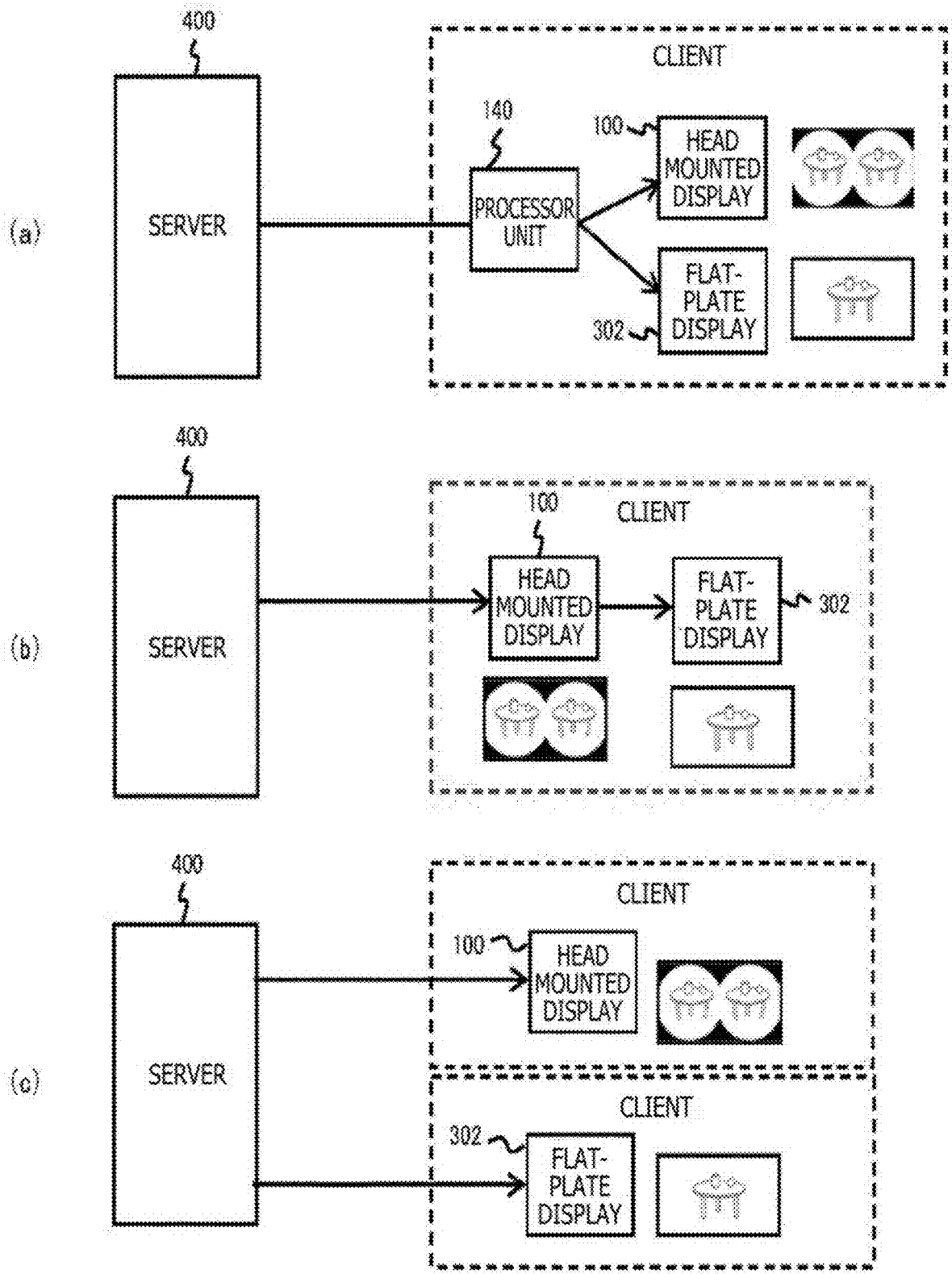
FIG. 18 is a diagram depicting variation examples of a method of establishing connection to a display device on the user side (client side) according to the present embodiment.

FIG. 18 depicts variation examples of a method of establishing connection to the display device on the user side (client side). First, an example (a) depicts a configuration where the head mounted display 100 and the flat-plate display 302 are connected in parallel to a processor unit 140 functioning as a distributor. Note that the processor unit 140 may be built in the image processing apparatus 200 not integrated with the head mounted display 100 and the flat-plate display 302. An example (b) depicts a configuration where the head mounted display 100 and the flat-plate display 302 are connected in series.

An example (c) depicts a configuration where the head mounted display 100 and the flat-plate display 302 are disposed at different places, and each acquire data from the server 400. In this case, the server 400 may transmit data in a format different for each display mode of the transmission destination. However, this configuration does not directly connect the head mounted display 100 and the flat-plate display 302. Accordingly, in a case where an image captured by a camera of the head mounted display 100 is subjected to merging and displayed, this image is difficult to be reflected in the flat-plate display 302.

In any case, the four transmission patterns described with reference to FIG. 17 are applicable to any one of the connection systems depicted in FIG. 18. For example, in a case where the image processing apparatus 200 is integrated with each of the head mounted display 100 and the flat-plate display 302, each of the first forming section 270*a* and the second forming section 270*b* determines whether to be operated according to a combination of the connection system of the example (a), (b), or (c) depicted in FIG. 18, and the format of data transmitted from the server 400, and determines processing contents of the operation if the first forming section 270*a* and the second forming section 270*b* are operated. Thereafter, the first control section 272*a* and the second control section 272*b* are operated according to the corresponding display mode, so that display of images corresponding to the mode of each of the display devices is achievable in any one of the examples depicted in FIG. 18.

Figure 19:
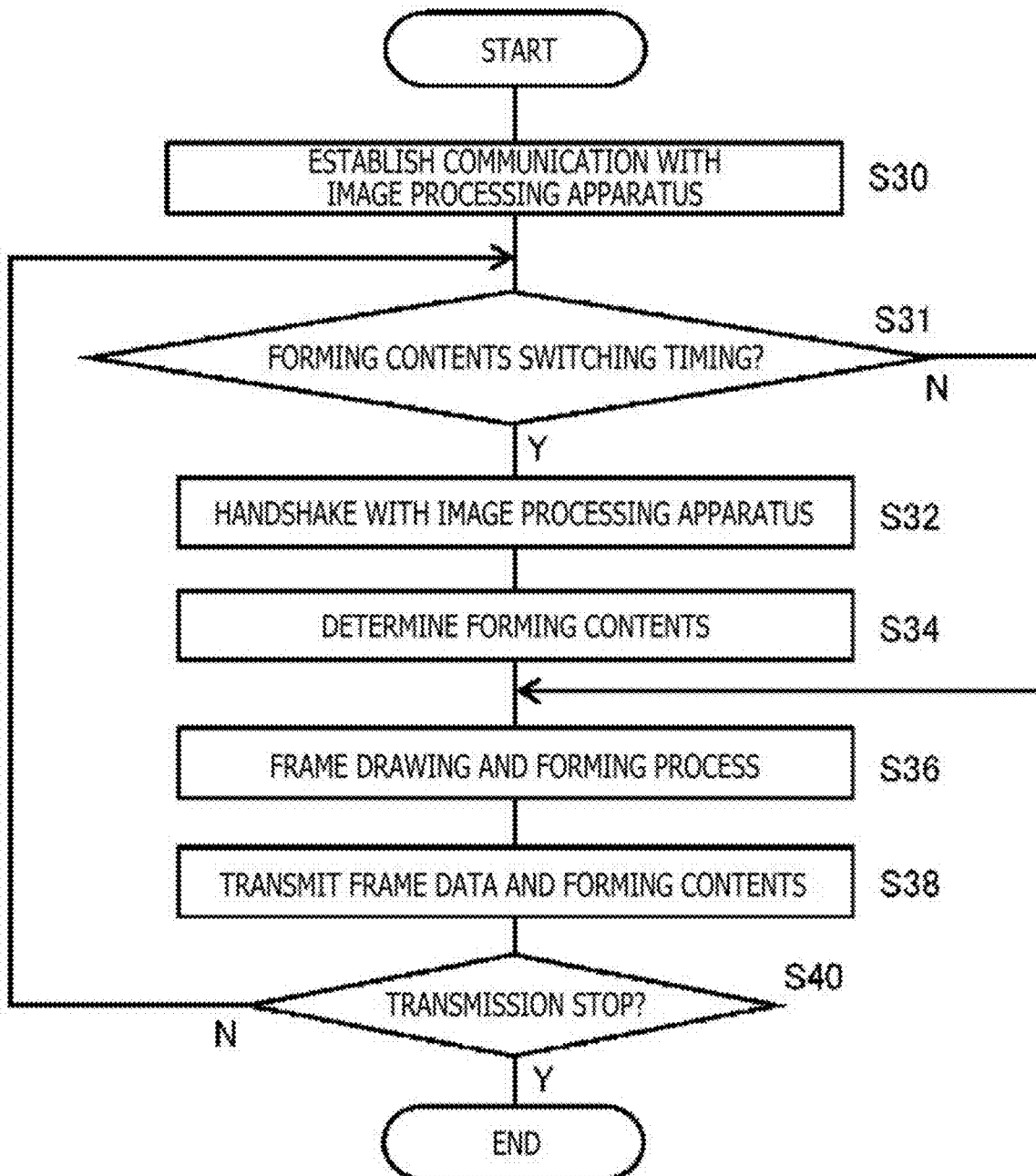
FIG. 19 is a flowchart presenting a processing procedure performed by the server for transmitting image data in a format determined according to a display mode according to the present embodiment.

FIG. 19 is a flowchart presenting a processing procedure performed by the server 400 for transmitting image data in the format determined according to the display mode. The process of this flowchart is started when the user selects a game to play, a moving image to enjoy, or the like and inputs the selection to the image processing apparatus 200. In response to this start, the image data acquisition section 240 of the image processing apparatus 200 issues a request to this effect to the server 400, and the server 400 establishes communication with the image processing apparatus 200 (S30). Thereafter, the forming contents switching section 432 of the server 400 checks necessary information by handshaking with the image processing apparatus 200 (Y in S31, and S32). Specifically, at least any one of the following items is checked.

1. Patterns handleable by the image processing apparatus 200 side in transmission patterns depicted in FIG. 17
2. Whether or not to display on the flat-plate display 302 images for a viewpoint same as that of the head mounted display 100
3. Formats allowed to be output from the server side
4. Required values associated with a delay time period, image quality, and presence or absence of disparity between left and right
5. Communication speed (communication band or transfer band, communication delay or transfer delay)
6. Contents processable by the image processing section 244 of the image processing apparatus 200 (processing ability)
7. The resolution, frame rate, color space, and optical parameter of the ocular lens of the head mounted display 100 and the flat-plate display 302

Note that the communication band or the communication delay in the above item 5 may be checked with reference to achievement values after a system start or achievement values between the same server 400 and the same image processing apparatus 200. Thereafter, the forming contents switching section 432 determines image forming contents to be performed on the server 400 side, under a rule set beforehand on the basis of the checked information (S34). For example, in the patterns presented in FIG. 17, a relation (c)≈(d)>(b)>(a) is obtained for the delay time period of output to the head mounted display 100, and a relation (c)≈(d)>(a)>(b) is obtained for the delay time period of output to the flat-plate display 302. Moreover, the quality of the image to be displayed on the flat-plate display 302 is highest in (b) and lowest in (c).

Moreover, the image quality at the time of display on the head mounted display 100 is higher in (a) which collectively achieves lens distortion and reprojection than in (c) in a case where the server 400 and the image processing apparatus 200 perform the same displacement vector and the same pixel interpolation process. However, the server 400 generally has a higher processing ability than the image processing apparatus 200, and therefore achieves processes for image quality improvement, such as a highly dense displacement vector map and a more tap pixel interpolation, in a short time period. Accordingly, the image quality may become higher even in (c) which corrects the image for the head mounted display 100 twice. Note that comparison of the image quality between (a), (c), and (b) is difficult to make in a wholesale manner due to a difference in presence or absence of disparity processing, for example.

A rule is set such that an optimum pattern is selectable according to the balance between the delay time period and the image quality described above, patterns executable by the image processing apparatus 200 and the server 400, or the like. In this case, the communication band (transfer band) and the communication delay (transfer delay) are taken into consideration as described above. The total delay time period herein is the sum of the processing time period of the server 400, the communication delay, and the processing time period of the image processing apparatus 200. An allowable level for the total delay time period may be determined beforehand as the rule for pattern selection.

For example, in a case where the communication delay (transfer delay) is longer than this level, a pattern which reduces the total delay time period is selected at the sacrifice of the image quality. At this time, the pattern (a) may be selected on the premise that the processes of lens distortion and reprojection are collectively performed by the image processing apparatus 200 with standard image quality. When the communication delay (transfer delay) is shorter than the level, a pattern which requires a long processing time period for the process performed by the server 400 or the image processing apparatus 200 may be selected to improve image quality.

For example, when the processing ability of the server 400 is high, not the pattern (a) but the pattern (c) in FIG. 17 may be selected for display on the head mounted display 100. Moreover, in a case where the second forming section 270b included in the image processing section 244 of the image processing apparatus 200 does not handle correction for removing distortion, for example, the pattern (c) is not selectable, but the pattern (a) or (b) needs to be selected.

The data forming section 434 performs a forming process corresponding to the determined contents for the frame drawn by the drawing section 430 (S36). Note that the formation process is omitted in a case where the data forming section 434 determines to transmit the frame drawn by the drawing section 430 without change. Thereafter, the compression coding section 422 compression-codes image data as necessary. The packetizing section 424 packetizes the compression-coded image data while associating the image data with formation contents already applied to the data. The communication section 426 transmits the packetized image data to the image processing apparatus 200 (S38). Note that each of the processes in S36 and S38 is caused to sequentially progress in units of a partial image in an actual situation, as described above.

Moreover, in a case where the communication band (transfer band) is insufficient for transferring data formed according to the contents determined in S34, at least any one of quantization parameters during data compression, a resolution, a frame rate, a color space, and the like may be changed under control, to be described later, to reduce the data size. In this case, the image processing section 244 of the image processing apparatus 200 may perform upscaling or the like of the image size. Unless stop of image transmission is requested by a user operation input to the image processing apparatus 200 or the like (N in S40), image drawing, the forming process, and transmission of subsequent frames are repeated (N in S31, S36, and S38).

However, at a timing for switching the image forming contents on the server 400 side, the forming contents switching section 432 updates the forming contents by performing processes in S32 and S34 (Y in S31). The timing for switching the image forming contents herein may be a timing of switching an application being performed by the image processing apparatus 200, a timing of switching a mode in this application, a timing designated by a user operation input to the image processing apparatus 200, or the like.

Note that the communication status between the server 400 and the image processing apparatus 200 is variable. Accordingly, the forming contents switching section 432 may also constantly monitor the communication speed and dynamically switch the forming contents as necessary. When stop of image transmission is required, the server 400 ends all the processes (Y in S40).

According to the data forming process for different display modes described above, the server 400 performs a part of the data forming process necessary before display in consideration of the display mode to be achieved by the image processing apparatus 200 corresponding to a transmission destination of image data. Responsiveness and image quality of display can be optimized under a given environment by determining the contents of the forming process according to the type of the display device connected to the image processing apparatus 200, the processing performance of the image processing apparatus, the communication status, the contents of a moving image to be displayed, and the like.

Moreover, in a case where a plurality of display devices in different display modes display the same moving image, the server 400 selects one suitable data format, performs a forming process in the selected data format, and transmits processed data. In this manner, data transmission in a similar communication band is achievable regardless of the number of display modes. As a result, the image processing apparatus 200 side is allowed to generate data corresponding to the respective display modes by a smaller number of processes. Moreover, a combination with various types of correction such as reprojection, merging with other images, and the like is facilitated. As a result, an image provided via a network can be displayed with a short delay and high image quality regardless of the types and the number of display modes desired to be achieved.

5. Compression Coding of a Plurality of Images Corresponding to Each Frame

Described here is a compression coding method in a case where each frame is constituted by a plurality of images as data of a moving image. First considered is a case where each frame of a moving image is constituted by a plurality of images obtained for different viewpoints. For example, a user can enjoy an image world with realistic sensation when display images are formed for viewpoints corresponding to the left and right eyes of a human and displayed in a left-eye region and a right-eye region of the head mounted display 100. For example, images of an event such as a sporting event are captured by a plurality of cameras disposed in a space, and images for the left eye and the right eye are formed and displayed according to movement of the head of the head mounted display 100 by using the captured images. Accordingly, the user can view the event from a free viewpoint with a sense similar to a sense obtained if the user were present in the event site.

According to this technology, the images for the left eye and the right eye to be transmitted from the server 400 basically express a figure in the same space, and therefore have high similarity. Accordingly, the compression coding section 422 of the server 400 compression-codes one of the images, and handles data of the other image as information indicating a difference from the one image, to thereby achieve a higher compression rate. Alternatively, the compression coding section 422 may acquire information indicating a difference from a compression coding result for a corresponding viewpoint in a past frame. Specifically, the compression coding section 422 performs prediction coding with reference to a compression coding result of at least either a different image indicating a figure at the same time in the moving image data, or an image of a past frame.

Figure 20:
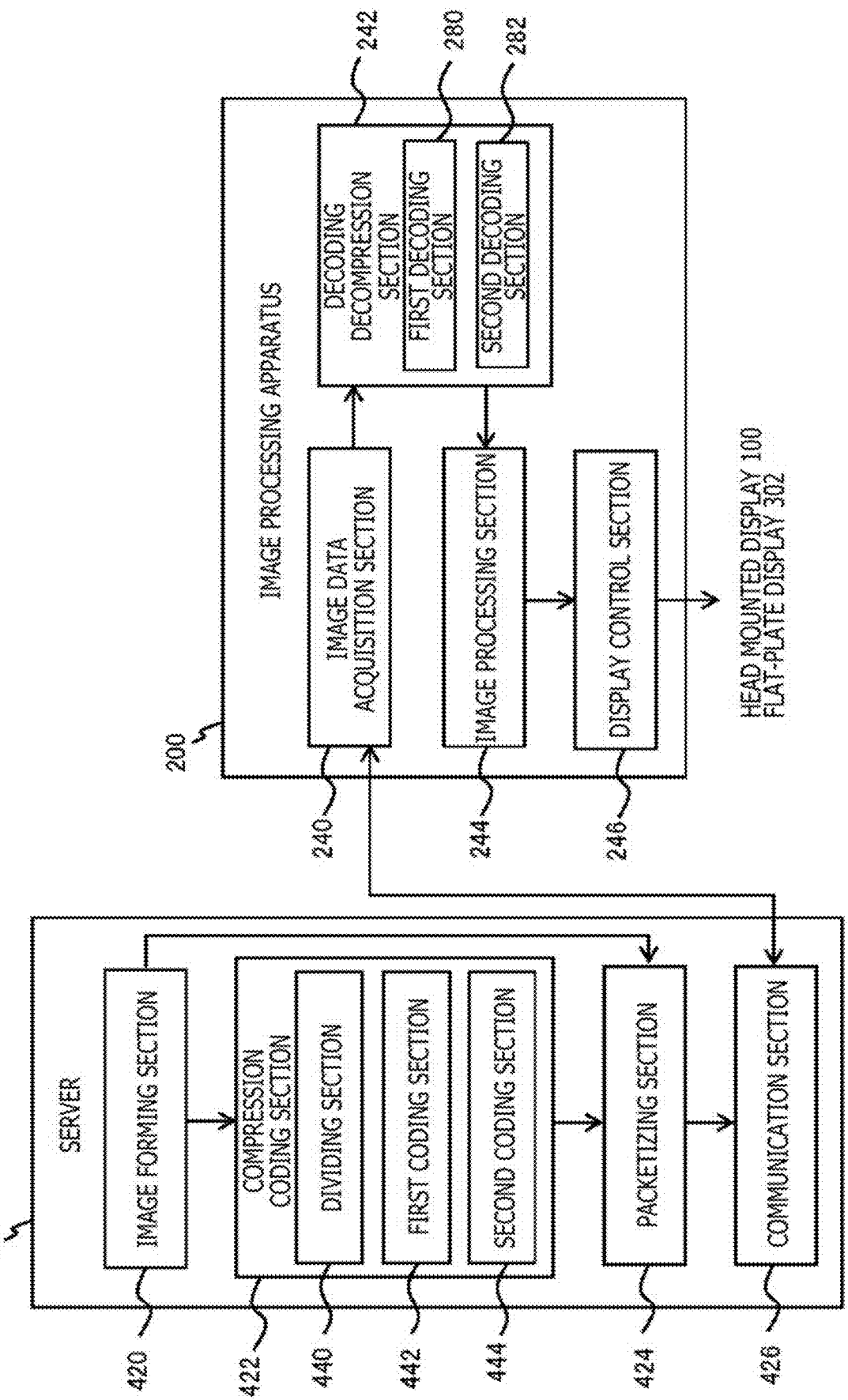
FIG. 20 is a diagram depicting a configuration of function blocks of the server having a function of compressing images for a plurality of viewpoints at a high compression rate, and the image processing apparatus processing these images according to the present embodiment.

FIG. 20 depicts a configuration of function blocks of the server 400 having a function of compressing images for a plurality of viewpoints at a high compression rate, and the image processing apparatus 200 processing this compressed data. The server 400 includes the image forming section 420, the compression coding section 422, the packetizing section 424, and the communication section 426. The image processing apparatus 200 includes the image data acquisition section 240, the decoding decompression section 242, the image processing section 244, and the display control section 246. The image forming section 420, the packetizing section 424, and the communication section 426 of the server 400, and the image data acquisition section 240, the image processing section 244, and the display control section 246 of the image processing apparatus 200 have functions similar to the corresponding functions described with reference to FIG. 5 or 16.

However, the image processing section 244 of the image processing apparatus 200 may have the various functions depicted in FIG. 9. Moreover, the image forming section 420 of the server 400 acquires data of a plurality of moving images obtained for different viewpoints. For example, the image forming section 420 may acquire images captured by a plurality of cameras disposed at different positions, or draw images as viewed from a plurality of virtual viewpoints. In other words, the image forming section 420 may acquire image data from an external camera or the like rather than forming images by itself.

Further, the image forming section 420 may once form images for the left eye and the right eye in a visual field corresponding to a viewpoint of the user wearing the head mounted display 100 on the basis of the acquired images for a plurality of viewpoints. The server 400 may transmit images for a plurality of viewpoints, regardless of whether the images are for the left eye or the right eye, and the image processing apparatus 200 as a transmission destination may form images for the left eye and the right eye. Alternatively, the image processing apparatus 200 may perform any image analysis by using the transmitted images for a plurality of viewpoints.

In any case, the image forming section 420 acquires or forms, at a predetermined or variable rate, frames of a plurality of moving images each indicating at least a common part of an object, and sequentially supplies the frames to the compression coding section 422. The compression coding section 422 includes a dividing section 440, a first coding section 442, and a second coding section 444. The dividing section 440 divides frames corresponding to a plurality of moving images along a common boundary in an image plane to form image blocks. The first coding section 442 compression-codes, in units of an image block, a frame for one viewpoint included in a plurality of frames for different viewpoints.

The second coding section 444 compression-codes a frame for a different viewpoint, in units of an image block, using the data compression-coded by the first coding section 442. The coding method is not particularly limited. However, it is preferable to adopt a method producing less deterioration of image quality even when not the entire frame but each partial region is independently compressed. In this manner, frames for a plurality of viewpoints can sequentially be compression-coded in a unit smaller than one frame, and each partial image can be transmitted to the image processing apparatus 200 with a shorter delay time period by pipeline-processing similar to the pipeline processing described above.

Accordingly, the boundary of the image blocks is appropriately set in the image plane according to an order of data acquisition by the image forming section 420. Specifically, the boundary of the image blocks is determined such that a region acquired earlier is compression-coded and transmitted earlier. For example, in a case where the image forming section 420 sequentially acquires data of each row of pixels in the image plane from the top, the dividing section 440 sets a boundary line in the horizontal direction to form image blocks each constituted by a predetermined number of rows.

However, the order of data acquisition by the image forming section 420 and the division direction of images are not particularly limited. For example, in a case where the image forming section 420 sequentially acquires data of each column of pixels in the vertical direction, the dividing section 440 sets a boundary line in the vertical direction. The boundary line is not limited to one direction, and may be defined in both of the horizontal and vertical directions to form tile-shaped image blocks. Alternatively, the image forming section 420 may acquire data by using an interlace method in which data of every other row of pixels is acquired by one scanning and data of the remaining rows of pixels is acquired in next scanning, or may acquire data in a zig-zag manner in the image plane. In the latter case, the dividing section 440 sets a boundary line for division in an oblique direction of the image plane.

In any case, as described above, an appropriate division pattern corresponding to the data acquisition order is set in advance such that data of a region acquired earlier by the image forming section 420 is compression-coded earlier, and the dividing section 440 divides the image plane in the pattern corresponding to the data acquisition order of the image forming section 420. The dividing section 440 herein designates a region in a minimum unit necessary for performing motion compensation and coding as a minimum division unit. The first coding section 442 and the second coding section 444 perform compression coding in units of an image block obtained as a result of such division by the dividing section 440.

As described above, the second coding section 444 herein uses image data compression-coded by the first coding section 442, to raise the compression rate of image data for a different viewpoint. Note that each of the first coding section 442 and the second coding section 444 may compression-code each image block of the current frame by further using compression-coded data of an image block located at the same position in a past frame.

Figure 21:
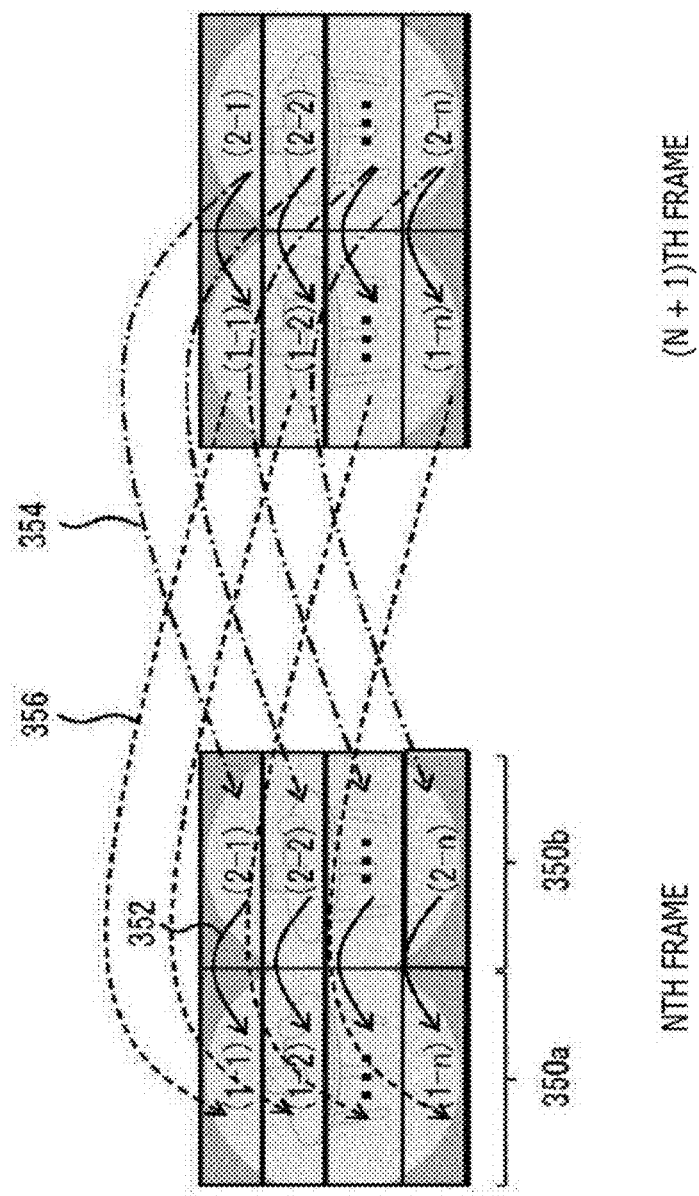
FIG. 21 is a diagram depicting an example of a relation between image blocks compression-coded by a first coding section and a second coding section and image blocks whose compression coding result is referred to for the compression coding, according to the present embodiment.

FIG. 21 depicts an example of a relation between image blocks compression-coded by the first coding section 442 and the second coding section 444 and image blocks whose compression coding result is referred to for the compression coding. This figure depicts image planes in a case where an image for the left eye and an image for the right eye to each of which distortion for the ocular lens has been given are designated as processing targets. A left part indicates an Nth frame, and a right part indicates an (N+1)th frame on an assumption that N is a natural number. For example, as indicated in the Nth frame, the first coding section 442 performs compression coding for a left-eye image 350a for each of image blocks (1-1), (1-2), and up to (1-n), while the second coding section 444 performs compression coding for a right-eye image 350b for each of image blocks (2-1), (2-2), and up to (2-n).

The second coding section 444 herein refers to data of an image block of a left-eye image (e.g., left-eye image 350a) compression-coded by the first coding section 442, as indicated by solid arrows (e.g., solid arrows 352), to thereby compression-code each image block of a right-eye image (e.g., right-eye image 350b). Alternatively, the second coding section 444 may refer to a compression coding result of an image block of the right-eye image 350b in the Nth frame, as indicated by one-dot chain arrows (e.g., one-dot chain arrows 354), to thereby compression-code each image block at the same position of a right-eye image in the (N+1)th frame one frame later.

Alternatively, the second coding section 444 may simultaneously use both of the references indicated by the solid line arrows and the one-dot chain line arrows, to thereby compression-code each target image block. Similarly, the first coding section 442 may refer to a compression coding result of an image block of the left-eye image 350a in the Nth frame, as indicated by broken arrows (e.g., broken arrows 356), to thereby compression-code each image block at the same position of a left-eye image in the (N+1)th frame. In these modes, an algorithm of MVC (Multiview Video Coding) corresponding to a coding method for a multiple viewpoint video may be used, for example.

The MVC basically uses a decoded image for a viewpoint compression-coded by a method such as AVC (H264, MPEG (Moving Picture Experts Group)-4) in images captured for multiple viewpoints to predict an image for a different viewpoint, and designates a difference between the predicted image and an actual image as a compression coding target for this different viewpoint. However, the format of coding is not particularly limited, and may be MV-HEVC (multiple viewpoint video coding extension) which is an extension standard for multiple viewpoint coding for HEVC, for example. Alternatively, coding methods such as VP9, AV1 (AOMedia Video 1), and VVC (Versatile Video Coding) may be adopted as basic coding methods.

In any case, according to the present embodiment, a delay time period until transmission is reduced by performing this compression coding process in units of an image block. For example, while the first coding section compression-codes the nth (n: natural number) image block in a frame for one viewpoint, the second coding section compression-codes the (n−1)th image block in a frame for a different viewpoint. In this manner, a pipeline simultaneous operation is sequentially achievable in parallel in an order of data acquisition of frames, and therefore, a high-speed compression process is realizable.

The viewpoint to be compression-coded by each of the first coding section 442 and the second coding section 444 may be either a single viewpoint or a plurality of viewpoints. The frames of the moving image for the plurality of viewpoints compression-coded by the first coding section 442 and the second coding section 444 are sequentially supplied to the packetizing section 424, and transmitted from the communication section 426 to the image processing apparatus 200. At this time, information for distinguishing between data compressed by the first coding section 442 and data compressed by the second coding section 444 is associated with each piece of data.

Note that the image block corresponding to a compression unit may be identical to a partial image corresponding to a unit of pipeline processing described above, or that one partial image may contain data of a plurality of image blocks. The decoding decompression section 242 of the image processing apparatus 200 includes a first decoding section 280 and a second decoding section 282. The first decoding section 280 decoding-decompresses an image for a viewpoint compression-coded by the first coding section 442. The second decoding section 282 decoding-decompresses an image for a viewpoint compression-coded by the second coding section 444.

Specifically, the first decoding section 280 decodes frames of a moving image for a part of viewpoints by performing an ordinary decoding process corresponding to the coding method and by using only the data compression-coded by the first coding section 442. The second decoding section 282 decodes frames of the moving image for the remaining viewpoint, by using the data compression-coded by the first coding section 442 and the data compression-coded by the second coding section 444. For example, an image for a target viewpoint is predicted by the former data, and a decoded result of the data compression-coded by the second coding section 444 is added to the predicted image, to thereby decode the image for that viewpoint.

While the first decoding section 280 and the second decoding section 282 are separately depicted as function blocks, it is understood by those skilled in the art that one circuit or one software module can sequentially perform two types of processes in an actual situation. As described above, the decoding decompression section 242 acquires data of a partial image compression-coded from the image data acquisition section 240, decoding-decompresses the data in units of this partial image, and then supplies the data to the image processing section 244. In this case, the data size to be transmitted from the server 400 can be reduced by performing prediction coding utilizing similarity of images for a plurality of viewpoints. In this manner, image display with a reduced delay is achievable without putting a squeeze on the communication band.

FIG. 22 is a diagram for explaining advantageous effects produced by compression coding performed by the server 400 in units of an image block utilizing similarity of images for a plurality of viewpoints according to the present embodiment. An upper part of the figure depicts examples of division of images in a case where a left-eye image and a right-eye image to each of which distortion for the ocular lens has been given are designated as processing targets. A lateral direction in a lower part of the figure represents an elapse of time period. A time period of a compression coding process performed for each of the regions is indicated by an arrow together with the number of the corresponding region indicated in the upper part.

According to a procedure (a) in a comparative case, the entire left-eye image of (1) is first compression-coded, and then a difference between a prediction image of the right-eye image formed using this result and an actual image is designated as a compression target of the right-eye image of (2). In this procedure, for compression coding of the right-eye image of (2), it is necessary to first wait for completion of compression coding of the entire left-eye image, and then perform prediction using this data and calculate the difference from the actual image, for example. As a result, as depicted in the lower part, a relatively long time period is required for completing compression coding of both of the images.

According to a procedure (b) in a comparative case, the left-eye image and the right-eye image are handled as one connected image and compression-coded for each of image blocks (1), (2), and up to (n) obtained as a result of division in the horizontal direction. In this procedure, as depicted in the lower part, the processes for prediction from data once compression-coded and calculation of the difference are not performed. Accordingly, a time period required for compression coding can be made shorter than the time period in the procedure (a). However, the compression rate becomes lower than in (a) due to the omission of prediction coding.

In a case of a procedure (c), as described in the present embodiment, the first coding section 442 compression-codes the left-eye image for each of image blocks (1-1), (1-2), and up to (1-n), while the second coding section 444 compresses a difference between a prediction image of the right-eye image formed by using each piece of the data and an actual image to generate compression-coded data of the right-eye image for each of image blocks (2-1), (2-2) and up to (2-n). In this procedure, as depicted in (c) of the lower part, compression coding for the image blocks (2-1), (2-2), and up to (2-n) of the right-eye image can be started immediately after completion of compression coding of the corresponding image blocks (1-1), (1-2) and up to (1-n) of the left-eye image.

Moreover, the area to be processed at a time during compression coding of the left-eye image is small, and the area of the left-eye image to be referred to during compression coding of the right-eye image is small. Accordingly, a compression coding time period for each image block becomes shorter than a compression coding time period converted into a time period required per image block in (a). As a result, a higher compression rate is achievable in a short time period substantially similar to the time period of the procedure (b). Further, as described above, the compression-coded image blocks are sequentially packetized and transmitted to the image processing apparatus 200. Accordingly, a delay until display can be considerably reduced in comparison with a delay of the procedure (a).

While the first coding section 442 and the second coding section 444 in the procedure (c) are separately depicted as function blocks, one circuit or one software module can sequentially perform two types of processes in an actual situation. On the other hand, (c)' depicted in the lower part of the figure presents a case where the first coding section 442 and the second coding section 444 are configured to be capable of performing compression coding in parallel. In this case, during each of the time periods when the first coding section 442 compression-codes the image blocks (1-2) and up to (1-n) of the left-eye image, the second coding section 444 compression-codes an image block one block before the corresponding image block of the right-eye image, i.e., each image block of (2-1)th and up to (2-(n−1))th image blocks.

In this manner, the time period required for compression coding can further be reduced in comparison with the case (c). A procedure (c)" is a modification of the procedure (c)' and presents a case where, at the time when a region of a predetermined unit included in the image blocks of the left-eye image is compression-coded, compression coding of a corresponding region in the right-eye image starts using this data. A figure of an object appears in the left-eye image at a position shifted, by an amount of disparity, from a position of a figure of the same object in the right-eye image. Accordingly, if a reference image of a range, from several pixels to several tens of pixels, containing this amount of deviation is given, prediction coding of the other image is achievable in principle.

Moreover, as described above, a minimum unit region necessary for performing motion compensation and coding in compression coding is a region containing a predetermined number of rows, such as one row and two rows, or a rectangular region having a predetermined size such as 16×16 pixels and 64×64 pixels. Accordingly, the second coding section 444 is allowed to start compression coding at the time of completion of compression coding by the first coding section 442 for the left-eye image in a region necessary as a reference. The minimum unit for this compression coding is a unit region necessary for motion compensation or coding.

For example, in a case where the first coding section 442 sequentially performs compression coding of the image blocks of the left-eye image from an end, the second coding section 444 is allowed to start, before completion of compression coding of the entire image blocks of the left-eye image, compression coding of the corresponding image block of the right-eye image. In this manner, the time period required for compression coding can further be reduced in comparison with the case (c)'.

Note that the compression coding section 422 as a whole achieves reduction of the time period required for the compression coding process by starting compression coding immediately after preparation of data of a minimum unit region necessary for compression coding. While compression coding of images for a plurality of viewpoints has been chiefly described above, compression coding and transfer with a short delay and high efficiency can be achieved by a similar process even when parameters other than a viewpoint are different in a plurality of images corresponding to each frame of a moving image. For example, in a scalable video coding technology which performs compression coding of one moving image by dividing the image into levels by varying the resolution, the image quality, and the frame rate to generate data having redundancy, pieces of data in the respective levels have high similarity.

Accordingly, a higher compression rate is achievable by first compression-coding an image of a base level and then using information indicating differences from the base level image for data in other levels. Specifically, prediction coding is performed with reference to a compression coding result of at least either a different image indicating the same figure at the same time in the moving image data, or an image of a past frame. The different image indicating the same figure at the same time in the moving image data herein has a different resolution and different image quality that are defined hierarchically.

For example, an image indicating the same figure has grades of resolution of 4K (3840×2160 pixels) and HD (High Definition) (1920×1080 pixels), and image quality of levels 0 and 1 as a quantization parameter (QP). For example, the image in the past frame herein refers to an immediately preceding frame at a different frame rate defined hierarchically. For example, in grades of a frame rate such as 60 fps and 30 fps, an immediately preceding frame in the level of 30 fps refers to a frame $1/30$ seconds before, which corresponds to a frame two frames before in the level of 60 fps. Compression coding in each level may be similarly performed in units of an image block in the scalable video coding technology having such characteristics.

For example, SVC (Scalable Video Coding) corresponding to an extended standard of AVC (H264, MPEG-4), SHVC (Scalable High Efficiency Video Coding) corresponding to an extended standard of HEVC, and the like are known as scalable video coding (e.g., see Takahiro Kimoto, "Activity on scalable video coding in MPEG," Report from Information Processing Society of Japan, 2005, AVM-48 (10), pp. 55-60). Any of these may be adopted in the present embodiment. Note that other coding methods such as VP9, AV1, and VVC may be adopted as a basic coding method.

Figure 23:
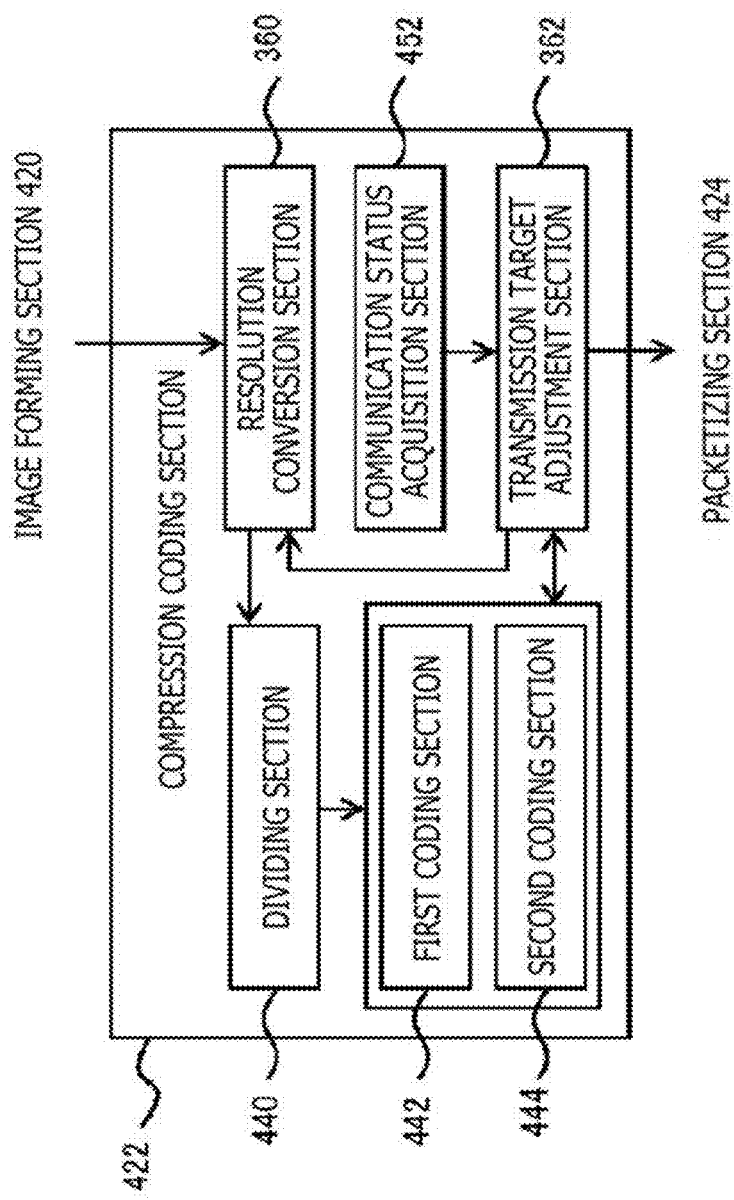
FIG. 23 is a diagram depicting a configuration of function blocks of a compression coding section in a case of execution of scalable video coding according to the present embodiment.

FIG. 23 depicts a configuration of function blocks of the compression coding section 422 in a case where scalable video coding is performed. Other function blocks are similar to those depicted in FIG. 20. The compression coding section 422 in this case includes a resolution conversion section 360, a communication status acquisition section 452, and a transmission target adjustment section 362 in addition to the dividing section 440, the first coding section 442, and the second coding section 444 depicted in FIG. 20. The resolution conversion section 360 reduces stepwise respective frames of a moving image formed or acquired by the image forming section 420, to form an image having a plurality of resolutions.

The dividing section 440 divides the image having the plurality of resolutions along a boundary common in the image plane to form image blocks. The dividing rule may be similar to the rule described above. The first coding section 442 compression-codes an image having the lowest resolution in units of an image block. As described above, compression coding in this case is performed only within this image, or also with reference to image blocks located at the same positions of an image in a past frame having the same resolution.

The second coding section 444 compression-codes an image having a high resolution in units of an image block, by using a compression coding result by the first coding section 442. The figure depicts the two sections of the first coding section 442 and the second coding section 444 on an assumption that two resolution levels are provided. However, in a case where three or more resolution levels are provided, the same number of coding sections as the number of levels are provided, and prediction coding is performed by using a compression coding result of an image having a resolution one grade lower.

In this case, an image block located at the same position of an image in a past frame having the same resolution may be referred to as well. Moreover, each of these coding sections may set a difference in frame rate or image quality between levels as necessary by adjusting the frame rate or adjusting the quantization parameters to be used.

For example, in a case where levels are set for the frame rate, the frame rate of the process performed by the compression coding section 422 is a rate of the highest frame rate level. In addition, in a case where compression coding is performed with reference to a past frame, a frame to be referred to changes depending on the frame rate. Moreover, in a case where levels are set for the image quality, the first coding section 442 selects QP level 0 corresponding to base image quality in quantization parameters, and the second coding section 444 or an nth coding section higher than the second coding section 444 selects QP level corresponding to higher image quality to set levels of image quality.

For example, when a base level having a resolution of HD and image quality of QP level 0 and a level having a resolution of 4K and image quality of QP level 1 are present, the first coding section 442 and the second coding section 444 process the former and the latter, respectively. Moreover, when a level having a resolution of 4K and image quality of QP level 2 is present, a not-depicted third coding section processes this level. In other words, in a case where QP levels are different even with the same resolution, the same number of coding sections as the number of levels are provided. Note that combinations of levels of resolution, image quality, and frame rate are not limited to these.

In any case, also in this case, while the first coding section 442 compression-codes an nth (n: natural number) image block in an image having the lowest resolution (lowest level), the second coding section 444 compression-codes an (n−1)th image block in an image in a level above the lowest level. In a case where three levels or more are provided, the coding sections perform parallel compression coding of image blocks shifted one block before with a rise of the level, such as an (n−2)th image block in an image in the third level, and an (n−3)th image block in an image in the fourth level. Presented hereinbelow is examples of respective parameters of scalable video coding achieved in the present embodiment.

TABLE 1

| RESOLUTION | FRAME RATE | IMAGE QUALITY |
|---|---|---|
| 4K | 60 | QP level 0 |
|  |  | QP level 1 |
|  |  | QP level 2 |
|  | 30 | QP level 0 |
|  |  | QP level 1 |
|  |  | QP level 2 |
| HD | 60 | QP level 0 |
|  |  | QP level 1 |
|  |  | QP level 2 |
|  | 30 | QP level 0 |
|  |  | QP level 1 |
|  |  | QP level 2 |

The communication status acquisition section 452 acquires a status of communication with the image processing apparatus 200 at a predetermined rate. For example, the communication status acquisition section 452 acquires a delay time period that occurs between transmission of image data and arrival at the image processing apparatus 200 on the basis of a response signal received from the image processing apparatus 200 or on the basis of aggregate information obtained by the image processing apparatus 200. Alternatively, the communication status acquisition section 452 acquires a rate of packets having arrived at the image processing apparatus 200 in transmitted packets of image data, from the image processing apparatus 200 as a data arrival rate. Moreover, the communication status acquisition section 452 acquires a data volume allowed to be transmitted per unit time period, i.e., an available band, on the basis of these pieces of information. The communication status acquisition section 452 monitors the communication status by acquiring at least any one of these pieces of information at a predetermined rate.

The transmission target adjustment section 362 determines, according to the communication status, a target to be transmitted to the image processing apparatus 200 in level data compression-coded by scalable video coding. The transmission target adjustment section 362 herein gives the highest priority to image data compression-coded by the first coding section 442 and having the lowest resolution in this level data. The transmission target adjustment section 362 further determines whether or not to extend the transmission target in a high-order level direction according to the communication status. For example, the transmission target adjustment section 362 sets a plurality of thresholds for an available transfer band, and extends stepwise the transmission target to image data in a higher level every time the available transfer band exceeds one of the thresholds.

By contrast, in a case where the available transfer band does not exceed the lowest threshold, only image data having the lowest resolution is designated as the transmission target. Alternatively, the server 400 may designate all level data as the transmission target by applying priority control, regardless of the communication status. In this case, the transmission target adjustment section 362 adjusts a transfer priority order to be given to each level according to the communication status. For example, the transmission target adjustment section 362 lowers the transfer priority order of the high-order level data as necessary. The transfer priority order herein may be constituted by multiple stages.

At this time, the packetizing section 424 packetizes information indicating the transfer priority order given together with image data and transmits the packetized information from the communication section 426. However, in a case of transfer exceeding the processing ability at a router or the like located at a node of the network 306, packets may be discarded as necessary. Data transfer in a streaming system generally uses a transfer protocol eliminating hand shaking such as a UDP (User Datagram Protocol) to achieve delay reduction and transfer efficiency improvement. Accordingly, the server 400 having transmitted data in this case does not recognize whether or not a packet has been discarded in the middle of the path of the network 306. At this time, the router or the like sequentially designates each level as a discarding target from the highest level on the basis of the given transfer priority order. In a case where data divided into levels is simultaneously transmitted from the server 400 to a plurality of image processing apparatuses 200, processing abilities of the decoding decompression sections 242 included in the respective image processing apparatuses 200 and communication performance of the network to the respective image processing apparatuses 200 vary for each case.

As described above, the transmission target adjustment section 362 may individually determine the transmission target according to the status of each of the image processing apparatuses 200. In this case, however, separate adjustment is needed for a plurality of communication sessions, and therefore, processing loads extremely increase. On the other hand, according to the priority control described above, the server 400 can handle a plurality of communication sessions under the same condition and therefore can enhance processing efficiency. Note that the transmission target adjustment section 362 and the like may perform processing while combining the mode for controlling the transmission target itself as described above and the mode for implementing the priority control.

As a modification, the server 400 may transmit compression-coded level data to a not-depicted relay server, and the relay server may simultaneously transmit data to the plurality of image processing apparatuses 200. In this case, the server 400 may transmit data in all levels to the relay server under the priority control, and the relay server may determine and transmit a transmission target individually according to the status of each of the image processing apparatuses 200. The transmission target adjustment section 362 may further (1) change parameters used in each of the levels and/or (2) change level relations on the basis of at least either the communication status or contents indicated by a moving image to be described below.

According to the case (1), in a case where a level of 4K (3840×2160 pixels) is present as a level of resolution, for example, the transmission target adjustment section 362 makes the level to be a level of WQHD (Wide Quad-HD) (2560×1440 pixels) instead of 4K. Note that this does not mean addition of the level of WQHD. Such a change may be made when a shortage with respect to a high-band side threshold in thresholds for a plurality of achieved bands frequently occurs. Alternatively, in a case where a level of QP level 1 is present as a level of image quality, the transmission target adjustment section 362 makes the level to be a level of QP level 2 instead of QP level 1. Likewise, this does not mean addition of the level of QP level 2.

Such a change may be made when an excess with respect to a high-band side threshold in thresholds for a plurality of achieved bands frequently occurs. Alternatively, such a change may be made in a scene where image quality needs to be regarded as important as a result of image analysis. Details of the case (2) will be described below. In the cases (1) and (2), the transmission target adjustment section 362 may request the resolution conversion section 360, the first coding section 442, and the second coding section 444 to perform processing under conditions determined as necessary. A specific example of contents indicated by a moving image and regarded as a basis for adjustment will be described below.

Figure 24:
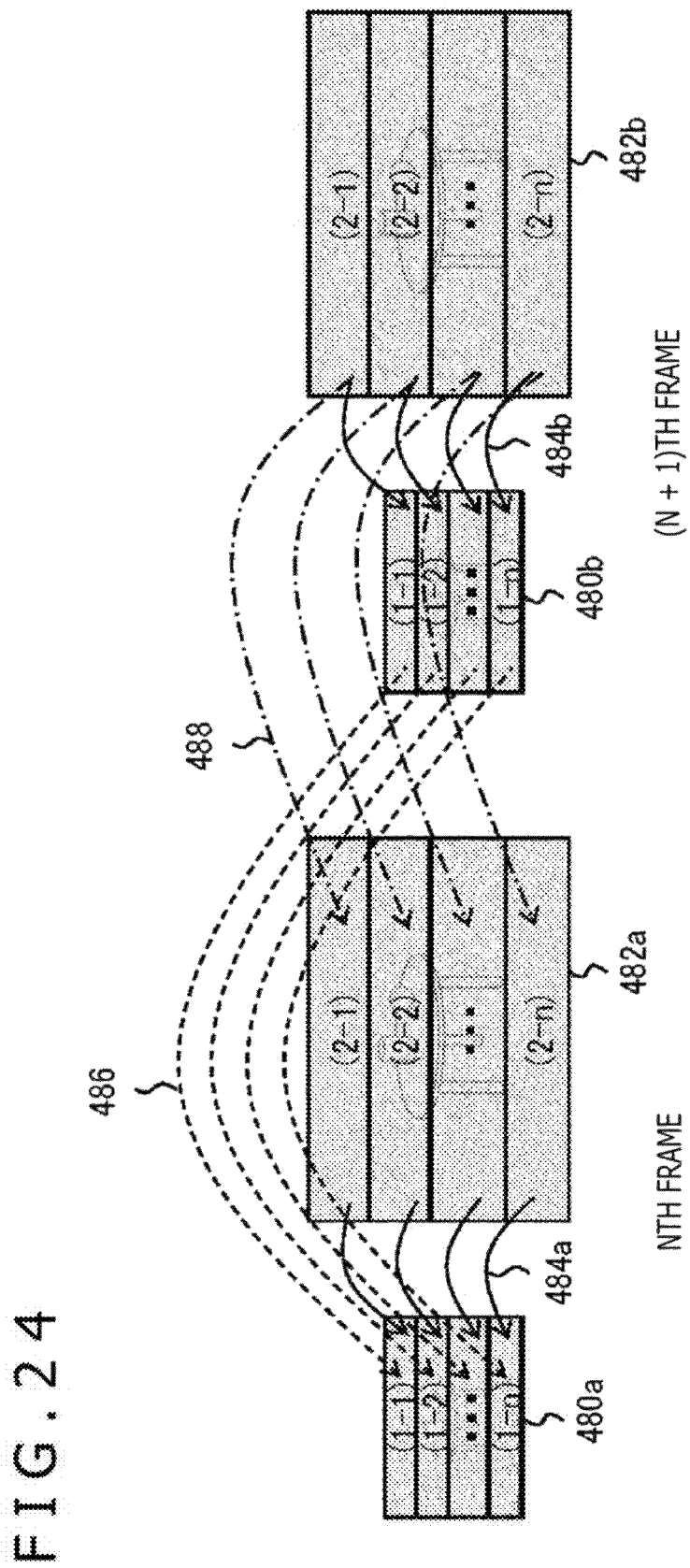
FIG. 24 is a diagram depicting an example of a relation between image blocks compression-coded by the first coding section and the second coding section and image blocks whose compression coding result is referred to for the compression coding, in a case of execution of scalable video coding according to the present embodiment.

FIG. 24 depicts an example of a relation between image blocks compression-coded by the first coding section 442 and the second coding section 444 and image blocks whose compression coding result is referred to for the compression coding, in a case where scalable video coding is performed. This example assumes that two levels are provided as the resolution and that each of the frame rate and the image quality does not have levels. A left part indicates an Nth frame while a right part indicates an (N+1) the frame on an assumption that N is a natural number. In this case, the first coding section 442 compression-codes images 480*a* and 480*b* each having a low resolution in the respective frames for each of image blocks (1-1), (1-2), and up to (1-n).

The second coding section 444 compression-codes images 482*a* and 482*b* each having a high resolution for each of image blocks (2-1), (2-2) and up to (2-n). The second coding section 444 herein compression-codes the respective image blocks of the high-resolution images 482*a* and 482*b* while referring to data of the image blocks at corresponding positions in the low-resolution images 480*a* and 480*b* in the same frame compression-coded by the first coding section 442, as indicated by solid arrows (e.g., solid arrows 484*a* and 484*b*).

Alternatively, the second coding section 444 may refer to compression coding results of the image blocks of the high-resolution image 482*a* in the Nth frame as indicated by one-dot chain arrows (e.g., one-dot chain arrows 488), to thereby compression-code the image blocks at the same positions in the high-resolution image 482*b* in the (N+1)th frame one frame later. Alternatively, the second coding section 444 may compression-code target image blocks by simultaneously using both of the references indicated by the solid line arrows and the one-dot chain line arrows.

Figure 25:
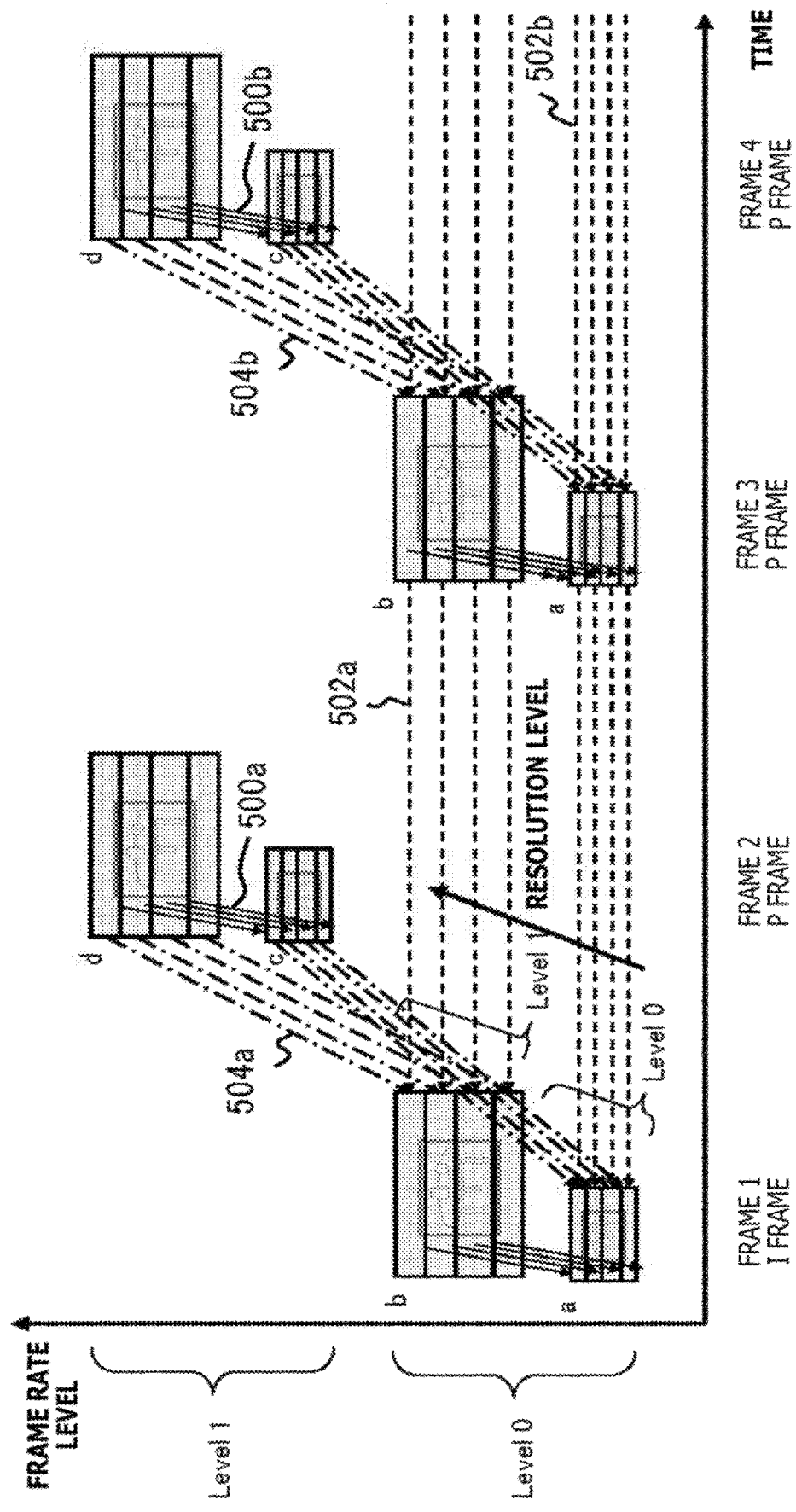
FIG. 25 is a diagram depicting an example of a relation between image blocks compression-coded by the first coding section and the second coding section and image blocks whose compression coding result is referred to for the compression coding, in a case of execution of scalable video coding according to the present embodiment.

Similarly, the first coding section 442 may refer to compression coding results of the image blocks of the low-resolution image 480*a* in the Nth frame as indicated by broken arrows (e.g., broken arrows 486), to thereby compression-code the image blocks at the same positions in the low-resolution image 480*b* in the (N+1)th frame. FIG. 25 also depicts an example of a relation between image blocks compression-coded by the first coding section 442 and the second coding section 444 and image blocks whose compression coding result is referred to for the compression coding, in a case where scalable video coding is performed.

This example assumes that each of the resolution and the frame rate has two levels. A lateral direction in the figure represents a time axis. A first frame, a second frame, a third frame, and a fourth frame are presented from the left. As depicted in the figure, the first frame is an I frame (intra frame), while the other frames are P frames (forward prediction frames). However, it is not intended that the number of frames be limited to a particular number.

In addition, a vertical direction in the figure represents the frame rate level. The figure indicates that each of levels (level 0 and level 1) includes images at two levels of resolution. Moreover, symbols a to d for identifying a combination of levels are given to upper left portions of the respective images. When each of the images is expressed by a combination of the frame number and the symbol of a to d, the first coding section 442 compression-codes images in an order of 1a, 2c, 3a, and 4c. The second coding section 444 compression-codes images in an order of 1b, 2d, 3b, and 4d. In a case of the lowest communication band, the image processing apparatus 200 displays images in an order of 1a, 3a, and so on. In a case of the highest communication band, the image processing apparatus 200 displays images in an order of 1b, 2d, 3b, and 4d.

As described above, each of the coding sections performs compression coding in units of an image block. The second coding section 444 herein compression-codes respective image blocks of the high-resolution images while referring to data of image blocks at corresponding positions in the low-resolution images in the same frame compression-coded by the first coding section 442 as indicated by solid arrows (e.g., solid arrows 500*a* and 500*b*). Moreover, each of the first coding section 442 and the second coding section 444 may refer to compression coding results of image blocks of an image having the same resolution in the same frame rate level as indicated by broken arrows (e.g., broken arrows 502*a* and 502*b*), to thereby compression-code image blocks at the same positions in the next frame.

Moreover, each of the first coding section 442 and the second coding section 444 may refer to compression coding results of image blocks of an image having the same resolution in a different frame rate level as indicated by one-dot chain arrows (e.g., one-dot chain arrows 504*a* and 504*b*), to thereby compression-code image blocks at the same positions in the next frame. Each of the first coding section 442 and the second coding section 444 may perform compression coding using any one of these references, or may perform compression coding simultaneously using a plurality of references.

Moreover, any one of the processing procedures (c), (c)', and (c)" depicted in FIG. 22 may be adopted as the processing procedure for compression coding of the respective image blocks. Specifically, the procedure (c) is adopted in a case where the first coding section 442 and the second coding section 444 are actually constituted by one circuit or one software module and sequentially implement processing. The processing (c)' or (c)" is adopted in a case where the first coding section 442 and the second coding section 444 are capable of performing a parallel process. In addition, in a case where level relations are changed on the basis of at least any one of the communication status and the contents indicated by the moving image as described in (2) above, the transmission target adjustment section 362 changes the number of levels on the basis of at least any one of resolution, image quality, and frame rate. Alternatively, the transmission target adjustment section 362 changes the level of the reference during compression coding. For example, the transmission target adjustment section 362 changes the reference in the following manner.

In FIG. 25, for example, when the frame rate has level 1 and level 0, and level 1 always refers to level 0, the frame sequence is as follows.

frame 1 level 0
frame 2 level 1 (refer to immediately preceding level 0 frame 1)
frame 3 level 0 (refer to immediately preceding level 0 frame 1)

frame 4 level 1 (refer to immediately preceding level 0 frame 3)
frame 5 level 0 (refer to immediately preceding level 0 frame 3)
frame 6 level 1 (refer to immediately preceding level 0 frame 5)
frame 7 level 0 (refer to immediately preceding level 0 frame 5)
and so on The transmission target adjustment section 362 changes this sequence and increases the number of references between frames of level 1 in the following manner, for example.

frame 1 level 0
frame 2 level 1 (refer to immediately preceding level 0 frame 1)
frame 3 level 1 (refer to immediately preceding level 1 frame 2)
frame 4 level 0 (refer to immediately preceding level 0 frame 1)
frame 5 level 1 (refer to immediately preceding level 0 frame 4)
frame 6 level 1 (refer to immediately preceding level 1 frame 5)
frame 7 level 0 (refer to immediately preceding level 0 frame)
and so on Such a change may be made when the data arrival rate at the image processing apparatus 200 often exceeds a predetermined threshold.

According to compression coding of a plurality of images corresponding to each frame as described above, a plurality of images corresponding to each frame of a moving image are divided into image blocks under the rule according to the acquisition order of image data, and are compression-coded in units of an image block. In this case, a compression rate is raised by using a compression coding result of a certain image to compression-code a different image. In this manner, a time period required for compression coding itself can be reduced, and transmission is allowed from the image block for which compression coding has been completed. Accordingly, image display with a short delay is achievable even in an image distribution via a network.

Moreover, the size of data to be transmitted can be reduced. This contributes to robustness for a change of the communication status. For example, even in a mode for transmitting three or more pieces of image data, a necessary communication bandwidth can be reduced in comparison with a case of transmitting the whole images. In addition, data is completed within each image block, and therefore, recovery is easily achieved even in a case of a data loss during communication. As a result, images can be displayed with a reduced delay time period and with high image quality. Moreover, various types of environments, such as the number of image processing apparatuses corresponding to transmission destinations, the communication status, and the processing performance of the image processing apparatuses, can be handled in a flexible manner. Efficiency improvement, delay reduction, and image quality increase can be achieved at the same time in a highly flexible manner during game live coverage (eSport live) and cloud gaming where a large number of persons participate, for example.

6. Optimization of Data Size Reduction Means

It is preferable to reduce the size of data to be transmitted to a smallest possible size in order to transmit the data from the server 400 to the image processing apparatus 200 with a short delay and in a stable manner. On the other hand, it is preferable to maintain the resolution and the frame rate at a certain level or prevent a rise in compression rate in order to provide high-level user experiences such as realistic sensation and a sense of immersion into a display world. Accordingly, a dilemma arises in this point. For achieving a preferable balance between these aspects, the server 400 optimizes transfer data reduction means according to contents of images.

Figure 26:
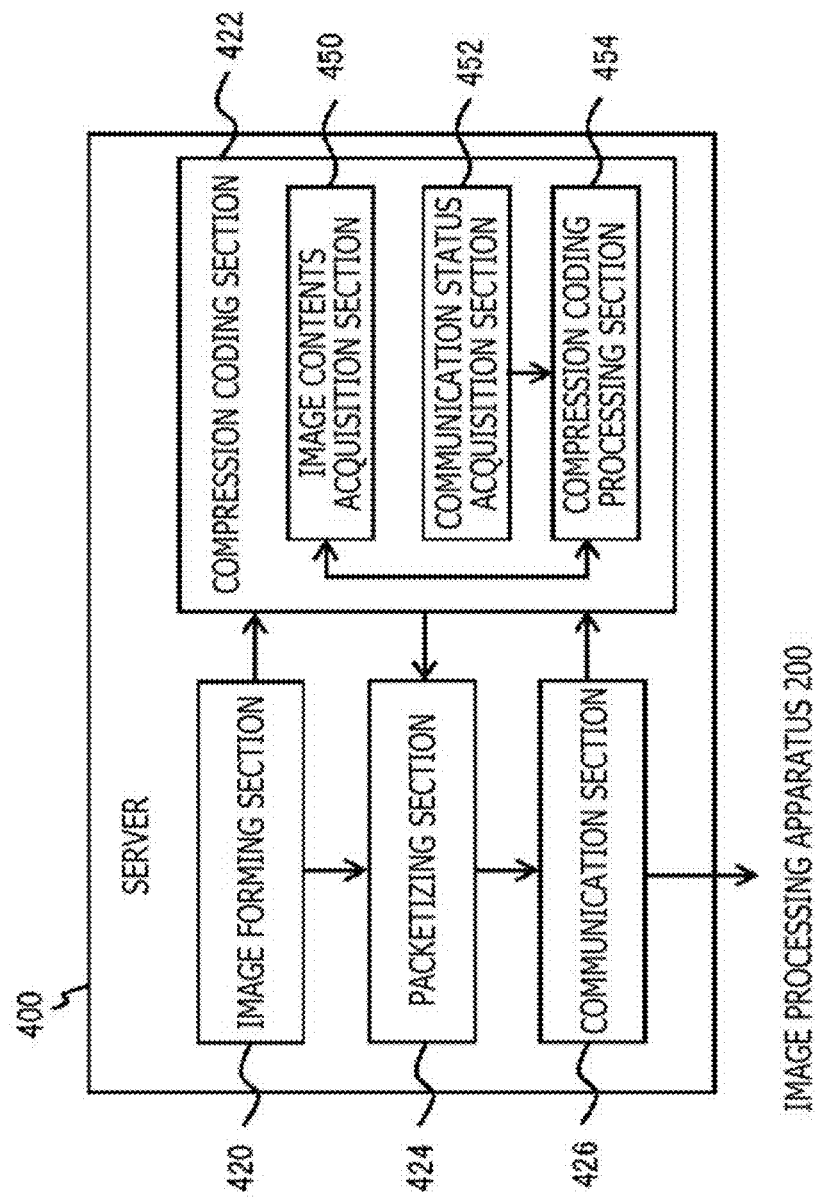
FIG. 26 is a diagram depicting a configuration of function blocks of the server having a function of optimizing data size reduction means according to the present embodiment.

FIG. 26 depicts a configuration of function blocks of the server 400 having a function of optimizing data size reduction means. The server 400 includes the image forming section 420, the compression coding section 422, the packetizing section 424, and the communication section 426. The image forming section 420, the packetizing section 424, and the communication section 426 have functions similar to the corresponding functions described with reference to FIGS. 5 and 12. It should be noted that the image forming section 420 herein may draw a moving image to be transmitted on the spot, i.e., dynamically draw a video that has not been present before.

Moreover, in a case where a plurality of images corresponding to each frame are to be transmitted, the compression coding section 422 may further include the dividing section 440, the second coding section 444, the transmission target adjustment section 362, and the like depicted in FIGS. 20 and 23. The compression coding section 422 includes an image contents acquisition section 450, a communication status acquisition section 452, and a compression coding processing section 454. The image contents acquisition section 450 acquires information associated with contents indicated by a moving image to be processed.

For example, the image contents acquisition section 450 acquires, from the image forming section 420, characteristics of an image drawn by the image forming section 420 for each frame at a predetermined timing such as a scene switching timing and a processing start timing of a moving image. According to the present embodiment, a moving image being displayed is basically formed or acquired in real time. Accordingly, the image contents acquisition section 450 can acquire correct information associated with contents without increasing a processing load even in a small processing unit such as for each frame.

For example, the image contents acquisition section 450 can obtain, from the image forming section 420, information indicating whether or not the current time is a scene switching timing, a type of image texture indicated in a frame, a distribution of feature points, depth information, an amount of objects, a use amount of each level of mipmap texture used for three-dimensional graphics, LOD (Level Of Detail), a use amount of each level of tessellation, an amount of characters and symbols, a type of scenes to be expressed, and the like.

The type of image texture herein refers to a type of a region expressed by a texture in an image. Examples of the type of image texture include an edge region, a flat region, a region having high density, a detailed region, and a region of a crowd. Note that the edge refers to a portion where a change rate of a luminance value in an image is a predetermined value or higher. The distribution of feature points refers to positions of feature points or edges in an image plane, or edge intensity, i.e., a change rate of a luminance value, or the like. The various types of texture regions described above are regions whose texture is two-dimensionally determined in a two-dimensional image resulting from image drawing as three-dimensional graphics. Accordingly, the texture of the texture regions here is different from texture used for formation of three-dimensional graphics.

The depth information refers to a distance to an object indicated by each of pixels and is obtained as a Z value in three-dimensional graphics. Moreover, the amount of objects refers to the number of indicated objects such as a chair and a vehicle, or an occupation area thereof in an image plane. The level of mipmap texture refers to a selected level of resolution in a mipmap method which prepares data of texture expressing a surface of an object with a plurality of resolutions and uses texture with an appropriate resolution depending on the distance to the object and the size of the object in appearance.

The levels of LOD and tessellation refer to levels of detail in a technology for expression with an appropriate level of detail by adjusting the number of polygons according to the distance to the object and the size in appearance. The type of scenes to be expressed refers to a situation, a category, or the like of output of content such as a game being executed by the image forming section 420, and includes types such as a movie screen, a menu screen, a setting screen, a loading screen, first-person visual line drawing, bird's eye view visual line drawing, a two-dimensional dot picture game, a three-dimensional image drawing game, a first-person shooting game, a race game, a sport game, an action game, a simulation game, and an adventure novel game.

The image contents acquisition section 450 acquires at least any one of these pieces of information from the image forming section 420. Note that the image contents acquisition section 450 and a score calculation function to be described below may be incorporated in the image forming section 420. Specifically, a game engine or the like which is a software framework operating in the image forming section 420 may perform these functions. Moreover, the image contents acquisition section 450 may acquire at least any one of a timing of a user operation associated with content specifying moving images such as a game, an interval of this timing, contents of a user operation, which are transmitted from the image processing apparatus 200, a status of content recognized by the image forming section 420, and a status of audio generated by the content.

The timing of a user operation may be different from the timing of frame drawing of a moving image by the image forming section 420. Accordingly, the timing of a user operation may be utilized for detection of a scene switching timing so as to be utilized for switching of data size adjustment means or an adjustment amount. The status of content refers to information acquired from the image forming section 420 and used for determining at least any one of a) whether a scene requires a user operation and influences processing contents of content, b) whether a scene is a movie scene not requiring a user operation, c) whether a scene is other than a movie scene and is one not requiring a user operation, and d) whether a scene requires a user operation but is not included in an original story of content.

In this manner, the data size adjustment means or the adjustment amount can be optimized in terms of whether priority is given to responsiveness to a user operation or to image quality. Moreover, the status of audio refers to information for determining at least any one of the presence or absence of audio, the number of channels of audio, contents of background music, and contents of effective sounds (SE), and is acquired from a not-depicted audio generating device.

Alternatively, the image contents acquisition section 450 may analyze images formed by the image forming section 420, to acquire at least any one of the pieces of information described above. In this case, similarly, the timing of the analysis process is not limited to a particular timing. Moreover, when the server 400 starts distribution of a moving image or the like, the image contents acquisition section 450 may acquire the type of scene described above and the like by reading bibliographic information associated with the moving image from a not-depicted storage device or the like.

The image contents acquisition section 450 may also acquire information associated with the contents of the moving image, by utilizing information acquired by the compression coding process performed by the compression coding processing section 454. For example, in a case where motion compensation is implemented in the compression coding process, an amount of an optical flow, i.e., in which direction pixels are moving, a moving speed of a pixel region, and the like are obtained. In which direction a rectangular region in an image is moving, and a speed of movement if the region is moving, and the like are obtained also by motion estimation (ME).

Moreover, an allocation status of a coding unit used by the compression coding processing section 454 for processing, a timing of insertion of an intra frame, and the like are also obtained in the compression coding process. The latter is the basis for specifying a scene switching timing in a moving image. Note that the image contents acquisition section 450 may acquire any one of parameters presented in a "score control rule at scene switching timing" to be described below. The image contents acquisition section 450 may acquire any one of these pieces of information from the compression coding processing section 454, or may acquire necessary information by analyzing images by itself. In this case, similarly, the acquisition timing is not limited to a particular timing.

As described with reference to FIG. 23, the communication status acquisition section 452 acquires a status of communication with the image processing apparatus 200 at a predetermined rate. The compression coding processing section 454 performs compression coding such that the data size of a moving image becomes an appropriate size, by using means determined on the basis of contents expressed by the moving image according to a change of the communication status. Specifically, the compression coding processing section 454 adjusts the data size to a size determined according to the communication status by changing at least any one of the frame rate, the resolution, and the quantization parameters of the moving image. Basically, contents of an image are evaluated in multilateral standpoints, and a combination of numerical values (of the frame rate, the resolution, and the quantization parameters) optimized for the contents is determined.

At this time, the compression coding processing section 454 determines means and an adjustment amount corresponding to an adjustment target on the basis of matters to which priority should be given for optimizing user experiences under conditions of a limited communication band and limited processing resources. For example, for providing a scene of first-person shooting or a scene of a fighting action which requires instant linkage with user input to handle speedy moving of figures, or achieving virtual reality or augmented reality, it is preferable to give priority to the frame rate. For a scene which contains many fine objects and requires reading of characters, symbols, signs, and dotted pictures, it is preferable to give priority to the resolution.

For a scene which contains figures moving at a low speed, but requires less compression failure in gradation expression and high image quality due to high contrast and a high dynamic range as an image, it is preferable to give priority to the quality of quantization. As described above, the matters to which priority should be given differ depending on contents of images. Accordingly, the compression coding processing section 454 adjusts the data size to an appropriate size in consideration of these points by using means capable of maintaining user experiences as much as possible even in an inferior communication status.

The rule for determining the adjustment means and the adjustment amount on the basis of the contents of the moving image is prepared beforehand in a form of a table, a calculation model, or the like and is retained within the compression coding processing section 454. However, a large number of pieces of information indicating the contents of the moving image are present as described above. In this case, a plurality of adjustment means need to be optimized in comprehensive consideration of these. Accordingly, the compression coding processing section 454 derives a score for determining the adjustment means and the adjustment amount on the basis of at least any one of the following rules.

1. Balance Determining Rule Based on Content Status

A balance (priority order) of weights given to the frame rate, the resolution, and the quality of quantization is determined according to which of a to d described above corresponds to an output status of content. Specifically, in the case of the scene a) requiring a user operation and influencing contents of processing content, at least any one of score determination rules described below is adopted. In the case of the movie scene b) not requiring a user operation, higher priority is given to the quality of quantization or the resolution than priority given to the frame rate. In the case of the scene c) other than a movie scene and not requiring a user operation, higher priority is given to the resolution or the frame rate than priority given to the quality of quantization. In the case of the scene d) requiring a user operation but not included in the original story of content, higher priority is given to the resolution or the quality of quantization than priority given to the frame rate.

2. Balance Determining Rule Based on Content Category

In the case a, i.e., in the scene requiring a user operation and influencing contents of processing content, a category of content currently being executed is read from a storage device or the like, and a balance of scores indicating weights of the resolution, the frame rate, and the quantization parameters separately prepared as a table and generally recommended for each category is referred to. Note that this rule may also be used as an initial value in a case where a score to be finally used is decided by applying a plurality of rules described hereinafter in parallel and comprehensively determining results of these rules.

3. Score Determining Rule Based on Size of Figure in Image

With reference to an LOD, mipmap texture, tessellation, and an object size, if an object finer than a predetermined value is present, scores indicating weights of the quality of quantization and the resolution are raised as a rate of an occupation area of the object in an entire image increases (a large and fine object is present near a view screen).

4. Score Determining Rule Based on Fineness of Object

If many objects smaller than a predetermined value or many fine characters, symbols, signs, or dotted pictures are present, a score indicating a weight of the resolution is raised as a rate of an occupation area of these objects in an entire image becomes larger than a predetermined value (a large and fine object is absent near the view screen).

5. Score Determining Rule Based on Contrast and Dynamic Range

With reference to contrast based on a distribution of pixel values or a dynamic range based on a luminance distribution, a score indicating a weight of the quality of quantization is raised as each of rates of occupation areas of a region of higher contrast and a region of higher dynamic range than a predetermined criterion in an entire image increases.

6. Score Determining Rule Based on Figure Movement

With reference to a movement amount of a figure of an object, and sizes and amounts of an optical flow and motion estimation, a score indicating a weight of the frame rate is raised as an amount of objects moving by an amount larger than a predetermined amount and a rate of an occupation area of the objects in an entire image increase.

7. Score Determining Rule Based on Texture Type

Image texture types of respective unit regions obtained by dividing an image plane are added up. A score indicating a weight of the resolution is raised as each of rates of occupation areas of a dense region, a detailed region, and a crowd region in an entire image increases.

8. Score Control Rule at Scene Switching Timing

Information associated with a switching timing is obtained from the image forming section 420. Alternatively, a score is switched when any one of an object amount, a feature point, an edge, an optical flow, motion estimation, pixel contrast, a dynamic range of luminance, presence or absence of audio, the number of audio channels, and an audio mode is suddenly changed or reset in a time-series direction. At this time, at least two frames are referred to. Note that the compression coding processing section 454 can detect scene switching on the basis of a correlation with a previous frame so as to recognize the necessity of a frame designated as an intra frame for compression coding.

In this case, accuracy of detection of switching may be enhanced by using the score determining rules described above as well as determination made by the compression coding processing section 454 using a conventional method. The scene switching detected in the above manner requires an intra frame, and a data size easily increases in a surging manner. Accordingly, scores indicating weights of the quantization parameters and the resolution are reduced in a target frame and a predetermined number of subsequent frames. Moreover, giving greater importance to rapid switching of a scene, a score indicating a weight of the frame rate may be set high until switching of a scene, and this control may be cancelled after switching.

9. Score Determining Rule Based on user Operation Timing

In content such as a game being executed by the image forming section 420, the frame rate is likely to decrease as an interval between user operations increases. Accordingly, a score indicating a weight of the frame rate is lowered as the interval increases (scores indicating weights of other parameters are lowered as the interval between user operations decreases).

10. Score Determining Rule Based on user Operation

In content such as a game being executed by the image forming section 420, in a case where a change amount of a user operation in an immediately preceding predetermined time period is large, it is estimated that the user expects high responsiveness from content. Accordingly, a score indicating a weight of the frame rate is raised as the change amount increases. In a case where a change amount is small even after execution of an operation, a level of this score is lowered by one stage.

Note that, as the user operation, input information acquired by a not-depicted input device such as a game controller, a keyboard, and a mouse; a position, a posture, and movement of the head mounted display 100; a gesture (hand sign) instruction based on a result of analysis of an image captured by a camera of the head mounted display 100 or a not-depicted external camera; a voice instruction acquired by a not-depicted microphone; and the like are acquired from the image processing apparatus 200.

11. Score Determining Rule for Object as user Operation Target

When an object meeting a predetermined criterion for determining that a user operation is reflected in an immediately preceding predetermined time period is present in a screen, a score derived under a different determination rule is adjusted to be increased. The user herein may be a single person, or a plurality of persons sharing the same image processing apparatus 200 or having different image processing apparatuses 200 connected to the same server 400. The object in the screen on which the user operation is reflected is generally a target to which the user pays the highest attention. Examples of such object include an object such as a person, an avatar, a robot, a vehicle, and a machine corresponding to an operation target by the user; an object confronting this main object; and a unit region containing an indicator provided for a purpose of notifying a player of information such as a life status, a weapon status, and a game score of a player in a game.

Information indicating a correlation between user operation contents and an object in a screen is acquired from the image forming section 420 in principle. The image contents acquisition section 450 may estimate this information. When such an object is detected according to a predetermined criterion, the compression coding processing section 454 raises a score in the score determination in each of 3 to 9 and 10 described above, for example, to a score higher than that in other cases. In other words, this determination rule has a function of preferentially applying the foregoing determining rules to the object corresponding to the user operation target. For example, in 3 above, when a score is slightly lower than a criterion score for raising weights of the quality of quantization and the resolution on the basis of the sum of the scores of the entire screen based on the figure size, the compression coding processing section 454 raises the score to this criterion.

In 6 above, when a score is slightly lower than a criterion score for raising a weight of the frame rate on the basis of the sum of the scores of the entire screen based on the figure movement, the compression coding processing section 454 raises the score to this criterion. In 8 above, concerning a scene switching timing, when a score is slightly lower than a score for determining4 interposition of an intra frame on the basis of the sum of the scores of the entire screen even after a rapid change in a region of an object corresponding to a user operation target, the compression coding processing section 454 raises the score to this criterion.

12. Control of Switching Frequency of Adjustment Target and Adjustment Amount

With reference to a history (of the frame rate, the resolution, and the quantization parameters) adopted in an immediately preceding predetermined time period, scores indicating weights of the respective parameters are adjusted such that switching falls within an allowable range in terms of user experiences. The "allowable range" is determined on the basis of a table or a model defined beforehand.

The compression coding processing section 454 comprehensively determines final weights of the frame rate, the resolution, and the quantization parameters on the basis of any one of the foregoing rules, or the sum of scores obtained under a plurality of rules. Note that the compression coding processing section 454 may refer to a Z value to recognize a position of an object, an order of projection, a size, and a relative distance from a view screen under the rules 1 to 8 described above.

Note that it is preferable to optimize the determining rules described above themselves. Accordingly, the determining rules may be optimized by machine learning or deep learning while adjustment results of various past cases are collected. In a case where machine learning is executed herein, an optimization target may be either a table defining the determining rules, or a calculation model. In the case of deep learning, a calculation model is optimized.

In these learning technologies, a score database manually created, a game play bodily sensation experienced by the user, or the like is designated as teacher data, for example. Moreover, learning is achieved while a case of subjective image drawing is designated as a limiting condition of a calculation model, or PSNR (Peak Signal-to-Noise Ratio) or SSIM (Structural Similarity) indicating image quality, a parameter switching frequency, time-series smoothness, or the like is designated as an index. In this example, a parameter switching frequency is added as an index in consideration that user experiences rather deteriorate by excessively switching the resolution or the frame rate at small intervals.

In this manner, the compression coding processing section 454 derives final scores indicating weights given to the frame rate, the resolution, and the quality of quantization, and determines a combination of values (of the frame rate, the resolution, and the quantization parameters) in such a manner as to obtain a data size corresponding to the communication status and satisfy the balance indicated by the scores. More specifically, the compression coding processing section 454 predicts and calculates a combination of respective values so as to meet a target data size determined according to the communication status. In this case, parameters to which heavy weights are given are so controlled as not to decrease as much as possible.

After determining an optimum combination, the compression coding processing section 454 compression-codes data according to the determined combination. For example, for lowering the frame rate, the compression coding processing section 454 thins out frames formed by the image forming section 420 by a predetermined amount per unit time period. In a case of lowering of the resolution, the compression coding processing section 454 performs an existing calculation for an image formed by the image forming section 420, such as a nearest neighbor method, a bilinear method, and a bicubic method.

Moreover, the compression coding processing section 454 compression-codes an image formed by the image forming section 420 at an appropriate compression rate, by using the adjusted quantization parameters. The compression coding processing section 454 performs each of these processes in units of a partial image of a frame formed by the image forming section 420, and sequentially supplies the processed partial images to the packetizing section 424. At this time, the partial images are supplied in association with data of the frame rate, the resolution, and the quantization parameters, and therefore, the packetizing section 424 packetizes data of the partial images together with these pieces of data.

In this manner, the pieces of data of the compression-coded partial images are transmitted to the image processing apparatus 200 via the communication section 426 in a manner similar to the manner described above. Note that the unit of optimization of the adjustment means and the adjustment amount of the data size by the compression coding processing section 454 may be a unit of a partial image corresponding to the unit of compression coding, a unit of one frame, or a unit of a predetermined number of frames, for example. The decoding decompression section 242 of the image processing apparatus 200 performs inverse quantization on the basis of the quantization parameters transmitted together with the image data.

Moreover, in a case where the resolution or the frame rate is reduced to a value lower than the original value, the size is adjusted to a size matched with a screen size of the connected display device, or the same frame is output several times to display images. The foregoing procedures of the display process corresponding to the change of the resolution or the frame rate may be achieved using an ordinary technology. In addition, in a case where the compression coding section 422 of the server 400 lowers the resolution, added data not identifiable only by an image having this lowered resolution may be transmitted together from the server 400.

Examples of the added data herein include a feature value of an original image formed by the image forming section 420 and various types of parameters determined by the compression coding section 422 at the time of compression coding. The feature value may include information associated with at least any one of a feature point of the original image, edge intensity, depth of each pixel contained in the original image, a texture type, an optical flow, and motion estimation. Alternatively, the added data may include data specified by an object recognition process performed by the compression coding section 422 and indicating an object expressed by the original image. In this case, the decoding decompression section 242 of the image processing apparatus 200 accurately forms a display image having a high resolution on the basis of the transmitted image data and the transmitted added data. Note that these characteristics are described in an application filed by the present inventor as Japanese Patent Application No. 2019-086286.

Figure 27:
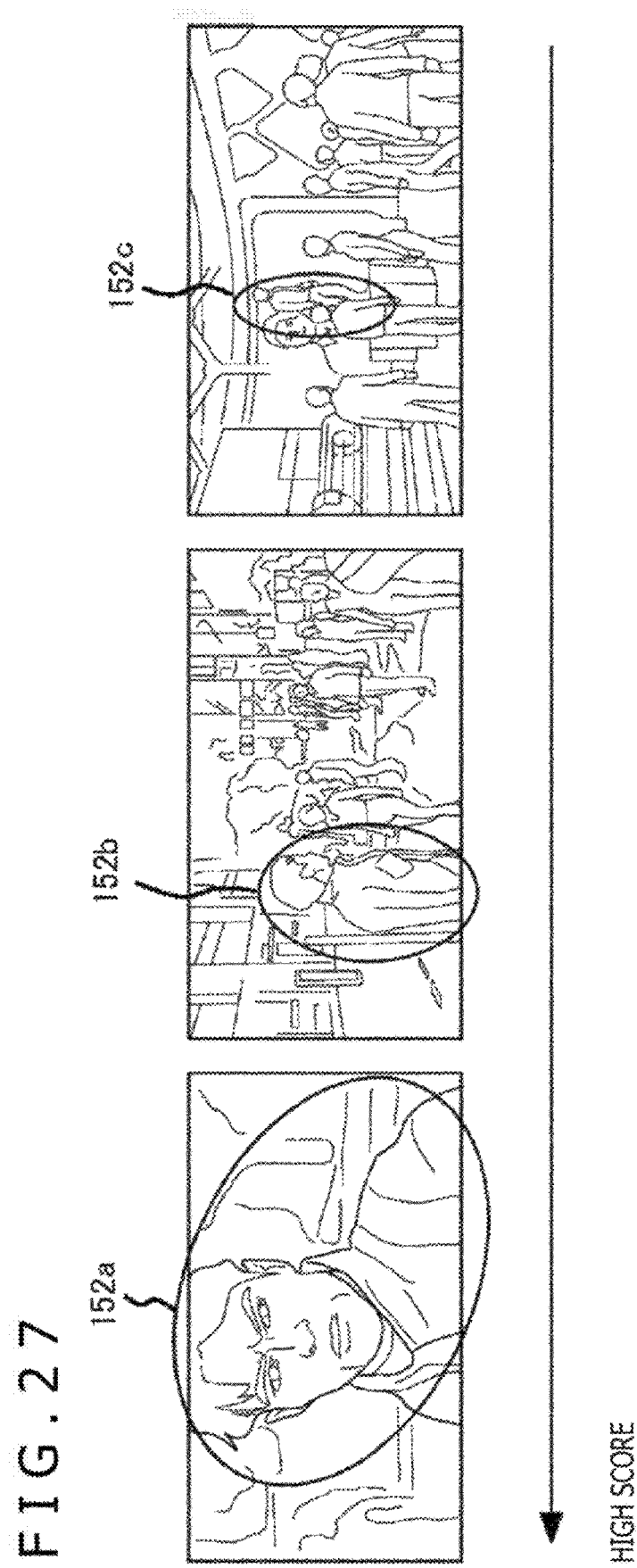
FIG. 27 is a diagram depicting an example of determining a score according to contents of a moving image according to the present embodiment.

FIGS. 27 to 31 each depict an example of determining a score according to contents of a moving image. FIG. 27 depicts an example of 3 described above in which the score determining rule based on the size of a figure in an image is applied. Three images depicted in the figure indicate different frames of a same moving image. Objects 152a, 152b, and 152c indicating a same object model are drawn in the respective frames. The object model actually has three-dimensional information constituted by polygons and texture.

The image forming section 420 positions the object model in a space to be drawn and projects an image of the object model onto a view screen to draw an image of each of the objects 152a, 152b, 152c, and so on. At this time, each size of the objects 152a, 152b, and 152c in appearance changes depending on the distance from the view screen. Accordingly, the image forming section 420 adjusts the number of polygons and the resolution of texture used for drawing as appropriate.

For example, an object model 150 is defined by one million polygons. On the other hand, the object 152c located away from the view screen is drawn using ten thousand polygons, while the object 152a located near the view screen is drawn using one hundred thousand polygons. In addition, a relation (object 152a>object 152b>object 152c) holds concerning the resolution of the texture. The image contents acquisition section 450 acquires these pieces of information, such as an LOD of the object as viewed from the view screen, a level of mipmap texture, a level of tessellation, and a figure size, from the image forming section 420 as information associated with contents indicated by the image.

Thereafter, the compression coding processing section 454 adjusts the frame rate, the resolution, and the quantization parameters on the basis of the information associated with the contents indicated by the image, to obtain a data size corresponding to the communication status. Specifically, object LODs, levels of mipmap texture, levels of tessellation, and figure sizes of all objects appearing in a scene are added up to calculate scores which are given to parameters to be adjusted. According to the example, the image depicted nearer the left side contains an object more finely drawn, and a rate of an occupation area of this object in an entire image increases (a person or an avatar is finely drawn on the whole). Accordingly, scores indicating weights given to the quality of quantization and the resolution are raised.

FIG. 28 depicts an example of 4 described above in which the score determining rule based on fineness of an object is applied. Two images depicted in the figure indicate different frames of a same moving image. Each of the images indicates a zoomed-in or zoomed-out frame of a same scenery. Sizes and amounts of figures of objects are added up as contents indicated by the image. In this case, the left image contains a larger amount of small objects, and a rate of an occupation area of these objects in the entire image is larger (the left image contains many fine objects, characters, symbols, sings, and dotted pictures on the whole). Accordingly, the compression coding processing section 454 in this example raises a score indicating a weight given to the resolution of the left image.

FIG. 29 depicts an example of 5 described above in which the score determining rule based on contrast and a dynamic range is applied. Contrast and a dynamic range for each of unit regions in a predetermined size produced by dividing an image plane are added up as contents expressed by an image. In this case, an occupation area of a region having high contrast or a high-dynamic range in the entire image is larger in the left image. Accordingly, the compression coding processing section 454 in this example raises a score indicating a weight given to the quality of quantization of the left image.

Figure 30:
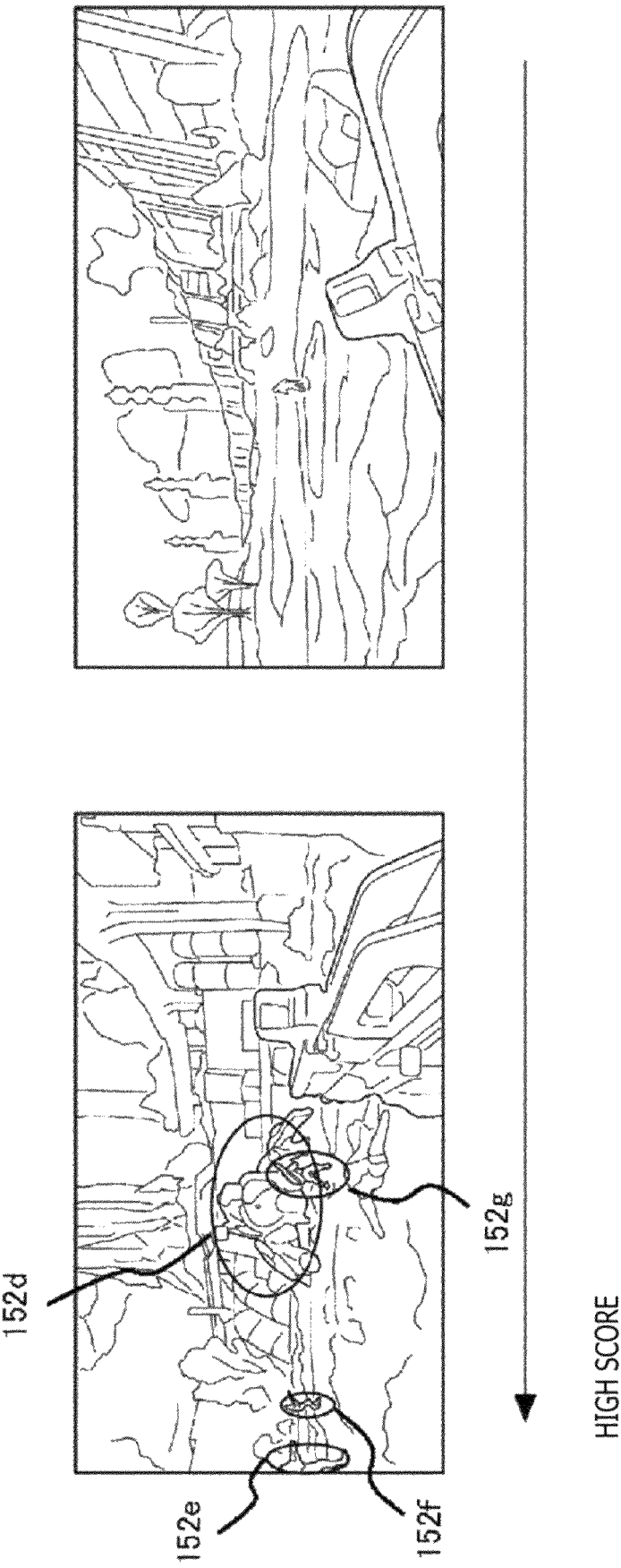
FIG. 30 is a diagram depicting an example of determining a score according to contents of a moving image according to the present embodiment.

FIG. 30 depicts an example of 6 described above in which the score determining rule based on movement of a figure in an image is applied. Two images depicted in the figure indicate different frames of a same moving image. An absolute value of a movement amount (vector) of an object in an image plane, and sizes and amounts of an optical flow and motion estimation for each unit region in a predetermined size produced by dividing the image plane are added up as contents indicated by the image. In this case, because of the presence of objects 152d to 152g each exhibiting large movement, the left image contains more objects each having a large movement amount and has a higher rate of an area of the objects in the entire image, i.e., the sum of the absolute values of the movement amounts (vectors) of the objects in the entire image is larger in the left image. Accordingly, the compression coding processing section 454 in this example raises a score indicating a weight given to the frame rate of the left image.

Figure 31:
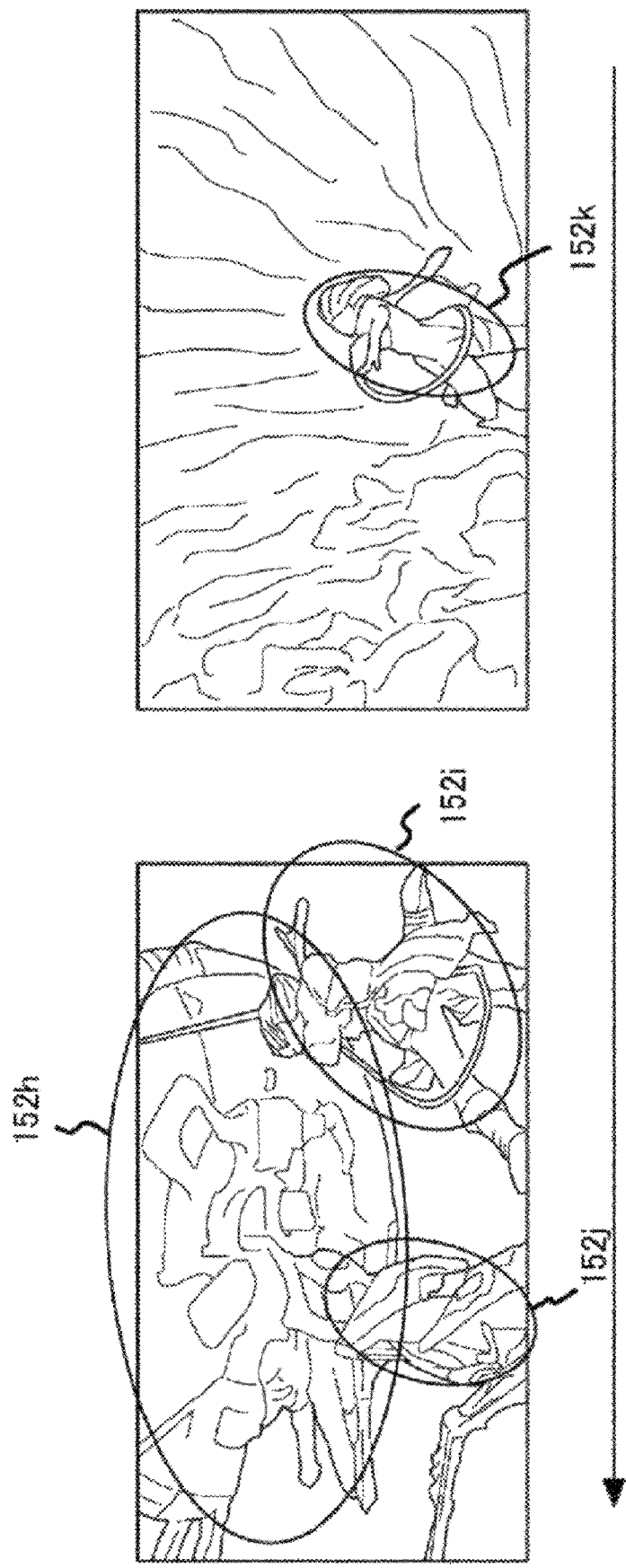
FIG. 31 is a diagram depicting an example of determining a score according to contents of a moving image according to the present embodiment.

FIG. 31 depicts an example of 7 described above in which the score determining rule based on a texture type is applied. Two images depicted in the figure indicate different frames of a same moving image. An image texture type for each unit region in a predetermined size produced by dividing an image plane is added up as contents indicated by the image. In this case, because of a difference between objects 152h to 152j and an object 152k, a rate of an occupation area of a dense region, a detailed region, and a crowd region in the entire image is larger in the left image. Accordingly, the compression coding processing section 454 in this example raises a score indicating a weight given to the resolution of the left image.

Figure 32:
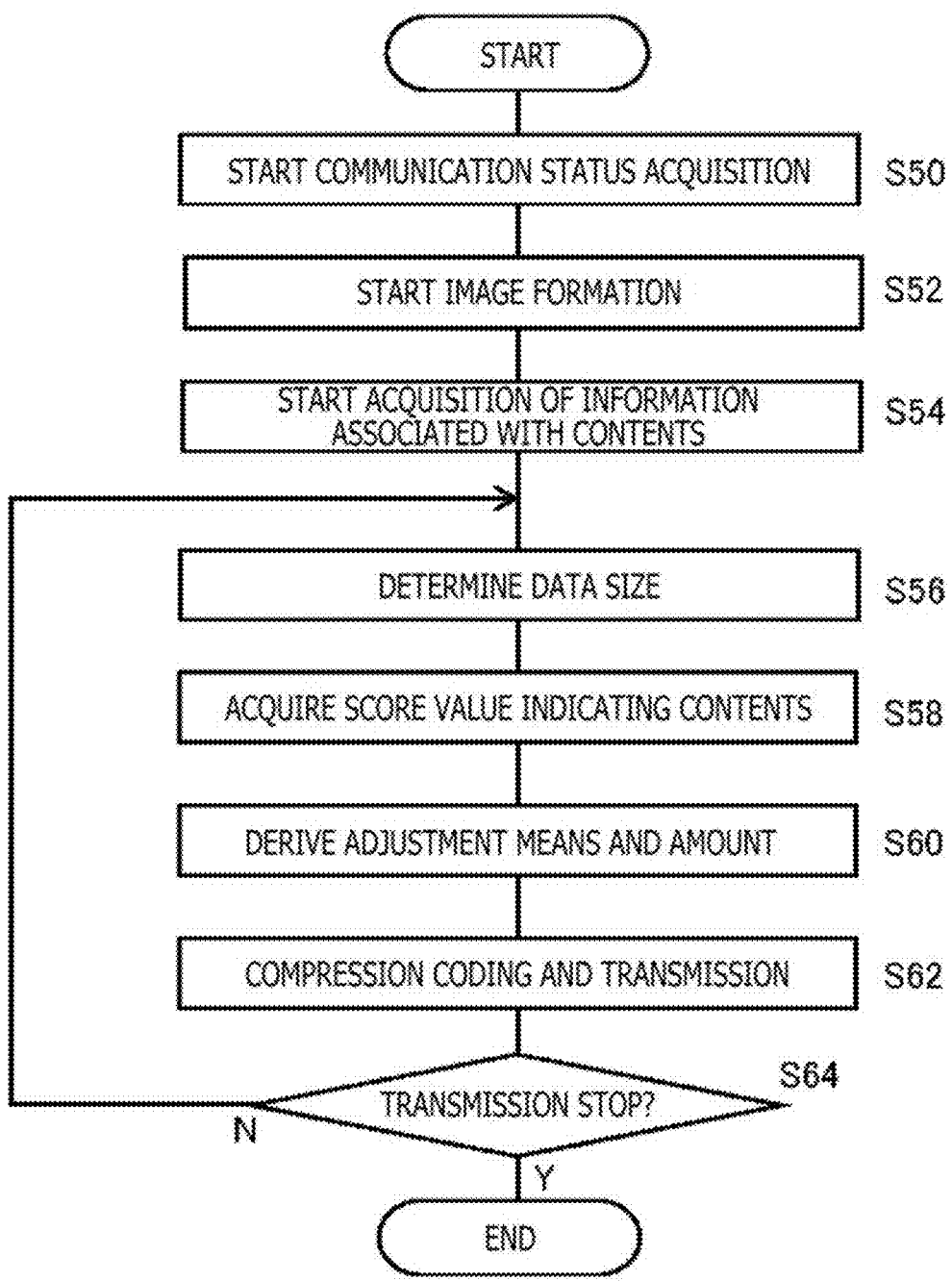
FIG. 32 is a flowchart presenting a processing procedure performed by the server for adjusting a data size depending on a communication status according to the present embodiment.

FIG. 32 is a flowchart presenting a processing procedure performed by the server 400 for adjusting a data size depending on the communication status. The process of this flowchart is started when the user selects a game to play, a moving image to enjoy, or the like and inputs the selection to the image processing apparatus 200. In response to this start, the communication status acquisition section 452 of the server 400 starts status acquisition of communication used for streaming to the image processing apparatus 200 (S50).

As described above, the communication status is identified by signal transmission and reception to and from the image processing apparatus 200. Accordingly, the communication status acquisition section 452 acquires necessary information from the communication section 426. Specifically, the communication status acquisition section 452 acquires an arrival delay time period of image data transmitted to the image processing apparatus 200 and an arrival rate of the image data, and derives an index indicating the communication status from these pieces of information. A derivation rule is set beforehand. On the other hand, the image forming section 420 starts formation of a moving image (S52). However, the image forming section 420 is not required to draw an image of computer graphics, and may acquire a captured image from a camera.

On the other hand, the image contents acquisition section 450 of the compression coding section 422 starts acquisition of information associated with contents of a moving image (S54). As described above, the image contents acquisition section 450 acquires predetermined information at any timing by acquiring information from the image forming section 420 and the compression coding processing section 454 or analyzing the image itself. Subsequently, the compression coding processing section 454 determines a transmission size of image data according to the most recent communication status acquired by the communication status acquisition section 452 (S56).

Thereafter, the compression coding processing section 454 first acquires scores under at least any one of the rules described above on the basis of contents of a moving image acquired by the image contents acquisition section 450 at that time (S58). Subsequently, the compression coding processing section 454 derives adjustment means and an adjustment amount of a data size on the basis of the obtained scores (S60). Specifically, the compression coding processing section 454 calculates comprehensive weights given to the frame rate, the resolution, and the quantization parameters by summing the scores, for example, and determines values of respective parameters such that a balance corresponding to these weights and a target data size can be obtained.

Means for obtaining scores from parameters indicating the contents of the moving image and means for deriving the adjustment means and the adjustment amount from scores may be achieved by preparing a table indicating respective correspondences or by modeling a derivation rule and implementing the model as a program or the like. In this case, the adjustment means and the adjustment amount may be varied depending on a level of the communication status. Note that, even in a case where a transmittable data size does not change in a stable communication status, the compression coding processing section 454 may continuously derive scores corresponding to the contents of the moving image and change a combination of respective values of the frame rate, the resolution, and the quantization parameters even in the same transmission size.

A specific threshold is not given to the communication status while transmission is allowed to continue except for an abnormal state. Multiple stages of the data transmission size are determined according to the communication status, and the combination of the frame rate, the resolution, and the quantization parameters is adjusted according to the determined data transmission size. Moreover, as described above, the table for defining the deriving rule and the calculation model may be optimized using machine learning or deep learning as necessary. While the procedure depicted in the figure is a two-stage process which acquires score values from the contents of the moving image in S58 and obtains the adjustment means and the adjustment amount on the basis of the acquired score values in S60, a determining rule may be prepared so as to directly obtain the adjustment means and the adjustment amount from the contents of the moving image.

The compression coding processing section 454 compression-codes image data in units of a partial image while having the data size adjusted by the adjustment means and the adjustment amount determined in the manner described above, and sequentially supplies the compression-coded image data to the packetizing section 424 (S62). At this time, the compression coding processing section 454 supplies the image data in association with information indicating the resolution, the frame rate, and the quantization parameters. The packetizing section 424 packetizes the supplied data and transmits the packetized data from the communication section 426 to the image processing apparatus 200. Note that the compression coding processing section 454 may perform acquisition of scores and derivation of the adjustment means and the adjustment amount in the background of the compression coding process. Moreover, in an actual situation, the frequency of data size determination in S56 and the frequency of compression coding and transmission in units of a partial image in S62 may be the same or different from each other.

In this manner, the compression coding processing section 454 may reset the means for adjustment of the data size and the adjustment amount at predetermined time intervals. Unless stop of image transmission is requested by a user operation input to the image processing apparatus 200 or the like (N in S64), the processes of compression coding and transmission are repeated for subsequent frames while changing the adjustment means and the adjustment amount as necessary (S56, S58, S60, and S62). However, as described in 11 above, the compression coding processing section 454 makes adjustment within an allowable range where user experiences are not deteriorated with reference to a history of changes of the adjustment means and the adjustment amount in an immediately preceding predetermined time period. When stop of image transmission is needed, the server 400 ends all the processes (Y in S64).

According to the optimization of the data size reduction means as described above, the data size of an image is adjusted by means and an amount suited for information associated with contents indicated by a moving image currently being transmitted according to the status of communication used for streaming from the server 400 to the image processing apparatus 200. In this case, adjustment is made by a combination of a plurality of kinds of adjustment means such as the resolution, the frame rate, and the quantization parameters, to thereby considerably increase variations of possible state changes in comparison with adjustment of only one parameter. As a result, deterioration of image quality can be reduced as much as possible within a range allowable for the user.

Moreover, measures can be taken on the basis of more accurate and detailed data by acquiring information from the image forming section which forms images in real time and the compression coding processing section which performs compression coding as information associated with contents of a moving image. Each of the image forming section and the compression coding processing section herein is only required to perform an ordinary process. Accordingly, adjustment of the data size is achievable by an optimum method on each occasion without increasing a processing load.

7. Compression Rate Control for each Region 7-1. Control Based on Contents Indicated by Moving Image According to 6 described above, the data size is controlled by adjusting the combination of the resolution, the frame rate, and the quantization parameters for each frame as a minimum unit, on the basis of various kinds of information associated with contents indicated by a moving image. On the other hand, a region to which the user pays attention in a displayed image is limited. Accordingly, by allocating more communication bands to this region, the image quality bodily sensed by the user can be enhanced even under the same condition.

Figure 33:
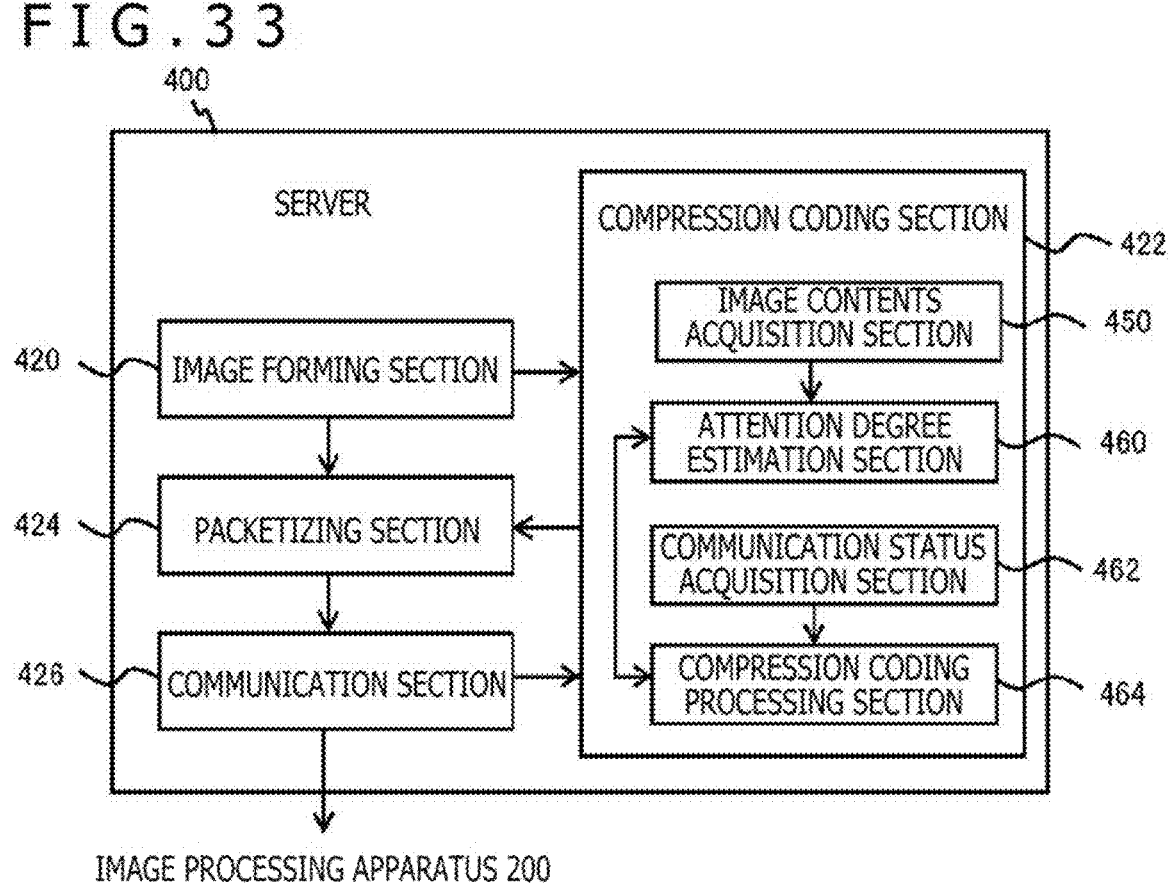
FIG. 33 is a diagram depicting a configuration of function blocks of the server which has a function of changing a compression rate depending on a region in a frame and on the basis of contents indicated by a moving image according to the present embodiment.

FIG. 33 depicts a configuration of function blocks of the server 400 which has a function of changing the compression rate depending on the region in a frame and on the basis of contents indicated by a moving image. The server 400 includes the image forming section 420, the compression coding section 422, the packetizing section 424, and the communication section 426. Each of the image forming section 420, the packetizing section 424, and the communication section 426 has a function similar to the corresponding function described with reference to FIGS. 5, 16, and 24. As described above, it should be noted that the image forming section 420 draws a moving image to be transmitted on the spot, i.e., dynamically draws a video that has not been present before, in some cases.

Moreover, in a case where a plurality of images corresponding to each frame are to be transmitted, the compression coding section 422 may further include the dividing section 440, the second coding section 444, the transmission target adjustment section 362, and the like depicted in FIGS. 20 and 23. The compression coding section 422 includes the image contents acquisition section 450, an attention degree estimation section 460, a communication status acquisition section 462, and a compression coding processing section 464. As described with reference to FIG. 26, the image contents acquisition section 450 acquires information associated with contents indicated by a moving image to be processed from the image processing apparatus 200, the image forming section 420, and the compression coding processing section 464, or acquires this information by performing image analysis by itself.

The attention degree estimation section 460 estimates, on the basis of the information associated with the contents indicated by the moving image, an attention degree of the user according to the contents to be indicated, for each of unit regions produced by dividing a frame plane of the moving image. The attention degree herein is an index, such as a numerical value, indicating a degree of attention by the user. For example, a high attention degree is estimated for a unit region which contains a main object, a unit region which contains a region expressing a character, or the like. Accordingly, the image contents acquisition section 450 may acquire information associated with a type and a position of an object indicated in the image in addition to the information associated with the contents of the moving image exemplified above with reference to FIG. 26.

This information may be acquired by an image recognition process performed by the image contents acquisition section 450 itself, or may be received as a notice of a result of image drawing from the image forming section 420 or the like. In the former case, the image contents acquisition section 450 may recognize images or estimate an attention degree of a recognized object by using at least any one of an optical flow, motion estimation, an allocation status of a coding unit, whether or not the current timing is a scene switching timing, a type of image texture indicated in a frame, a feature point distribution, depth information, and so on, which are already acquired.

The communication status acquisition section 462 has a function similar to the function of the communication status acquisition section 452 in FIGS. 23 and 26. The compression coding processing section 464 varies the compression rate in an image plane on the basis of the distribution of attention degrees estimated by the attention degree estimation section 460, and then compression-codes image data at the respective compression rates. At this time, the compression coding processing section 464 determines a distribution of compression rates and a distribution of quantization parameters in a frame plane on the basis of a combination of the attention degree, the communication bandwidth available for data transfer, the frame rate, and the resolution.

The compression coding processing section 464 qualitatively lowers the compression rate by lowering the values of the quantization parameters for a unit region for which a high attention degree is estimated, to thereby allocate a higher bit rate. However, determination of the quantization parameters based only on the estimated attention degree may lead to excessive compression or insufficient compression with respect to the available communication band.

Accordingly, as described above, the compression coding processing section 464 determines the distribution of compression rates in the image plane such that the data size of the entire frame is suitable for the available communication band in consideration of the frame rate and the resolution. Note that the compression coding processing section 464 performs compression coding in units of a partial image of a frame formed by the image forming section 420 as described above. For example, the partial image herein has a size of an integral multiple of a unit region for which an attention degree is estimated. The compression coding processing section 464 determines quantization parameters for each unit region and performs compression coding for each unit region contained in a partial image by using the determined quantization parameters. At this time, the compression coding processing section 464 recognizes a total data size for each partial image.

The compression coding processing section 464 sequentially supplies the partial image data compression-coded in this manner to the packetizing section 424. At this time, the partial image data is supplied in association with the quantization parameters applied to the unit regions of the partial image, to allow the packetizing section 424 to packetize the partial image data together with these pieces of data. In this manner, the compression-coded partial image data is transmitted to the image processing apparatus 200 via the communication section 426 in a manner similar to the manner described above. The decoding decompression section 242 of the image processing apparatus 200 performs inverse quantization on the basis of the quantization parameters transmitted together with the image data.

Figure 34:
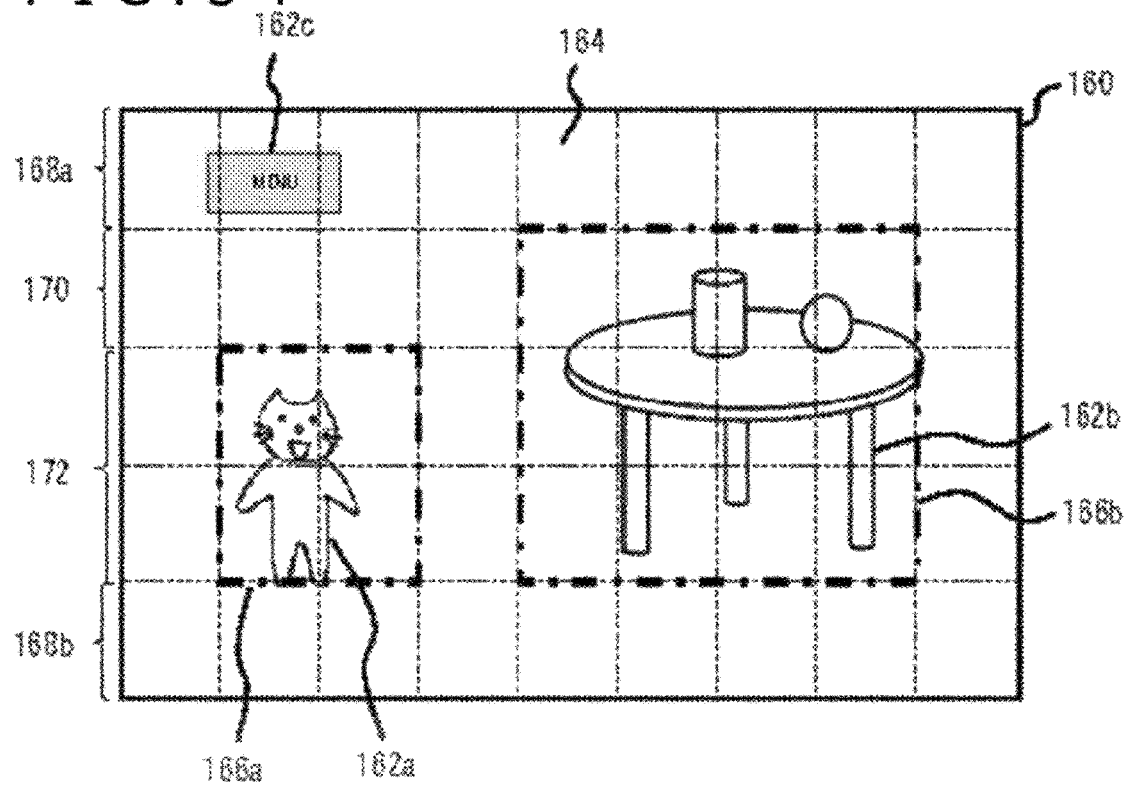
FIG. 34 is a diagram for explaining a process performed by an attention degree estimation section for estimating a distribution of attention degrees in an image plane according to the present embodiment.

FIG. 34 is a diagram for explaining a process performed by the attention degree estimation section 460 for estimating the distribution of attention degrees in an image plane. An image 160 indicates a certain frame in moving image data. The image 160 contains objects 162a and 162b and a GUI (Graphical User Interface) 162c. The attention degree estimation section 460 forms unit regions (e.g., unit region 164) by dividing the image plane at predetermined intervals in both of the horizontal and vertical directions as indicated by broken lines. Thereafter, an attention degree is estimated for each of the unit regions.

The figure indicates that a higher attention degree than those of other unit regions is estimated for each of unit region groups 166a and 166b surrounded by one-dot chain lines in which the objects 162a and 162b are indicated, respectively. In an actual situation, however, the attention degree is estimated on the basis of various kinds of information as exemplified in "6. Optimization of data size reduction means" described above, considering that more objects are displayed. Moreover, the attention degree may be constituted by two values of 0 and 1, i.e., no attention and attention, or may be expressed by more gradations. For example, the attention degree estimation section 460 may derive scores indicating the attention degree on the basis of at least any one of the following rules, and comprehensively determine the attention degree for each unit region on the basis of a sum of the scores.

1. Score Determining Rule Based on Importance of Object

A unit region containing an object satisfying a condition with respect to an importance degree is assigned with a score higher than those in other unit regions. Examples of such unit region include a unit region containing an object such as a person, an avatar, a robot, a vehicle, and a machine to be operated by the user; a unit region containing an object confronting this main object; and a unit region containing an indicator provided for a purpose of notifying a player of information such as a life status, a weapon status, and a game score of a player in a game. These objects are obtained as information from the image forming section 420 or estimated on the basis of linkage between an object specified by image recognition and a user operation, by the image contents acquisition section 450. Note that the user may be a single person, or a plurality of persons sharing the same image processing apparatus 200 or having different image processing apparatuses 200 connected to the same server 400.

2. Score Determining Rule Based on Area Rate of Figure of Object

A unit region containing an object, such as a person and an avatar or a robot having characteristics similar to those of a person, is assigned with a score higher than those in other unit regions as a rate of an occupation area of the object in an entire image increases. These objects are obtained as information from the image forming section 420 or specified by image recognition by the image contents acquisition section 450. For image recognition, an ordinary face detection algorithm or the like may be used. For example, a face is detected by searching an image for a portion which contains positions indicating feature values of eyes, a nose, and a mouth relatively located in a T shape.

3. Score Determining Rule Based on Presented Contents

A unit region containing an indicator provided for a purpose of notifying a player of information such as a life status, a weapon status, and a game score of a player in a game is assigned with a score higher than those in other unit regions. This indicator is obtained as information from the image forming section 420 or specified by image recognition by the image contents acquisition section 450.

4. Score Determining Rule Based on Fineness of Object

A unit region containing objects such as a fine character, a fine symbol, a fine sign, and a fine dotted picture is assigned with a score higher than those in other unit regions in a case where a rate of an occupation area of these objects in an entire image is small. These objects are obtained as information from the image forming section 420 or specified by image recognition by the image contents acquisition section 450.

5. Score Determining Rule Based on Size of Figure in Image

With reference to an LOD, mipmap texture, tessellation, and an object size, in a case where an object finer than a predetermined value is present, a unit region containing this object is assigned with a score higher than those in other unit regions as a rate of an occupation area of this object in an entire image increases (a large and fine object is present near the view screen).

6. Score Determining Rule Based on Contrast and Dynamic Range

With reference to contrast based on a distribution of pixel values or a dynamic range based on a luminance distribution, a unit region having higher contrast or a higher dynamic range is assigned with a higher score.

7. Score Determining Rule Based on Figure Movement

With reference to a movement amount of a figure of each object, and sizes and amounts of an optical flow and motion estimation, in a case where many objects each having a movement amount larger than a predetermined value are present, a unit region containing these objects is assigned with a higher score as a rate of an occupation area of these objects in an entire image increases.

8. Score Determining Rule Based on Texture Type

Image texture types of respective unit regions are added up, and when a rate of an occupation area of a dense region, a detailed region, and a crowd region in an entire image is large, a unit region containing the corresponding texture is assigned with a score higher than those in other unit regions.

9. Score Control Rule at Scene Switching Timing

Information associated with a switching timing is obtained from the image forming section 420. Alternatively, a score is switched when any one of an object amount, a feature point, an edge, an optical flow, motion estimation, pixel contrast, a dynamic range of luminance, presence or absence of audio, the number of audio channels, and an audio mode is suddenly changed or reset in a time-series direction. At this time, at least two frames are referred to. Note that the compression coding processing section 454 can detect scene switching on the basis of a correlation with a previous frame so as to recognize the necessity of a frame designated as an intra frame for compression coding.

In this case, accuracy of detection of switching may be enhanced by using the score determining rules described above as well as determination made by the compression coding processing section 454 using a conventional method. When it is determined that the current time is not a scene switching timing, each score of the high-score unit regions set for the previous frame on the basis of other score determining rules is further raised. When it is determined that the current time is a scene switching timing, each score of the high-score unit regions is temporarily reset. The detected scene switching requires an intra frame, and a data size easily increases in a surging manner. Accordingly, the total score of all the unit regions in a target frame and a predetermined number of subsequent frames is reduced.

10. Score Determining Rule Based on Contents of user Operation

When a change amount of a user operation in an immediately preceding predetermined time period is a predetermined value or larger in content such as a game being executed by the image forming section 420, it is estimated that the user expects high responsiveness from content and a region to which the user pays attention is present. Accordingly, each score of unit regions to which a score of a predetermined value or larger has been given under other score determining rules is further amplified. In a case where a change amount is small even after execution of an operation, a level of this score is lowered by one stage from an amplification result. Note that, as the user operation, input information acquired by a not-depicted input device such as a game controller, a keyboard, and a mouse; a position, a posture, and movement of the head mounted display 100; a gesture (hand sign) instruction based on a result of analysis of an image captured by a camera of the head mounted display 100 or a not-depicted external camera; a voice instruction acquired by a not-depicted microphone; and the like are acquired from the image processing apparatus 200.

11. Control of Switching Frequency of Distribution of Compression Rate

With reference to a history of the attention degree determined in an immediately preceding predetermined time period, scores are adjusted such that switching falls within an allowable range in terms of user experiences. The "allowable range" is determined on the basis of a table or a model defined beforehand.

The attention degree estimation section 460 comprehensively determines an attention degree of each unit region on the basis of any one of the foregoing rules, or a sum of scores obtained under a plurality of rules. Note that the compression coding processing section 454 may refer to a Z value to recognize a position of an object, an order of projection, a size, and a relative distance from a view screen under the rules 1 to 9 described above. Note that the determining rules described above are prepared beforehand in a form of a table, a calculation model, or the like and are retained within the attention degree estimation section 460.

The compression coding processing section 464 determines a compression rate (quantization parameters) of each unit region on the basis of the distribution of the attention degrees estimated in this manner. For example, in a case where one row of unit regions is designated as a partial image in the example depicted in the figure, a compression rate of each of a partial image 168*a* in an uppermost stage and a partial image 168*b* in a lowermost stage, in which a unit region determined to attract high attention is not contained, is raised to a rate higher than compression rates of partial images in an intermediate part other than the uppermost and lowermost stages. Moreover, in a case where the object 162*a* attracts higher attention than the object 162*b*, a compression rate of the unit region group 166*b* indicating the object 162*b* may be raised to a rate higher than a compression rate of the unit region group 166*a*.

In any case, the compression coding processing section 464 causes the data size to be suitable for the latest communication status by updating the distribution of compression rates in units of a partial image, in units of a frame unit, in units of a predetermined number of frames, or at predetermined time intervals. For example, in a case where the available communication bandwidth, the resolution, and the frame rate are the same, a compression rate difference between a region of attention and a region of no attention is reduced as the number of unit regions estimated to have a high attention degree increases. Such adjustment may be made separately for each of the unit region groups 166*a* and 166*b* according to the attention degree. Depending on cases, some of the unit region groups (e.g., unit region group 166*b*) may be eliminated from the target of compression rate reduction on the basis of the priority order of the determined attention degree.

Moreover, when the resolution or the frame rate is high in the state of the same available communication bandwidth, the data size for each frame is adjusted to optimize the bit rate by raising the entire compression rates or reducing the compression rate difference between the region of attention and the region of no attention. While the transmission target is handled in units of a partial image, data size control may be performed in units of any one of a partial image, a frame, a predetermined number of frames, and a predetermined time period. On the basis of a combination of the attention degree of each unit region, the available communication bandwidth, the frame rate, and the resolution, the rule for determining the distribution of the quantization parameters is prepared in a form of a table, a calculation model, or other forms beforehand.

However, various kinds of information indicating contents of a moving image are present as described above. Accordingly, it is preferable to optimize the determining rules themselves to determine optimum quantization parameters from a comprehensive view of the various kinds of information. Accordingly, similarly to "6. Optimization of data size reduction means" described above, the determining rules may be optimized by machine learning or deep learning while adjustment results of various past cases are collected.

Figure 35:
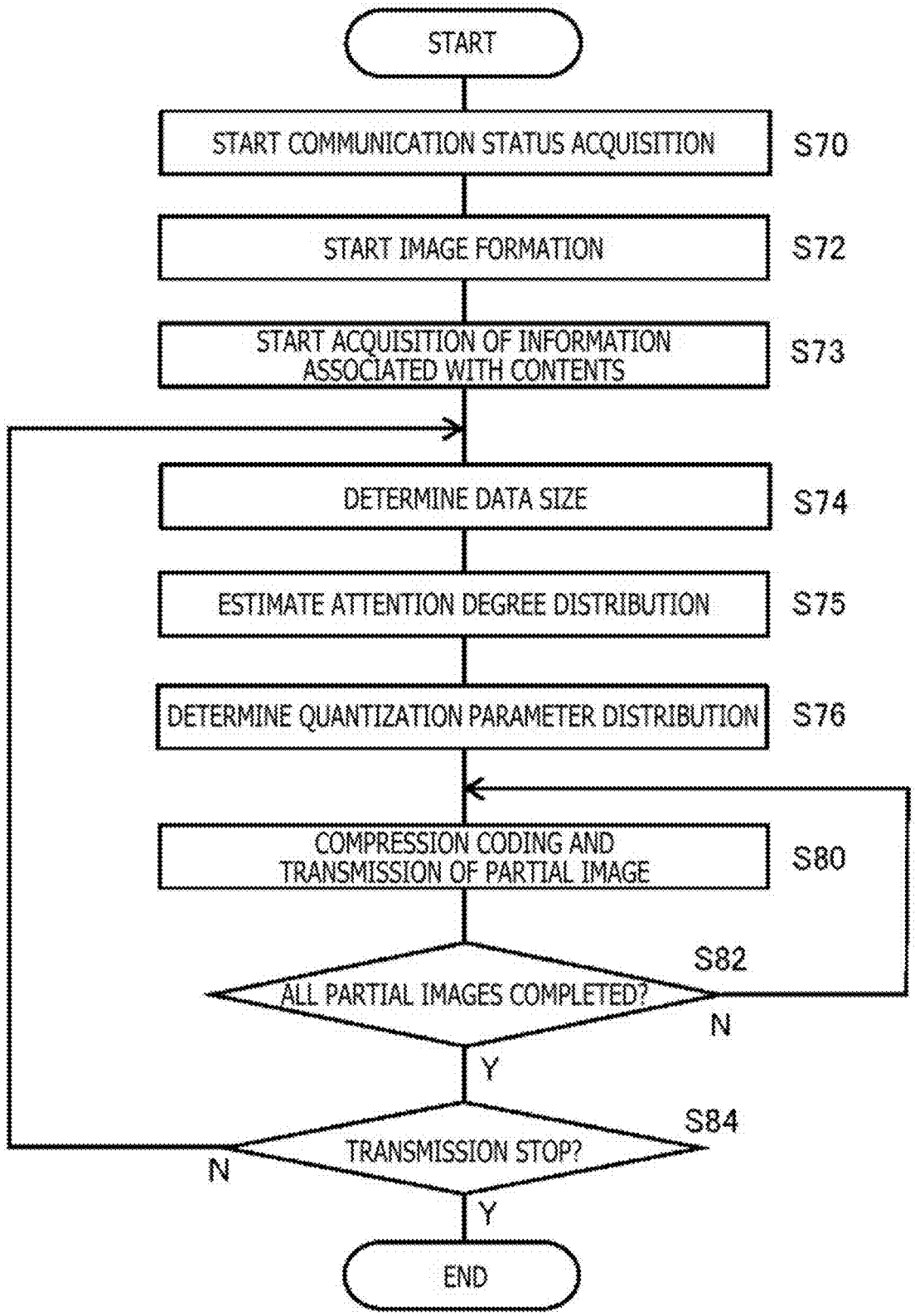
FIG. 35 is a flowchart presenting a processing procedure performed by the server for controlling a compression rate for each region of an image plane according to the present embodiment.

FIG. 35 is a flowchart presenting a processing procedure performed by the server 400 for controlling the compression rate for each region in an image plane. The process of this flowchart is started when the user selects a game to play, a moving image to enjoy, or the like and inputs the selection to the image processing apparatus 200. In response to this start, the communication status acquisition section 462 of the server 400 starts status acquisition of communication to be used for streaming to the image processing apparatus 200 (S70). As described above, the communication status is identified by signal transmission and reception to and from the image processing apparatus 200. Accordingly, the communication status acquisition section 462 acquires necessary information from the communication section 426.

In addition, the image forming section 420 starts formation of a corresponding moving image (S72). However, the image forming section 420 is not required to draw an image of computer graphics, and may acquire a captured image from a camera. On the other hand, the image contents acquisition section 450 of the compression coding section 422 starts acquisition of information associated with contents of the moving image (S73). Subsequently, the compression coding processing section 464 determines a transmission size of image data according to the most recent communication status acquired by the communication status acquisition section 462 (S74). Thereafter, the attention degree estimation section 460 of the compression coding section 422 estimates a distribution of attention degrees for a frame to be processed, on the basis of the information associated with the contents of the moving image (S75). Specifically, a plane of the frame is divided into unit regions, and an attention degree is derived for each of the unit regions.

For derivation of an attention degree, a table for acquiring a score in accordance with at least any one of the foregoing rules is referred to, or a calculation model is used. Thereafter, scores obtained from various aspects are added up to obtain a final attention degree for each of the unit regions. The compression coding processing section 464 determines a distribution of quantization parameters on the basis of the distribution of attention degrees (S76). As described above, the quantization parameters are determined in consideration of the attention degree as well as the available communication bandwidth, the resolution, and the frame rate.

The compression coding processing section 464 derives a distribution of appropriate quantization parameters from these parameters by referring to the table or by utilizing the calculation model, for example. Subsequently, the compression coding processing section 464 sequentially compression-codes the unit regions contained in a partial image by using the determined quantization parameters, and sequentially supplies the unit regions to the packetizing section 424. The communication section 426 transmits the unit regions to the image processing apparatus 200 (S80).

The compression coding processing section 464 repeats compression coding and transmission for all partial image data of the frame to be processed (N in S82, and S80). Unless stop of image transmission is requested by a user operation input to the image processing apparatus 200 or the like (N in S84), determination of the data size, estimation of a distribution of attention degrees, determination of a distribution of quantization parameters, and compression coding and transmission of the partial images are repeated also for subsequent frames (N in S84, and S74, S75, S76, S80, and S82).

Note that these processes are performed by pipeline-processing in units of a partial image in an actual situation. Accordingly, estimation of a distribution of attention degrees and determination of a distribution of quantization parameters for the next frame can be performed during processing of compression coding and transmission of partial images for a previous frame. Moreover, in an actual situation, the frequency of data size determination in S74 and the frequency of compression coding and transmission in units of a partial image in S80 may be the same or different from each other. When stop of image transmission is needed, the server 400 ends all the processes (Y in S84).

According to the compression rate control for each region based on contents indicated by a moving image described above, the server 400 estimates an attention degree of the user for each unit region on the basis of the contents indicated by the moving image. Thereafter, the server 400 determines a distribution of quantization parameters such that the compression rate lowers as the attention degree increases, and then performs compression coding and transmits the resultant data to the image processing apparatus 200. In this manner, quality of user experiences can be enhanced with a limited communication bandwidth and in a limited resource environment.

Moreover, a more accurate and detailed distribution of attention degrees can be estimated by acquiring, as information associated with contents of a moving image, multi-faceted information from the image forming section which forms images in real time and the compression coding processing section which performs compression coding. Compression rates can be controlled in a more detailed manner in response to a change in resolution, frame rate, and communication status by handling attention degrees as a distribution and determining a distribution of compression rates according to the distribution of attention degrees. Accordingly, flexible handling of various status changes is achievable.

7-2. Control Based on Gaze Point of User

While an attention degree is estimated on the basis of contents indicated by a moving image in 7-1 described above, an attention degree may be estimated on the basis of a portion at which the user is actually gazing. In this case, the server 400 acquires position information associated with a gaze point in a screen from a device which detects a gaze point of the user viewing the head mounted display 100 or the flat-plate display 302, and estimates a distribution of attention degrees on the basis of the acquired position information. Note that the distribution of attention degrees may be derived on the basis of both the contents indicated by the moving image and the gaze point of the user.

Figure 36:
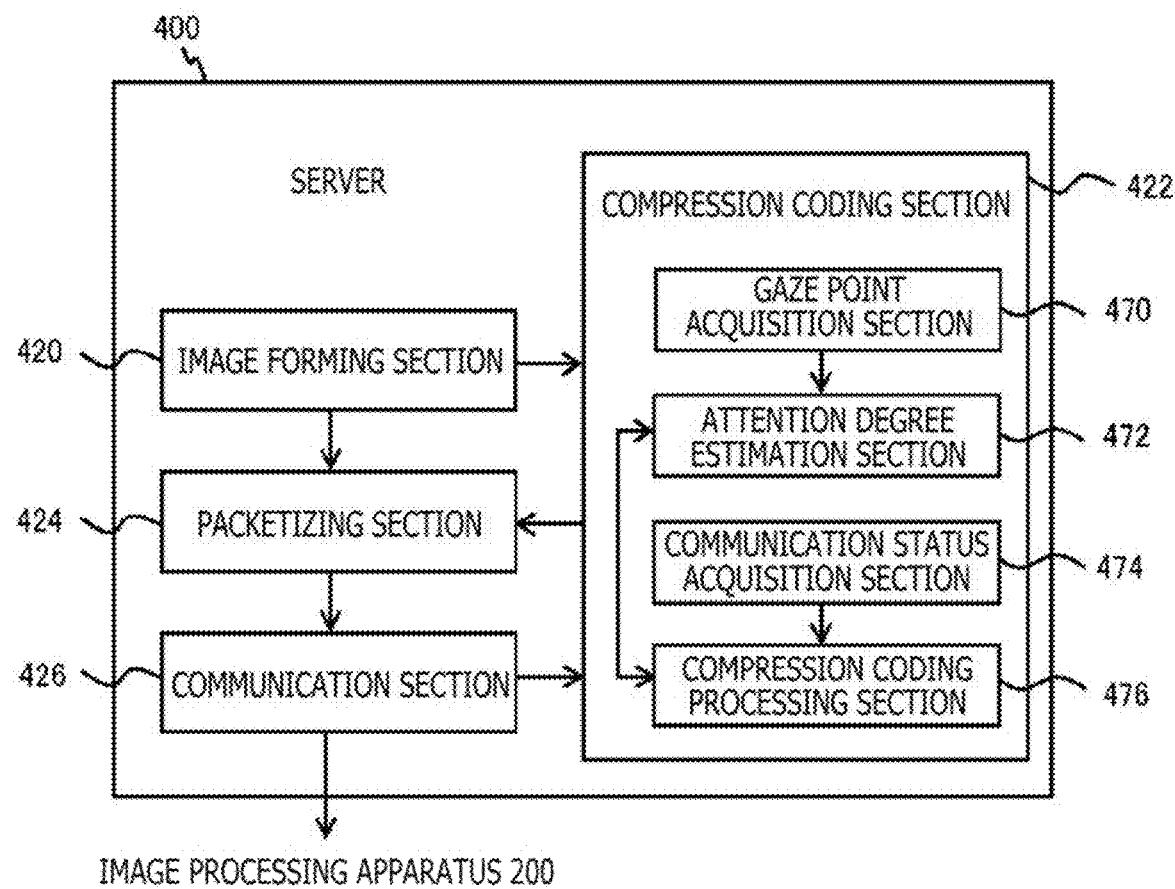
FIG. 36 is a diagram depicting a configuration of function blocks of the server which has a function of changing a compression rate depending on a region in a frame on the basis of a gaze point of the user according to the present embodiment.

FIG. 36 depicts a configuration of function blocks of the server 400 which has a function of changing a compression rate depending on the region in a frame on the basis of the gaze point of the user. The server 400 includes the image forming section 420, the compression coding section 422, the packetizing section 424, and the communication section 426. Each of the image forming section 420, the packetizing section 424, and the communication section 426 has a function similar to the corresponding function described with reference to FIGS. 5, 9, 16, 26, and 33. Moreover, in a case of transmission of images for a plurality of viewpoints, the compression coding section 422 may further include the dividing section 440, the second coding section 444, the transmission target adjustment section 362, and the like depicted in FIGS. 20 and 23.

The compression coding section 422 includes a gaze point acquisition section 470, an attention degree estimation section 472, a communication status acquisition section 474, and a compression coding processing section 476. The gaze point acquisition section 470 acquires position information associated with the gaze point of the user in a moving image that is already drawn and displayed on a display device connected to the image processing apparatus 200, such as the head mounted display 100 and the flat-plate display 302. For example, a gaze point detector is provided within the head mounted display 100, or a gaze point detector is attached to the user viewing the flat-plate display 302 to acquire results of measurement by the gaze point detector.

Thereafter, position coordinate information associated with the gaze point is transmitted at a predetermined rate from the image data acquisition section 240 of the image processing apparatus 200 to the communication section 426 of the server 400, and the gaze point acquisition section 470 acquires this information. For example, the gaze point detector may be an ordinary device which applies reference light such as infrared light to the eyeballs of the user and specifies a gaze point on the basis of directions of pupils obtained by detecting reflection light with use of a sensor. The gaze point acquisition section 470 preferably acquires the position information associated with the gaze point at a frequency higher than the frame rate of the moving image.

Alternatively, the gaze point acquisition section 470 may generate the position information at a preferable frequency by time-interpolation of the position information associated with the gaze point and acquired from the image processing apparatus 200. Note that the gaze point acquisition section 470 may simultaneously acquire a predetermined number of history values from the image processing apparatus 200 together with the latest value of the position information associated with the gaze point to prepare for a transmission failure from the image processing apparatus 200.

The attention degree estimation section 472 estimates an attention degree for each of unit regions produced by dividing a frame plane of a moving image, on the basis of a position of a gaze point. Specifically, the attention degree estimation section 472 estimates an attention degree on the basis of at least any one of a frequency at which the gaze point is contained, a stay time period of the gaze point, presence or absence of saccade, and presence or absence of a blink. Qualitatively, the attention degree estimation section 472 raises an attention degree for a unit region as the frequency at which the gaze point is contained per unit time period or the stay time period increases.

Saccade is high-speed movement of an eyeball caused when a visual line is directed to an object, for example. It is known that processing of a visual signal in the brain is interrupted during a period of saccade. Needless to say, no image is recognized during a period of blinking. Accordingly, the attention degree estimation section 472 makes a change of reducing or eliminating a height difference in attention degree during these time periods. A method for detecting a saccade or blinking period is disclosed in U.S. Patent Application Publication No. 2017/0285736, for example.

In a case where the gaze point acquisition section 470 herein acquires or generates position information associated with the gaze point at a frequency (e.g., 240 Hz) higher than a frame rate (e.g., 120 Hz) of a moving image, the attention degree estimation section 472 may update the attention degree every time new position information is obtained. Specifically, a distribution of attention degrees may be changed in the middle of a compression coding process for one frame. As described above, the attention degree estimation section 472 may further estimate an attention degree based on contents indicated by a moving image for each unit region similarly to the attention degree estimation section 460 described in 7-1, and acquire a final distribution of attention degrees by integration with an attention degree based on the position of the gaze point. The communication status acquisition section 474 has a function similar to the function of the communication status acquisition section 452 depicted in FIG. 26.

The compression coding processing section 476 basically has a function similar to the function of the compression coding processing section 464 in FIG. 33. Specifically, the compression coding processing section 476 varies the compression rate in an image plane on the basis of the distribution of attention degrees estimated by the attention degree estimation section 472, and then compression-codes image data at the respective compression rates. At this time, the compression coding processing section 476 determines a distribution of compression rates in the frame plane and a distribution of quantization parameters on the basis of a combination of the communication bandwidth available for data transfer, the frame rate, and the resolution.

For example, the compression coding processing section 476 adjusts the distribution of compression rates on the basis of a comparison between the data size of a predetermined number of most recent frames and the available communication bandwidth acquired by the communication status acquisition section 474. Meanwhile, movement of a gaze point is generally complicated, and therefore, an attention degree may be difficult to obtain with stable accuracy. Accordingly, the compression coding processing section 476 may refer to a compression result of a most recent frame as well as the distribution of attention degrees estimated by the attention degree estimation section 472, to enhance determination accuracy of the compression rates of the frame to be processed.

For example, the compression coding processing section 476 may adjust the distribution of compression rates of the frame to be processed, on the basis of a compression coding result of a predetermined number of most recent frames, i.e., a region with a raised compression rate, the compression rate of this region, or the like. In this manner, a bias of the distribution of compression rates can be reduced. Alternatively, the compression coding processing section 476 may determine effectiveness of an attention degree for each unit region. In a case where the attention degree is not effective, the compression coding processing section 476 may determine the distribution of compression rates with reference to the compression coding result of a predetermined number of most recent frames.

For example, in a case where regions each having a high attention degree are considerably dispersed, or in a case where an attention degree is out of an effective range, the compression coding processing section 476 adopts the distribution of compression rates determined on the basis of a predetermined number of most recent frames without change, or extrapolates a distribution change, to thereby determine the distribution of compression rates of the frame to be processed. Moreover, as described above in 7-1, the compression coding processing section 476 determines the distribution of compression rates in the image plane such that the data size of the entire frame is suitable for the available communication band in consideration of the frame rate and the resolution. Processes subsequently performed are similar to those described above in 7-1.

Figure 37:
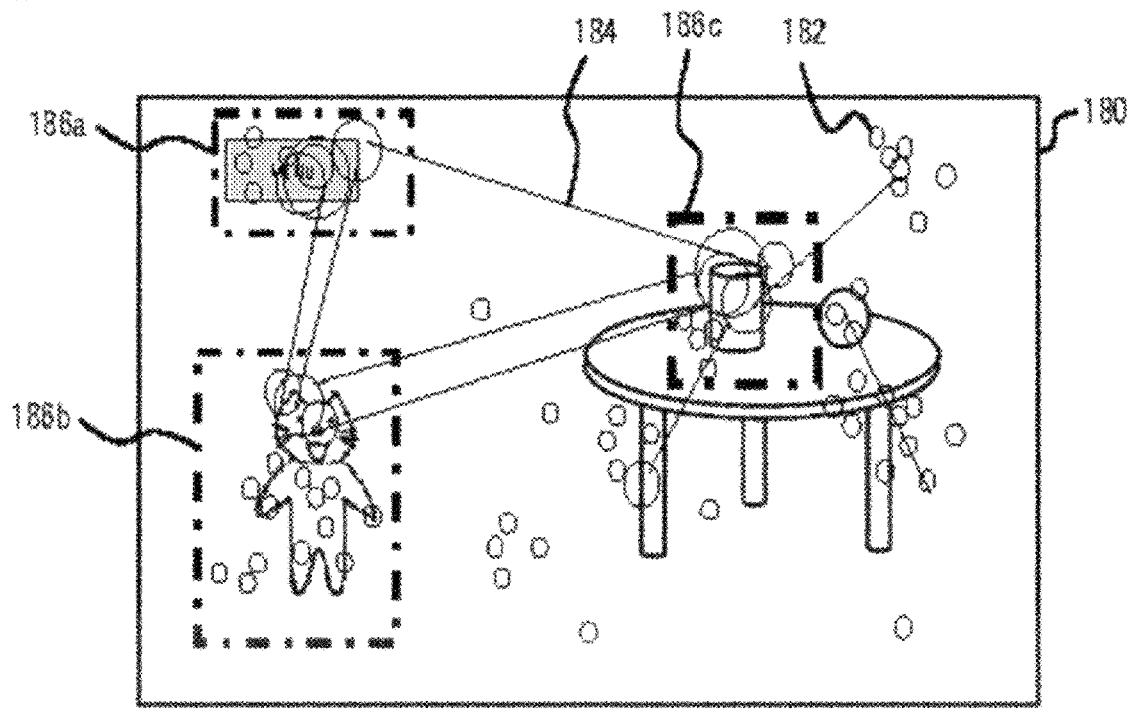
FIG. 37 is a diagram for explaining a process performed by an attention degree estimation section for estimating a distribution of attention degrees in an image plane according to the present embodiment.

FIG. 37 is a diagram for explaining a process performed by the attention degree estimation section 472 for estimating the distribution of attention degrees in an image plane. An image 180 indicates a certain frame in moving image data. Each circle depicted in the image (e.g., circle 182) indicates a position where a gaze point stays, and expresses a length of a stay time period by varying a circle size. The "stay" herein refers to a state where the gaze point remains within a predetermined range considered as an identical position for a predetermined time period or longer. Moreover, each line (e.g., line 184) indicates a movement route produced at a frequency of a predetermined value or higher in movement routes of the gaze point.

The attention degree estimation section 472 acquires position information associated with the gaze point in a predetermined cycle from the gaze point acquisition section 470 and generates information depicted in the figure. Thereafter, the attention degree estimation section 472 estimates an attention degree on the basis of the frequency at which the gaze point is contained, the stay time period of the gaze point, the presence or absence of saccade, the presence or absence of a blink, or the like for each unit region. In the figure, for example, a higher attention degree than those of other unit regions is estimated for a unit region contained in each of regions 186*a*, 186*b*, and 186*c* each surrounded by a one-dot chain line. Moreover, a higher attention degree may be also given to a unit region corresponding to a route of viewpoint movement at a frequency of a threshold or higher. In this mode, the attention degree may also be constituted by two values of 0 and 1, i.e., no attention and attention, or may be expressed by more gradations.

FIG. 38 is a diagram for explaining a method performed by the compression coding processing section 476 for determining the distribution of compression rates on the basis of the gaze point. The compression coding processing section 476 basically determines a compression rate (quantization parameter) for each partial image and performs compression coding on the basis of the latest distribution of attention degrees and the available communication bandwidth at the time of a start of compression coding of a target frame.

However, a data size obtained as a result of compression may vary depending on the contents of the image, and gaze point information may be updated for an unprocessed partial image within the target frame.

In this case, an estimated data size at the time of the start of compression coding of the target frame may be different from an actual result. Accordingly, in a case of a temporary excess of the available communication bandwidth, or in a case of a possibility of this excess, designation of reduction of the compression rate based on the attention degree is cancelled to adjust the data size in the compression coding process for the target frame or subsequent frames. In the case of the figure, seven partial regions (e.g., partial region 192) are formed by equally dividing a plane of an image 190 in the horizontal direction as depicted in an upper part.

For example, at the time of compression coding of each of partial images, in a case where the partial image contains a unit region whose compression rate should be lowered, or in a case where the partial image is a unit region whose compression rate should be lowered, the compression coding processing section 476 lowers the compression rate by decreasing the quantization parameters of the partial image. Moreover, when new position information associated with the gaze point is obtained during sequential compression coding from a partial image on the top of the image 190, the attention degree estimation section 472 updates the attention degree for each unit region according to the new position information. In addition, the compression coding processing section 476 determines the compression rate of the partial image on the basis of a most recent attention degree. In other words, when the attention degree is updated after the start of processing for the frame to be processed, the compression coding processing section 476 compression-codes the partial image at the compression rate based on a most recent distribution of attention degrees of the frame.

For this determination of the compression rate, the compression rate may be adjusted with reference to the compression coding results obtained before as described above. A bar chart presented in a lower part of the figure is a compression coding result indicating a bit rate (bit/sec) of the data size after compression coding for each partial image in four successive frames ("Frame0" to "Frame3"). Moreover, a line graph 196 indicates a bit rate after compression coding per one frame, for each of the frames.

A bit rate "A" herein indicates a communication bandwidth available for communication between the server 400 and the image processing apparatus 200. However, this communication bandwidth varies with time in an actual situation. For example, the compression coding processing section 476 adjusts the compression rate and also quantization parameters of each partial image by comparing the bit rate per one frame with the available communication bandwidth. According to the example in the figure, the bit rate of "Frame0" per one frame is sufficiently lower than the communication bandwidth, while the bit rate of the subsequent "Frame1" is close to the communication bandwidth.

The compression coding processing section 476 predicts the bit rate per one frame in the compression coding process for each of the partial images, and raises the compression rate of any one of the partial images when it is determined that a difference from the communication bandwidth becomes smaller than a predetermined threshold as in "Frame1." In the figure, an arrow indicates lowering of the bit rate as a result of a rise of the compression rate of the seventh partial image of "Frame1" to a rate higher than the rate initially determined.

Moreover, the bit rate per one frame in subsequent "Frame2" exceeds the communication bandwidth. At this time, the compression coding processing section 476 may adjust the compression rate for the subsequent "Frame3." In the figure, an arrow indicates lowering of the bit rate as a result of a rise of the compression rate of the first partial image of "Frame3" to a rate higher than the rate initially determined.

Note that this example corresponds to an operation for expressing the attention degree by using two values of attention and non-attention and excluding the seventh partial image of "Frame1" and the first partial image of "Frame3," each of which has initially been a region of attention, from regions of attention. Specifically, when the bit rate per one frame exceeds the communication bandwidth, or when the difference therebetween is smaller than a predetermined value, the compression coding processing section 476 cancels reduction of the compression rate even for the partial image containing a unit region of a high attention degree for which the compression rate should be lowered.

In this case, the compression rate same as those of other regions attracting no attention may be given, or the compression rate may be raised by a predetermined value. However, the adjustment method is not limited to the method depicted in the figure. Particularly, in a case where the attention degree is expressed by multiple stages, a change amount of the compression rate may be varied depending on the degree of attention, or an entire distribution of compression rates may be varied. In this manner, the compression coding processing section 476 may determine quantization parameters only on the basis of the frame to be processed, or determine quantization parameters with reference to the compression coding results of a predetermined number of most recent frames as well.

At this time, the compression coding processing section 476 may multi-directionally check changes of parameters with time, such as the distribution of quantization parameters in a past frame, the available communication bandwidth, and the data size of an entire frame, and determine the distribution of quantization parameters in the frame to be processed on the basis of the changes. The rule for determining the distribution of quantization parameters on the basis of the attention degree and the rule for determining the distribution of quantization parameters on the basis of the changes of parameters with time, such as the distribution of quantization parameters in a past frame, the available communication bandwidth, and the data size of an entire frame, may be optimized by machine learning or deep learning while adjustment results of various past cases are collected.

Note that a processing procedure performed by the server 400 for controlling the compression rate for each region of the image plane may be similar to the corresponding procedure described with reference to FIG. 35. Note that the attention degree estimation process may be updated as necessary every time position information associated with the gaze point is obtained, and that quantization parameters may be updated as necessary according to the update of the estimation process.

According to the compression rate control for each region based on the gaze point of the user described above, the server 400 acquires movement of an actual visual line of the user and estimates the attention degree of the user for each unit region on the basis of a result of the movement of the actual visual line. In this manner, the target to which attention is actually paid can be accurately determined, and image quality can be enhanced in terms of recognition of the user by preferentially allocating resources to this target.

Moreover, since a most recent result of compression coding is used for determination of the compression rate, compression rate setting accuracy can be maintained even in a case where attention degree estimation includes errors. Further, since the data size after compression coding for the entire frame is monitored, even when the number of regions initially determined to have a high attention degree is excessively large, or when each compression rate of these regions is excessively lowered, these values can be appropriately adjusted. In addition, similarly to 7-1, since the attention degrees are handled as a distribution and the distribution of compression rates is determined according to the distribution of attention degrees, compression rates can be controlled in a detailed manner in response to changes in resolution, frame rate, and communication status. Accordingly, flexible handling of various status changes is achievable.

Besides, as a modification, the gaze point acquisition section 470 and the attention degree estimation section 472 may be provided on the image processing apparatus 200 side, and the server 400 may acquire information associated with the attention degree estimated for each unit region from the image processing apparatus 200. In this case, the gaze point acquisition section 470 acquires position information associated with the gaze point as a measurement result from the gaze point detector described above. The attention degree estimation section 472 estimates the attention degree for each unit region on the basis of the position information associated the gaze point in a manner similar to the manner in the case where the attention degree estimation section 472 is provided on the server 400.

As described above, the position information associated with the gaze point may be acquired at a frequency higher than the frame rate, and the distribution of attention degrees may be updated as necessary according to the position information. The information associated with the attention degree estimated by the attention degree estimation section 472 is transmitted to the communication section 426 of the server 400 at a predetermined rate via the image data acquisition section 240, for example. In this case, the attention degree estimation section 472 may also simultaneously transmit a predetermined number of history values together with the latest value of the estimation result of the attention degree, to prepare for a transmission failure. Operations of the communication status acquisition section 474 and the compression coding processing section 476 of the server 400 are similar to the corresponding operations described above. This configuration also achieves operations and effects similar to those described above.

The present invention has been described on the basis of the embodiments. The embodiments are merely illustrative, and those skilled in the art understand that various modifications may be made to combinations of the respective constituent elements and the respective processing processes of the embodiments, and that these modifications are included in the scope of the present invention.

INDUSTRIAL APPLICABILITY

As described above, the present invention is applicable to various types of apparatuses such as an image processing apparatus, a game device, a portable terminal, a head mounted display, an image data transfer apparatus, and a content providing server, a system including any one of these, and so on.

REFERENCE SIGNS LIST

1: Image display system
100: Head mounted display
200: Image processing apparatus
202: Input/output interface
204: Partial image storage section
206: Control section
208: Video decoder
210: Partial image storage section
212: Control section
214: Image processing section
216: Partial image storage section
218: Control section
220: Display controller
240: Image data acquisition section
242: Decoding decompression section
244: Image processing section
246: Display control section
248: Data acquisition status specifying section
250: Output target determination section
252: Output section
260: Position-posture tracking section
262: First correction section
264: Merging section
266: Second correction section
270a: First forming section
270b: Second forming section
272a: First control section
272b: Second control section
280: First decoding section
282: Second decoding section
302: Flat-plate display
400: Server
402: Drawing control section
404: Image drawing section
406: Frame buffer
408: Video encoder
410: Partial image storage section
412: Control section
414: Video stream control section
416: Input/output interface
420: Image forming section
422: Compression coding section
424: Packetizing section
426: Communication section
430: Drawing section
432: Forming contents switching section
434: Data forming section
440: Dividing section
442: First coding section
444: Second coding section
450: Image contents acquisition section
452: Communication status acquisition section
454: Compression coding processing section
460: Attention degree estimation section
462: Communication status acquisition section
464: Compression coding processing section
470: Gaze point acquisition section
472: Attention degree estimation section
474: Communication status acquisition section
476: Compression coding processing section

The invention claimed is:

1. An image display system comprising:
a server that generates data of a moving image; and
a client terminal that receives the data of the moving image and causes a display panel to display the data,
wherein
the server includes
a data forming section that performs a part of a forming process necessary for causing each frame of the moving image to have a format corresponding to a display mode achieved by the client terminal, a forming contents switching section that switches, under a predetermined rule, contents of a process to be performed by the data forming section, and a communication section that transmits data of a frame for which the part of the forming process has been performed and information associated with the contents of the process, and the client terminal includes a correction section that generates a plurality of frames in formats that are different from each other and correspond to a plurality of display modes from one frame transmitted from the server, by performing a correction process determined on a basis of the information associated with the contents of the process, and a display control section that outputs, to each of a plurality of the display panels, data of a corresponding frame of the frames caused to have the formats different from each other.

2. The image display system according to claim 1, wherein the forming contents switching section determines the contents of the process to be performed, on a basis of at least either the display mode or processing performance of the correction section.

3. The image display system according to claim 1, wherein the forming contents switching section determines the contents of the process to be performed, on a basis of at least either a characteristic of the moving image or a communication status with the client terminal.

4. The image display system according to claim 1, wherein the display mode includes a mode that allows an image displayed on a head mounted display to be visually recognized via an ocular lens, and the forming contents switching section switches between performing and not performing a process that gives opposite distortion to the frame to eliminate distortion produced by the ocular lens.

5. The image display system according to claim 1, wherein the display mode includes a mode that causes a head mounted display to display a left-eye image and a right-eye image, and the forming contents switching section switches between forming and not forming the left-eye image and the right-eye image from the frame.

6. The image display system according to claim 1, wherein the correction section causes the frame to have a first format corresponding to a head mounted display and a second format corresponding to a flat-plate display, and the display control section outputs data of the frame in the first format and data of the frame in the second format to the head mounted display and the flat-plate display, respectively.

7. The image display system according to claim 6, wherein the correction section corrects a frame transmitted from the server, so as to have a visual field corresponding to a position and a posture of the head mounted display taken at a time of the correction process.

8. The image display system according to claim 7, wherein the correction section creates, on a basis of the position and the posture, a displacement vector map that presents for each pixel a displacement vector indicating a displacement amount and a displacement direction of a pixel necessary for correction, and corrects the frame transmitted from the server, for each pixel.

9. The image display system according to claim 8, wherein the correction section creates the displacement vector map by combining the displacement vector for giving distortion corresponding to an ocular lens of the head mounted display with the displacement vector for adjustment to the visual field corresponding to the position and the posture.

10. The image display system according to claim 1, wherein the correction section includes a first correction section that causes a frame transmitted from the server to have a format corresponding to a first display mode, and a second correction section that causes the frame that has been caused to have the format corresponding to the first display mode to have a format corresponding to a second display mode, and the display control section includes a first display control section that outputs data of the frame received from the first correction section to a display panel of a display device that achieves the first display mode, and a second display control section that outputs data of the frame received from the second correction section to a display panel of a display device that achieves the second display mode.

11. The image display system according to claim 10, wherein the first correction section merges an image captured by a camera provided on a head mounted display with a frame transmitted from the server and then causes the frame merged with the captured image to have a format corresponding to the head mounted display, and the second correction section causes the frame merged with the captured image to have a format corresponding to a flat-plate display.

12. The image display system according to claim 1, wherein the communication section transmits the data of the frame and the information associated with the contents of the process to a plurality of the client terminals that achieve different display modes, and the correction sections of the plurality of client terminals perform correction processes different from each other for the data of the frame transmitted from the server.

13. The image display system according to claim 1, wherein the data forming section, the communication section, and the correction section perform respective processes in units of a partial image smaller than one frame, and the display control section sequentially outputs data of the partial image to the display panel.

14. The image display system according to claim 1, wherein the forming contents switching section further switches between designating and not designating data of a panorama image as a transmission target, and, when the panorama image is transmitted, the correction section generates, using the panorama image, data of frames for a plurality of viewpoints corresponding to each of a plurality of the display panels.

15. A moving image distribution method comprising:

by a server that generates data of a moving image, switching, under a predetermined rule, contents of a process to be performed as a part of a forming process necessary for causing each frame of the moving image to have a format corresponding to a display mode achieved by a client terminal;

performing the process to be performed;

transmitting, to the client terminal, data of a frame for which the part of the forming process has been performed and information associated with the contents of the process;

by the client terminal, receiving the data of the frame and the information associated with the contents of the process;

generating a plurality of frames in formats that are different from each other and correspond to a plurality of display modes from one frame transmitted from the server, by performing a correction process determined on a basis of the information associated with the contents of the process; and outputting, to each of a plurality of display panels, data of a corresponding frame of the frames caused to have the formats different from each other.

* * * * *